United States Patent
Itou

(10) Patent No.: US 9,513,914 B2
(45) Date of Patent: Dec. 6, 2016

(54) APPARATUS AND METHOD FOR PROCESSING AN INSTRUCTION THAT SELECTS BETWEEN SINGLE AND MULTIPLE DATA STREAM OPERATIONS WITH REGISTER SPECIFIER FIELD CONTROL

(75) Inventor: Shigeki Itou, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1744 days.

(21) Appl. No.: 12/402,603

(22) Filed: Mar. 12, 2009

(65) Prior Publication Data

US 2009/0240926 A1 Sep. 24, 2009

(30) Foreign Application Priority Data

Mar. 21, 2008 (JP) .................. 2008-073864

(51) Int. Cl.
| | |
|---|---|
| G06F 9/318 | (2006.01) |
| G06F 9/302 | (2006.01) |
| G06F 9/30 | (2006.01) |
| G06F 15/80 | (2006.01) |
| G06F 7/48 | (2006.01) |
| G06F 9/38 | (2006.01) |
| G06F 17/16 | (2006.01) |
| G06F 7/483 | (2006.01) |
| G06F 7/544 | (2006.01) |

(52) U.S. Cl.
CPC ........ *G06F 9/30181* (2013.01); *G06F 7/4806* (2013.01); *G06F 9/3001* (2013.01); *G06F 9/30098* (2013.01); *G06F 9/30145* (2013.01); *G06F 9/3885* (2013.01); *G06F 9/3887* (2013.01); *G06F 15/80* (2013.01); *G06F 17/16* (2013.01); *G06F 7/483* (2013.01); *G06F 7/5443* (2013.01)

(58) Field of Classification Search
CPC G06F 9/3001; G06F 9/30145; G06F 9/30181; G06F 9/3885; G06F 9/3887; G06F 7/5443; G06F 15/80; G06F 15/8007
USPC .......................................................... 712/221
See application file for complete search history.

(56) References Cited

U.S. PATENT DOCUMENTS 4,761,755 A * 8/1988 Ardini et al. ................. 708/518
4,807,124 A * 2/1989 Mor et al. ..................... 711/200
(Continued)

FOREIGN PATENT DOCUMENTS

| | | |
|---|---|---|
| EP | 0 483 967 A2 | 5/1992 |
| JP | 9-114664 | 5/1997 |

(Continued)

OTHER PUBLICATIONS

Korean Patent Office Action dated Oct. 25, 2010 for corresponding Korean Patent Application No. 10-2009-0023506.
(Continued)

*Primary Examiner* — David J Huisman
(74) *Attorney, Agent, or Firm* — Staas & Halsey LLP

(57) ABSTRACT

A technique realizes execution of various combinations of arithmetic operations in, for example, SIMD floating-point multiply-add arithmetic operation, with less instruction kind codes. An arithmetic operating apparatus sets, in one or more unused bits of a single arithmetic instruction, particular instruction information to instruct at least one of arithmetic operators to perform a process different from an ordinary process.

6 Claims, 27 Drawing Sheets

(56) References Cited

U.S. PATENT DOCUMENTS

| | | | |
|---|---|---|---|
| 5,764,959 A * | 6/1998 | Sharangpani et al. | 710/66 |
| 5,872,991 A | 2/1999 | Okamoto et al. | |
| 6,018,796 A * | 1/2000 | Suzuki et al. | 712/42 |
| 6,116,768 A * | 9/2000 | Guttag et al. | 708/236 |
| 6,230,259 B1 * | 5/2001 | Christie et al. | 712/228 |
| 6,401,190 B1 | 6/2002 | Nishioka et al. | |
| 6,625,724 B1 * | 9/2003 | Kahn et al. | 712/229 |
| 6,877,084 B1 * | 4/2005 | Christie | 712/203 |
| 6,965,981 B2 | 11/2005 | Nishioka et al. | |
| 7,421,566 B2 * | 9/2008 | Gschwind et al. | 712/216 |
| 2003/0009502 A1 | 1/2003 | Katayanagi | |
| 2003/0105793 A1 * | 6/2003 | Guttag et al. | 708/625 |
| 2004/0193837 A1 * | 9/2004 | Devaney et al. | 712/3 |
| 2004/0193838 A1 * | 9/2004 | Devaney et al. | 712/3 |
| 2005/0182916 A1 | 8/2005 | Kageyama et al. | |
| 2006/0053271 A1 | 3/2006 | Nishioka et al. | |
| 2007/0038848 A1 * | 2/2007 | Gschwind et al. | 712/225 |
| 2008/0201560 A1 | 8/2008 | Kageyama et al. | |
| 2009/0228691 A1 * | 9/2009 | Furuta et al. | 712/221 |

FOREIGN PATENT DOCUMENTS

| | | |
|---|---|---|
| JP | 2003-16051 | 1/2003 |
| JP | 2005-227942 | 8/2005 |
| WO | 96/29646 | 9/1996 |
| WO | WO 00/68783 | 11/2000 |

OTHER PUBLICATIONS

European Search Report issued Jul. 6, 2009 for corresponding European Patent Application No. 09155704.1.
Japanese Notice of Rejection mailed on Dec. 4, 2012 issued in corresponding Japanese Patent Application No. 2008-073864; pp. 1-5.

* cited by examiner

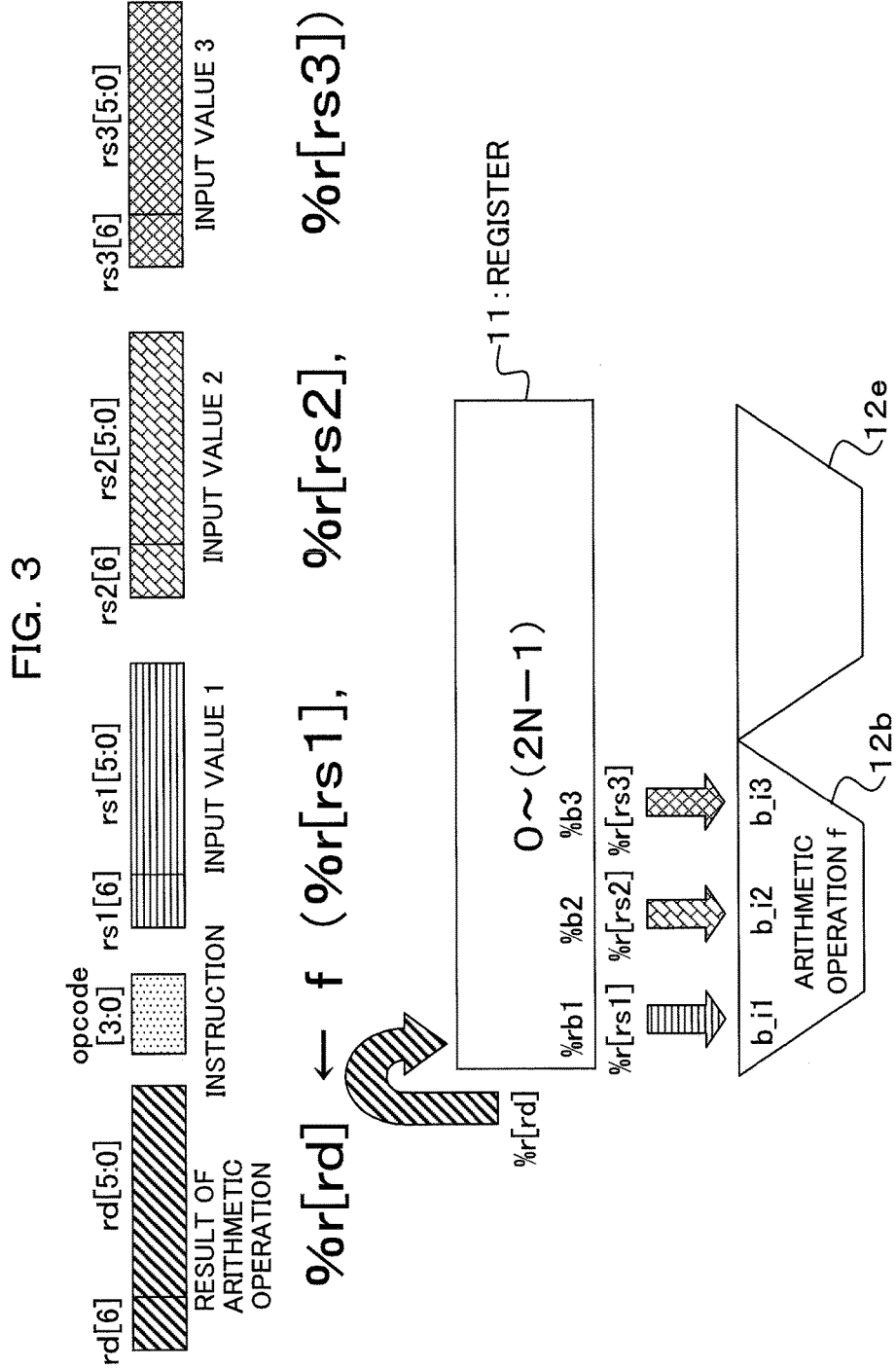

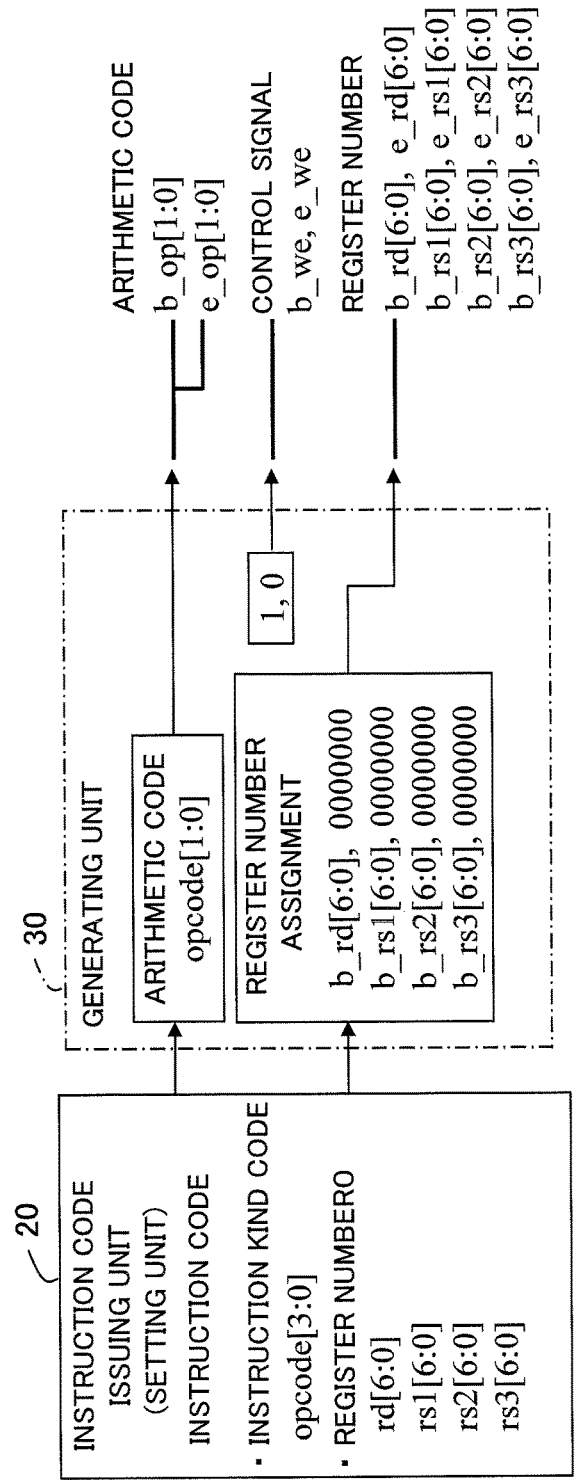

FIG. 5A

INSTRUCTION KIND CODE | INSTRUCTION CODE

| | opcode | | | | rd | | | | | | | rs1 | | | | | | | rs2 | | | | | | | rs3 | | | | | | |
|---|---|---|---|---|---|---|---|---|---|---|---|---|---|---|---|---|---|---|---|---|---|---|---|---|---|---|---|---|---|---|---|
| | 3 | 2 | 1 | 0 | 6 | 5 | 4 | 3 | 2 | 1 | 0 | 6 | 5 | 4 | 3 | 2 | 1 | 0 | 6 | 5 | 4 | 3 | 2 | 1 | 0 | 6 | 5 | 4 | 3 | 2 | 1 | 0 |
| fmadd | 0 | 0 | 0 | 0 | | | | | | | | | | | | | | | | | | | | | | | | | | | | |
| fmsub | 0 | 0 | 0 | 1 | | | | | | | | | | | | | | | | | | | | | | | | | | | | |
| fnmsub | 0 | 0 | 1 | 0 | | | | | | | | | | | | | | | | | | | | | | | | | | | | |
| fnmadd | 0 | 0 | 1 | 1 | | | | | | | | | | | | | | | | | | | | | | | | | | | | |

FIG. 5B

ORDINARY ARITHMETIC CODE

| | b_op | | | |
|---|---|---|---|---|
| | 1 | 0 | | |
| fmadd | 0 | 0 | fmadd | |
| fmsub | 0 | 1 | fmadd | |
| fnmsub | 1 | 0 | fmadd | |
| fnmadd | 1 | 1 | fmadd | |

EXTENDED ARITHMETIC CODE

| e_op | |
|---|---|
| 1 | 0 |
| 0 | 0 |
| 0 | 0 |
| 0 | 0 |
| 0 | 0 |

FIG. 5C

RECORDING CONTROL SIGNAL

| b_we | e_we |
|---|---|
| 1 | 0 |
| 1 | 0 |
| 1 | 0 |
| 1 | 0 |

FIG. 5D

REGISTER NUMBER ASSIGNMENT (ONLY MSB)

| b_rd[6] | b_rs1[6] | b_rs2[6] | b_rs3[6] | e_rd[6] | e_rs1[6] | e_rs2[6] | e_rs3[6] |
|---|---|---|---|---|---|---|---|
| rd[6] | rs1[6] | rs2[6] | rs3[6] | 0 | 0 | 0 | 0 |
| rd[6] | rs1[6] | rs2[6] | rs3[6] | 0 | 0 | 0 | 0 |
| rd[6] | rs1[6] | rs2[6] | rs3[6] | 0 | 0 | 0 | 0 |
| rd[6] | rs1[6] | rs2[6] | rs3[6] | 0 | 0 | 0 | 0 |

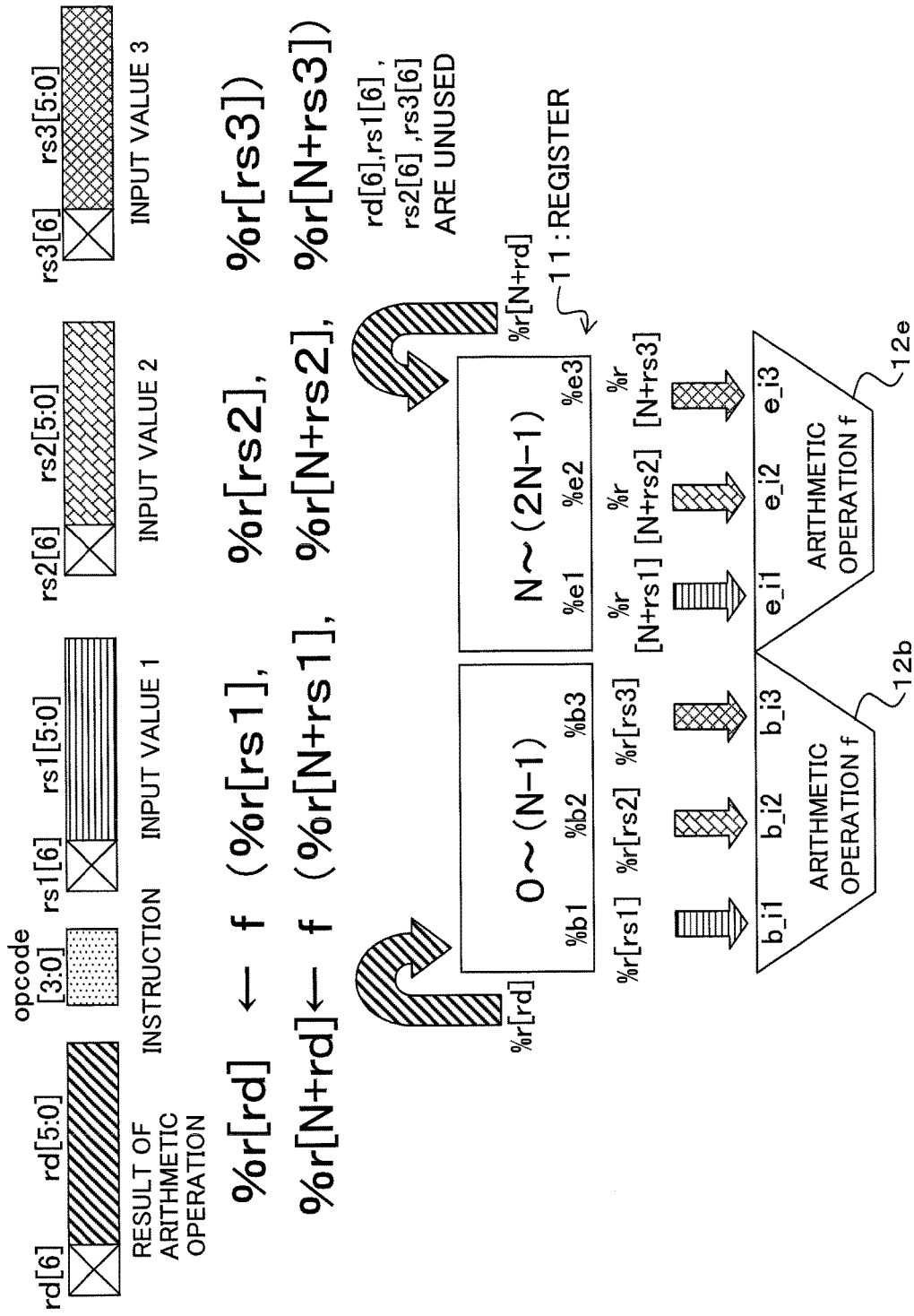

FIG. 8A

INSTRUCTION KIND CODE | INSTRUCTION CODE

| | opcode | | | | rd | | | | | | | rs1 | | | | | | | rs2 | | | | | | | rs3 | | | | | | |
|---|---|---|---|---|---|---|---|---|---|---|---|---|---|---|---|---|---|---|---|---|---|---|---|---|---|---|---|---|---|---|---|
| | 3 | 2 | 1 | 0 | 6 | 5 | 4 | 3 | 2 | 1 | 0 | 6 | 5 | 4 | 3 | 2 | 1 | 0 | 6 | 5 | 4 | 3 | 2 | 1 | 0 | 6 | 5 | 4 | 3 | 2 | 1 | 0 |
| simd-fmadd | 0 | 1 | 0 | 0 | | | | | | | | | | | | | | | | | | | | | | | | | | | | |
| simd-fmsub | 0 | 1 | 0 | 1 | | | | | | | | | | | | | | | | | | | | | | | | | | | | |
| simd-fnmsub | 0 | 1 | 1 | 0 | | | | | | | | | | | | | | | | | | | | | | | | | | | | |
| simd-fnmadd | 0 | 1 | 1 | 1 | | | | | | | | | | | | | | | | | | | | | | | | | | | | |

FIG. 8B

ORDINARY ARITHMETIC CODE

| | b_op | |
|---|---|---|
| | 1 | 0 |
| fmadd | 0 | 0 |
| fmsub | 0 | 1 |
| fnmsub | 1 | 0 |
| fnmadd | 1 | 1 |

EXTENDED ARITHMETIC CODE

| | e_op | |
|---|---|---|
| | 1 | 0 |
| fmadd | 0 | 0 |
| fmsub | 0 | 1 |
| fnmsub | 1 | 0 |
| fnmadd | 1 | 1 |

FIG. 8C

RECORDING CONTROL SIGNAL

| b_we | e_we |
|---|---|
| 1 | 1 |
| 1 | 1 |
| 1 | 1 |
| 1 | 1 |

FIG. 8D

REGISTER NUMBER ASSIGNMENT (ONLY MSB)

| b_rd[6] | b_rs1[6] | b_rs2[6] | b_rs3[6] | e_rd[6] | e_rs1[6] | e_rs2[6] | e_rs3[6] |
|---|---|---|---|---|---|---|---|
| 0 | 0 | 0 | 0 | 1 | 1 | 1 | 1 |
| 0 | 0 | 0 | 0 | 1 | 1 | 1 | 1 |
| 0 | 0 | 0 | 0 | 1 | 1 | 1 | 1 |
| 0 | 0 | 0 | 0 | 1 | 1 | 1 | 1 |

FIG. 11A

| INSTRUCTION KIND CODE | INSTRUCTION CODE |||||
|---|---|---|---|---|---|
| | opcode | rd | rs1 | rs2 | rs3 |
| | 3 2 1 0 | 6 5 4 3 2 1 0 | 6 5 4 3 2 1 0 | 6 5 4 3 2 1 0 | 6 5 4 3 2 1 0 |
| simd-fmadd | 0 1 0 0 | | | | |
| simd-fmsub | 0 1 0 1 | | | | |
| simd-fnmsub | 0 1 1 0 | | | | |
| simd-fnmadd | 0 1 1 1 | | | | |
| cross-fmadd1 | 1 1 0 0 | | | | |
| cross-fmadd2 | 1 1 0 1 | | | | |
| cross-fmadd3 | 1 1 1 0 | | | | |
| cross-fmadd4 | 1 1 1 1 | | | | |

FIG. 11B

ORDINARY ARITHMETIC CODE / EXTENDED ARITHMETIC CODE

| | b_op 1 0 | | | e_op 1 0 | |
|---|---|---|---|---|---|
| fmadd | 0 0 | fmadd | | 0 0 |
| fmsub | 0 1 | fmsub | | 0 1 |
| fnmsub | 1 0 | fnmsub | | 1 0 |
| fnmadd | 1 1 | fnmadd | | 1 1 |
| fmadd | 0 0 | fmadd | | 0 0 |
| fnmsub | 1 0 | fmadd | | 0 0 |
| fmadd | 0 0 | fnmsub | | 1 0 |
| fnmsub | 1 0 | fnmsub | | 1 0 |

FIG. 11C

RECORDING CONTROL SIGNAL

| b_we | e_we |
|---|---|
| 1 | 1 |
| 1 | 1 |
| 1 | 1 |
| 1 | 1 |
| 1 | 1 |
| 1 | 1 |
| 1 | 1 |
| 1 | 1 |

FIG. 11D

REGISTER NUMBER ASSIGNMENT (ONLY MSB)

| b_rd [6] | b_rs1 [6] | b_rs2 [6] | b_rs3 [6] | e_rd [6] | e_rs1 [6] | e_rs2 [6] | e_rs3 [6] |
|---|---|---|---|---|---|---|---|
| 0 | 0 | 0 | 0 | 1 | 1 | 1 | 1 |
| 0 | 0 | 0 | 0 | 1 | 1 | 1 | 1 |
| 0 | 0 | 0 | 0 | 1 | 1 | 1 | 1 |
| 0 | 0 | 0 | 0 | 1 | 1 | 1 | 1 |
| 0 | rs1[6] | rs2[6] | 0 | 1 | ~rs1[6] | ~rs2[6] | 1 |
| 0 | ~rs1[6] | ~rs2[6] | 0 | 1 | rs1[6] | rs2[6] | 1 |
| 0 | ~rs1[6] | ~rs2[6] | 0 | 1 | ~rs1[6] | rs2[6] | 1 |
| 0 | ~rs1[6] | rs2[6] | 0 | 1 | ~rs1[6] | ~rs2[6] | 1 |

FIG. 18A

| INSTRUCTION KIND CODE | INSTRUCTION CODE | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| | opcode | | | | rd | | | | | | | rs1 | | | | | | | rs2 | | | | | | | rs3 | | | | | | |
| | 3 | 2 | 1 | 0 | 6 | 5 | 4 | 3 | 2 | 1 | 0 | 6 | 5 | 4 | 3 | 2 | 1 | 0 | 6 | 5 | 4 | 3 | 2 | 1 | 0 | 6 | 5 | 4 | 3 | 2 | 1 | 0 |
| simd-fmadd | 0 | 1 | 0 | 0 | | | | | | | | | | | | | | | | | | | | | | | | | | | | | |
| simd-fmsub | 0 | 1 | 0 | 1 | | | | | | | | | | | | | | | | | | | | | | | | | | | | | |
| simd-fnmsub | 0 | 1 | 1 | 0 | | | | | | | | | | | | | | | | | | | | | | | | | | | | | |
| simd-fnmadd | 0 | 1 | 1 | 1 | | | | | | | | | | | | | | | | | | | | | | | | | | | | | |
| cross-fmadd1 | 1 | 1 | 0 | 0 | | | | | | | | | | | | | | | | | | | | | | | | | | | | | |
| cross-fmadd2 | 1 | 1 | 0 | 1 | | | | | | | | | | | | | | | | | | | | | | | | | | | | | |
| cross-fmadd3 | 1 | 1 | 1 | 0 | | | | | | | | | | | | | | | | | | | | | | | | | | | | | |
| cross-fmadd4 | 1 | 1 | 1 | 1 | | | | | | | | | | | | | | | | | | | | | | | | | | | | | |

FIG. 18B

ORDINARY ARITHMETIC CODE / EXTENDED ARITHMETIC CODE

| | b_op 1 | b_op 0 | | e_op 1 | e_op 0 |
|---|---|---|---|---|---|
| fmadd | 0 | 0 | fmadd | 0 | 0 |
| fmsub | 0 | 1 | fmsub | 0 | 1 |
| fnmsub | 1 | 0 | fnmsub | 1 | 0 |
| fnmadd | 1 | 1 | fnmadd | 1 | 1 |
| fmadd | 0 | 0 | fmadd | 0 | 0 |
| fnmsub | 1 | 0 | fmadd | 0 | 0 |
| fmadd | 0 | 0 | fnmsub | 1 | 0 |
| fnmsub | 1 | 0 | fnmsub | 1 | 0 |

FIG. 18C

RECORDING CONTROL SIGNAL

| b_we | e_we |
|---|---|
| 1 | 1 |
| 1 | 1 |
| 1 | 1 |
| 1 | 1 |
| 1 | 1 |
| 1 | 1 |
| 1 | 1 |
| 1 | 1 |

FIG. 18D

REGISTER NUMBER ASSIGNMENT (ONLY MSB)

| b_rd [6] | b_rs1 [6] | b_rs2 [6] | b_rs3 [6] | e_rd [6] | e_rs1 [6] | e_rs2 [6] | e_rs3 [6] |
|---|---|---|---|---|---|---|---|
| 0 | rs1[6] | rs2[6] | 0 | 1 | ~rs1[6] | ~rs2[6] | 1 |
| 0 | rs1[6] | rs2[6] | 0 | 1 | ~rs1[6] | ~rs2[6] | 1 |
| 0 | rs1[6] | rs2[6] | 0 | 1 | ~rs1[6] | ~rs2[6] | 1 |
| 0 | rs1[6] | rs2[6] | 0 | 1 | ~rs1[6] | ~rs2[6] | 1 |
| 0 | rs1[6] | rs2[6] | 0 | 1 | rs1[6] | ~rs2[6] | 1 |
| 0 | ~rs1[6] | ~rs2[6] | 0 | 1 | rs1[6] | rs2[6] | 1 |
| 0 | ~rs1[6] | ~rs2[6] | 0 | 1 | ~rs1[6] | rs2[6] | 1 |
| 0 | ~rs1[6] | ~rs2[6] | 0 | 1 | ~rs1[6] | rs2[6] | 1 |

FIG. 19
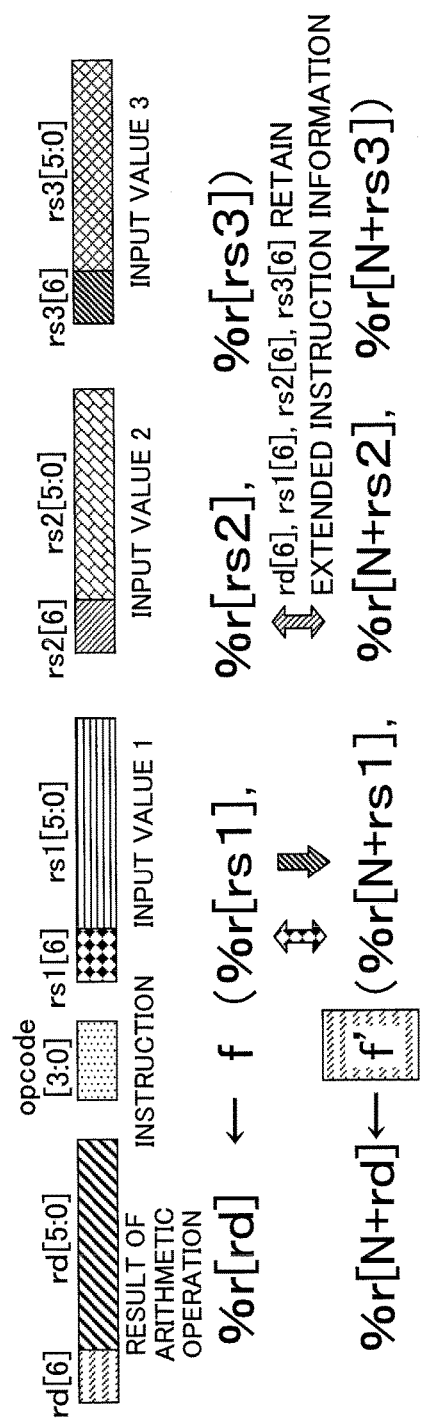
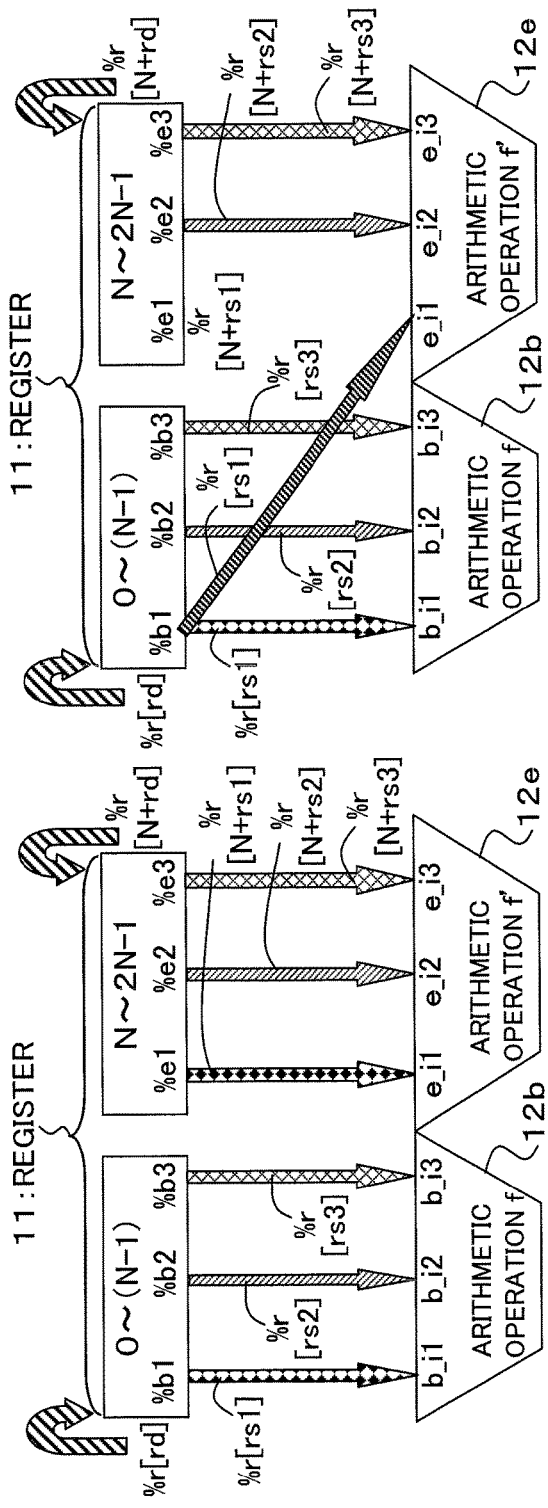

FIG. 22A

| INSTRUCTION KIND CODE | INSTRUCTION CODE |
|---|---|

| | opcode | | | | rd | | | | | | | rs1 | | | | | | | rs2 | | | | | | | rs3 | | | | | | |
|---|---|---|---|---|---|---|---|---|---|---|---|---|---|---|---|---|---|---|---|---|---|---|---|---|---|---|---|---|---|---|---|
| | 3 | 2 | 1 | 0 | 6 | 5 | 4 | 3 | 2 | 1 | 0 | 6 | 5 | 4 | 3 | 2 | 1 | 0 | 6 | 5 | 4 | 3 | 2 | 1 | 0 | 6 | 5 | 4 | 3 | 2 | 1 | 0 |
| simd-fmadd | 0 | 1 | 0 | 0 | | | | | | | | | | | | | | | | | | | | | | | | | | | | |
| simd-fmsub | 0 | 1 | 0 | 1 | | | | | | | | | | | | | | | | | | | | | | | | | | | | |
| simd-fnmsub | 0 | 1 | 1 | 0 | | | | | | | | | | | | | | | | | | | | | | | | | | | | |
| simd-fnmadd | 0 | 1 | 1 | 1 | | | | | | | | | | | | | | | | | | | | | | | | | | | | |

FIG. 22B

ORDINARY ARITHMETIC CODE                EXTENDED ARITHMETIC CODE

| | b_op | | A/A′ | e_op | |
|---|---|---|---|---|---|
| | 1 | 0 | | 1 | 0 |
| fmadd | 0 | 0 | fmadd/fnmsub | rd[6] | 0 |
| fmsub | 0 | 1 | fmsub/fnmadd | rd[6] | 1 |
| fnmsub | 1 | 0 | fnmsub/fmadd | ~rd[6] | 0 |
| fnmadd | 1 | 1 | fnmadd/fmsub | ~rd[6] | 1 |

FIG. 22C

RECORDING CONTROL SIGNAL

| b_we | e_we |
|---|---|
| 1 | 1 |
| 1 | 1 |
| 1 | 1 |
| 1 | 1 |

FIG. 22D

REGISTER NUMBER ASSIGNMENT (ONLY MSB)

| b_rd [6] | b_rs1 [6] | b_rs2 [6] | b_rs3 [6] | e_rd [6] | e_rs1[6] | e_rs2 [6] | e_rs3 [6] |
|---|---|---|---|---|---|---|---|
| 0 | rs1[6] | rs2[6] | 0 | 1 | ~rs1[6]^rs3[6] | ~rs2[6] | 1 |
| 0 | rs1[6] | rs2[6] | 0 | 1 | ~rs1[6]^rs3[6] | ~rs2[6] | 1 |
| 0 | rs1[6] | rs2[6] | 0 | 1 | ~rs1[6]^rs3[6] | ~rs2[6] | 1 |
| 0 | rs1[6] | rs2[6] | 0 | 1 | ~rs1[6]^rs3[6] | ~rs2[6] | 1 |

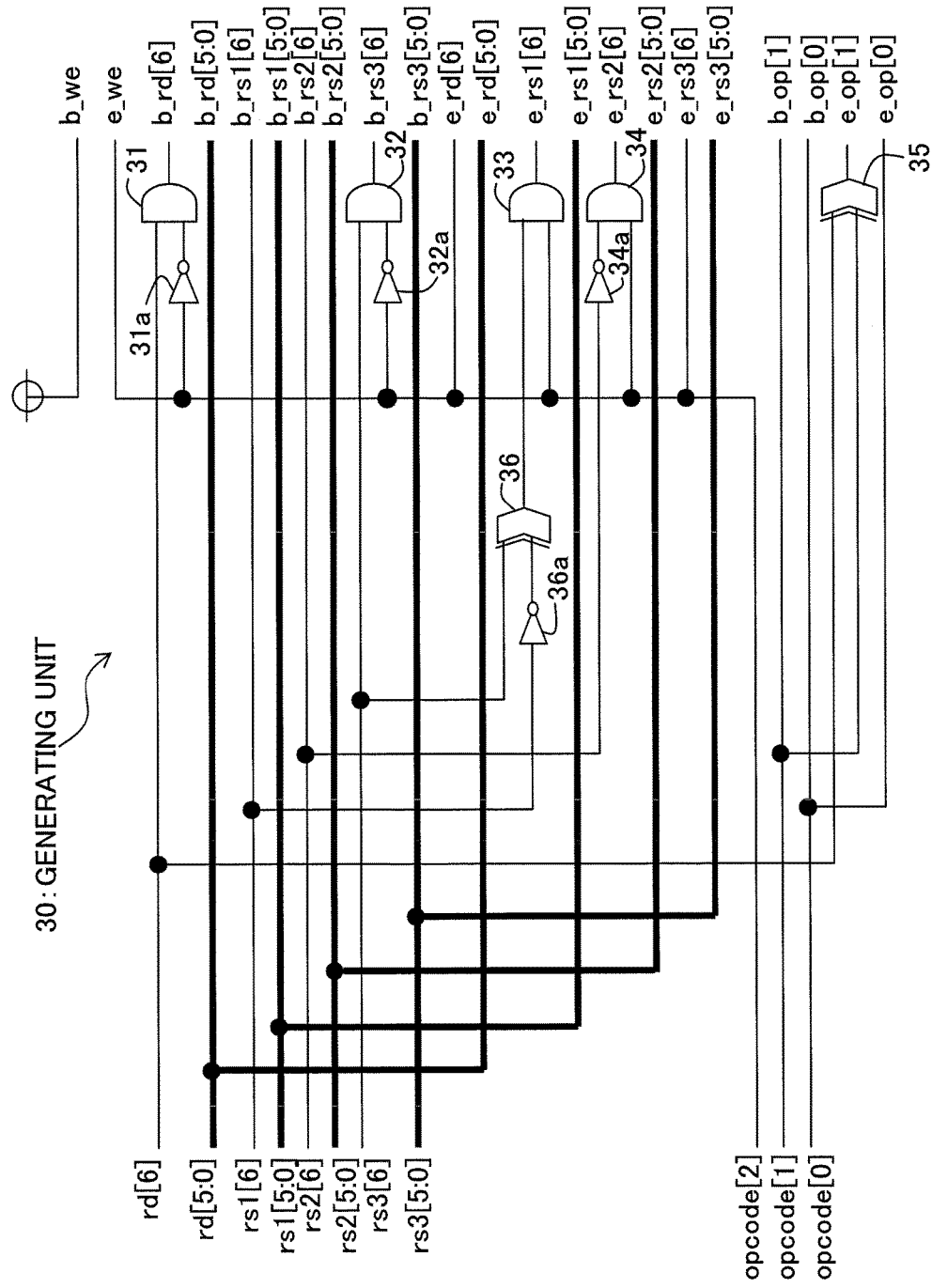

APPARATUS AND METHOD FOR PROCESSING AN INSTRUCTION THAT SELECTS BETWEEN SINGLE AND MULTIPLE DATA STREAM OPERATIONS WITH REGISTER SPECIFIER FIELD CONTROL

CROSS-REFERENCE TO RELATED APPLICATIONS

This application is based upon and claims the benefit of priority of the prior Japanese Patent Application No. 2008-073864, filed on Mar. 21, 2008, the entire contents of which are incorporated herein by reference.

FIELD

The embodiment discussed herein is a technique preferably used in an arithmetic operation, such as an imaginary-number matrix multiplication addition, with one or more floating-point multiply-add arithmetic operators.

BACKGROUND

Generally, an arithmetic operation that uses an imaginary number as an operand is realized by the following expression (1).

$$X + Yi \leftarrow X + Yi + (A + Bi)*(C + Di) = \\ X + A*C - B*D + (Y + A*D + B*C)i \quad (1)$$

Execution of this matrix multiplication-addition by the use of a single floating-point multiply-add arithmetic operator needs execution of four arithmetic operations of the following expressions (1-1) to (1-4). In other words, if a single floating-point multiply-add arithmetic operator accomplishes an imaginary-number matrix multiplication-addition, four instructions have to be issued to the arithmetic operator.

$$X \leftarrow X + A*C \quad (1\text{-}1)$$

$$Y \leftarrow Y + A*D \quad (1\text{-}2)$$

$$X \leftarrow X - B*D \quad (1\text{-}3)$$

$$Y \leftarrow Y + B*C \quad (1\text{-}4)$$

The Single Instruction stream Multiple Data stream (SIMD) scheme, in which a single instruction deals with a number of data streams, has been generally known for efficiency in execution of multiplication-addition by fewer instructions. An arithmetic operating unit adopting the SIMD scheme includes a register and two floating-point multiply-add arithmetic operators that perform the same arithmetic operation using operands (register values) stored in the register. The two floating-point multiply-add arithmetic operators are called an ordinary floating-point multiply-add arithmetic operator (ordinary arithmetic operator) and an extended floating-point multiply-add arithmetic operator (extended arithmetic operator).

Register values associated with specified register numbers on the first half region of the register are input into the ordinary operator and are to be used as operands for an arithmetic operation while register values associated with specified register numbers on the second half region of the register are input into the extended operator and are to be used as operands for an arithmetic operation. Here, a specified register number on the second half region of register is the sum of a specified register number of the first half region of the register and a predetermined offset. Assuming that the number of register numbers is 128, the offset is set to be 64.

With this configuration, a single instruction that assigns register numbers specifying register values to be output from the register to the ordinary arithmetic operator can also assign the register numbers specifying register values to be output from the register to the extended arithmetic operator. Namely, a single instruction can instruct two arithmetic operators to execute arithmetic operations. Therefore, an arithmetic operation which has needed four instructions can be realized by two instructions, so that throughput can be doubled.

[Patent document] Japanese Patent Application Publication Laid-Open (KOKAI) No. 2003-16051

However, an imaginary-number matrix multiplication-addition executed by the four arithmetic operations of above expressions (1-1) to (1-4) (i.e., four instructions) are not accomplished in an arithmetic operator adopting the SIMD scheme which is not modified in obedience to two instructions for the reasons of: the restriction on the register that the ordinary arithmetic operator uses the first half region of the register while the extended arithmetic operator uses the second half region of the register; and the restriction on an arithmetic operation that the ordinary arithmetic operator and the extended arithmetic operator carry out the same arithmetic operation.

SUMMARY

According to an aspect of the embodiment, there is provided an arithmetic operating apparatus including: a register storing operands that are to be used for an arithmetic operation; one or more arithmetic operators performing, in response to a first instruction that specifies operands that are to be read from the register and one or more of the arithmetic operations to be carried out by the arithmetic operators and that has a number of bits, the specified arithmetic operations specified by the first instruction using the operands specified by the first instruction; and a setting unit setting, in one or more unused bits of the first instruction which bits are not used in an ordinary process, an extended instruction information that instructs at least one of the register and the arithmetic operators to execute, according to the first instruction, an extended process different from the ordinary process.

According to another aspect of the embodiment, there is provided a method for performing an arithmetic operation in an arithmetic operation apparatus including a register storing operands that are to be used for an arithmetic operation and one or more arithmetic operators performing the arithmetic operation using operands read from the register, including: performing, at the arithmetic operators, in response to a first instruction that specifies operands that are to be read from the register and one or more of the arithmetic operations to be carried out by the arithmetic operators and that has a number of bits, the specified arithmetic operations specified by the first instruction using the operands specified by the first instruction; and setting, in one or more unused bits of the first instruction which bits are not used in an ordinary process, an extended instruction information that instructs at least one of the register and the arithmetic operators to execute, according to the first instruction, an extended process different from the ordinary process.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

Exemplary embodiments of the present invention will be described in detail based on the following figures, wherein:

FIG. 3 is a diagram briefly showing operation performed in a non-SIMD mode by an arithmetic operating unit included in the arithmetic operating apparatus of FIG. 1;

FIG. 4 is a diagram showing operation performed in a non-SIMD mode by an instruction code issuing unit and a generating unit included in the arithmetic operating apparatus of FIG. 1;

FIGS. 5A-5D are tables showing an instruction code, an arithmetic code, a register recording signal, and register number assignments (only MSBs) used in the non-SIMD mode by the arithmetic operating apparatus of FIG. 1;

FIG. 6 is a diagram briefly showing operation performed in a SIMD mode by the arithmetic operating unit included in the arithmetic operating apparatus of FIG. 1;

FIGS. 8A-8D are tables showing an instruction code, an arithmetic code, a register recording signal, and register number assignments (only MSBs) used in the SIMD mode by the arithmetic operating apparatus of FIG. 1;

FIGS. 11A-11D are tables showing an instruction code, an arithmetic code, a register recording signal, and register number assignments (only MSBs) used in the first mode of the use of unused bits by the arithmetic operating apparatus of FIG. 1;

FIGS. 18A-18D are tables showing an instruction code, an arithmetic code, a register recording signal, and register number assignments (only MSBs) used in the second mode of the use of unused bits by the arithmetic operating apparatus of FIG. 1;

FIGS. 19 and 20 are diagrams each briefly showing an operation performed in a third mode of the use of unused bits by the arithmetic operating unit of the arithmetic operating apparatus of FIG. 1;

FIGS. 22A-22D are tables showing an instruction code, an arithmetic code, a register recording signal, and register number assignments (only MSBs) used in the third mode of the use of unused bits by the arithmetic operating apparatus of FIG. 1;

FIG. 25 is a circuit diagram showing a specific exemplary of the generating unit in the arithmetic operating apparatus of FIG. 1.

DESCRIPTION OF THE PREFERRED EMBODIMENTS

A first embodiment will be apparent by description made with reference to accompanying drawings.

Figure 1:
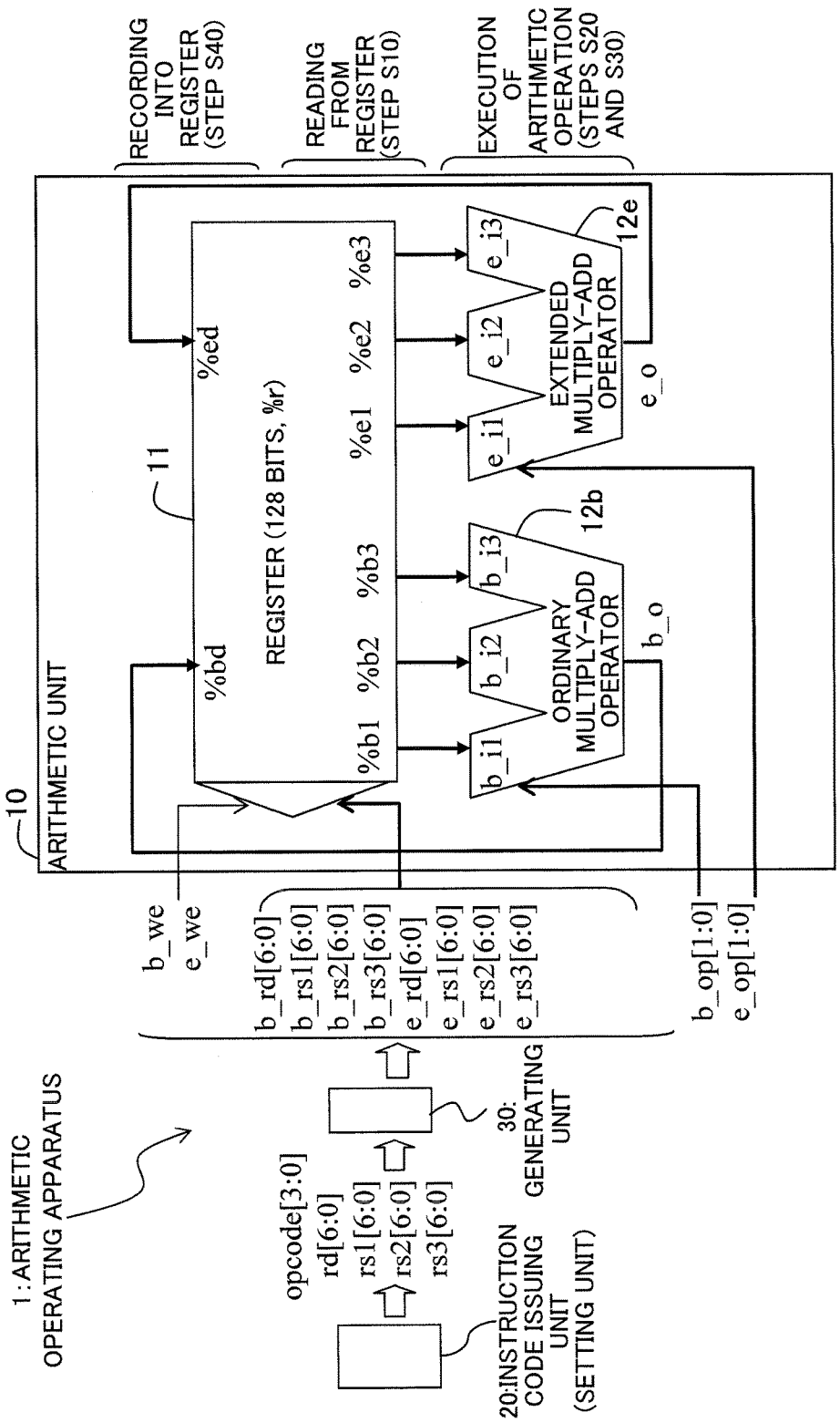
FIG. 1 is a block diagram schematically showing an arithmetic operating apparatus of a first embodiment.

(1) Configuration of the Arithmetic Operating Apparatus:

FIG. 1 is a block diagram schematically showing the configuration of the arithmetic operating apparatus according to the first embodiment. Arithmetic operating apparatus 1 shown in FIG. 1 includes arithmetic unit 10, instruction code issuing unit (setting unit) 20, and generating unit 30.

Arithmetic unit 10 includes register 11, ordinary floating-point multiply-add operator (also called an ordinary arithmetic operator or an arithmetic operator) 12b and extended floating-point multiply-add operator (also called an extended arithmetic operator or an arithmetic operator) 12e. Hereinafter, the ordinary floating-point multiply-add operator is also called the ordinary multiply-add operator, the ordinary arithmetic operator, and simply the arithmetic operator while the extended floating-point multiply-add operator is also called the extended multiply-add operator, the extended arithmetic operator, and simply the arithmetic operator.

Register 11 stores register values (data) specified by 2N register numbers 0 through 2N−1, where N=64 in the first embodiment. Register 11 stores operands and results of arithmetic operations performed by arithmetic operators 12b and 12e.

Arithmetic operating apparatus 1 of the first embodiment has a configuration capable of switching between adoption and non-adoption of the Single Instruction Multiple Data stream (SIMD) scheme in which a number (two in the present embodiment) of data streams are processed in response to a single instruction, specified by an instruction kind code (opcode), as detailed below. When the SIMD scheme is adopted, the entire region of register 11 is divided into two regions of the first half (the register number 0 through N−1) and the second half (the register number N through 2N−1), which are to be basically used by ordinary operator 12b and extended operator 12e, respectively.

Into the register 11, generating unit 30 that is to be detailed below inputs six output register numbers, two input register numbers, and an input-register recording control signal. Such six output register number specify six register values (operands for multiply-addition) three of which are to be output each of arithmetic operators 12b and 12d. Such two input register numbers specify destinations (addresses in register 11) into which register values representing results of arithmetic operations by arithmetic operators 12b and 12e are to be input and recorded. Such an input-register recording control signal selects and controls whether results of arithmetic operations carried out by arithmetic operators 12b and 12e are to be recorded into register 11.

In the illustrated example, a 7-bit value b_rd[6:0] serving as an input register number that specifies the destination of recording the result of an arithmetic operation performed by ordinary multiply-add operator 12b is input into register 11. Three 7-bit values b_rs1[6:0], b_rs2[6:0], and b_rs3[6:0] serving as three output register numbers that specify three register values (operands for multiplication-addition) to be output to ordinary multiply-add operator 12b from register 11 are input into register 11.

Similarly, a 7-bit value e_rd[6:0] serving as an input register number that specifies the destination of recording the result of an arithmetic operation performed by extended multiply-add operator 12e is input into register 11. Three 7-bit values e_rs1[6:0], e_rs2[6:0], e_rs3[6:0] serving as three output register numbers that specify three register values (operands for multiplication-addition) to be output to extended multiply-add operator 12e from register 11 are input into register 11.

These 7-bit values b_rd[6:0], b_rs1[6:0], b_rs2[6:0], b_rs3[6:0], e_rd[6:0], e_rs1[6:0], e_rs2[6:0], and e_rs3[6:0] are integers from 0 through 127 and specify register numbers that are to be used for multiplication-addition to be carried out by arithmetic operators 12b and 12e. In other words, four register numbers containing two register numbers of operands for multiplication, a register number of an operand for addition, and a register number of the destination of recording the result of an arithmetic operation are assigned to numbers 0 through 127 for each of arithmetic operators 12b and 12e. The region of register 11 defined by register numbers 0-63 is called the first-half region (segment) and the region defined by number 64-127 is called the second-half region (segment).

In the present embodiment, a register value at the register number n (n=0,1, 2, . . . , 127) is represented by %r[n]. For example, register values stored in the register numbers n=0, 1, . . . , 127 are represented by %r[0], %r[1], . . . , %r[127], respectively.

Among these register values %r[0], %r[1], . . . , %r[127], register numbers specified by an instruction are represented as follows. For example, assuming that four register values related to ordinary operator 12b are represented by %b1, %b2, %b3, and %bd, %b1 in the arithmetic operation of "b_rs1[6:0]←15" represents %r[15]. Similarly, assuming that four register values related to extended operator 12e are represented by %e1, %e2, %e3, and %ed, %e1 in the arithmetic operation of "e_rs1[6:0]←79" represents %r[79].

An input-register recording control signal mentioned above is represented by b_we and e_we. A control signal b_we is a 1-bit signal used for control related to the selection as to whether or not the result of a multiplication-addition performed by ordinary operator 12b is to be recorded into register 11. A control signal b_we is set to be "1" when the result is to be recorded and is set to be "0" when the result is not to be recorded. Similarly, a control signal e_we is a 1-bit signal used for control related to the selection as to whether or not the result of a multiplication-addition performed by extended operator 12e is to be recorded into register 11. A control signal e_we is set to be "1" when the result is to be recorded and is set to be "0" when the result is not to be recorded.

Each of arithmetic operators 12b and 12e is a three-input single-output floating-point multiply-add operator and is capable of switching arithmetic operations according to an arithmetic kind code (hereinafter simply called an arithmetic code") included in a set of an instruction issued from generating unit 30 that is described below. Ordinary multiply-accumulation operator 12b receives three register values %b1, %b2, and %b3 read from register 11 which values serve as input values b_i1, b_i2, and b_i3, and outputs a register value %bd that is an output value b_o representing the result of arithmetic operation to register 11.

Similarly, extended multiply-accumulation operator 12e receives three register values %e1, %e2, and %e3 read from register 11 which values serve as input values e_i1, e_i2, and e_i3, and outputs a register value %ed that is an output value e_o representing the result of arithmetic operation to register 11.

Specifically, ordinary multiply-accumulation operator 12b receives an arithmetic code b_op[1:0] from generating unit 30 and operands %b1, %b2, and %b3 from register 11, carries out an arithmetic operation specified by the arithmetic code b_op[1:0] using the input operands %b1, %b2, and %b3, and finally outputs the result data %bd of the arithmetic operation. In the same manner, extended multiply-accumulation operator 12e receives an arithmetic code e_op[1:0] from generating unit 30 and operands %e1, %e2, %e3 from register 11, and carries out an arithmetic operation specified by the arithmetic code e_op[1:0] using the input operands %e1, %e2, and %e3, and finally outputs the result data %ed of the arithmetic operation.

Here, 2-bits arithmetic codes b_op[1:0] and e_op[1:0] specify the following four arithmetic operations (arithmetic names) that are to be performed in arithmetic operators 12b and 12e.

TABLE 1

| ARITHMETIC NAME | ARITHMETIC CODE | DETAILED ARITHMETIC OPERATION |
| --- | --- | --- |
| fmadd | 00 | %rd ← %r1 * %r2 + %r3 |
| fmsub | 01 | %rd ← %r1 * %r2 − %r3 |
| fnmsub | 10 | %rd ← − %r1 * %r2 + %r3 |
| fnmadd | 11 | %rd ← − %r1 * %r2 − %r3 |

Instruction code issuing unit (setting unit) 20 issues an instruction code to arithmetic unit 10 through generating unit 30 and serves to function as a setting unit that is to be described below.

Here, an instruction code issued by instruction code issuing unit 20 is, as shown in the Tables 2 and 3 below, formed of an instruction kind code and four register number assignments. An instruction kind code is a 4-bit data pieces denoted by opcode[3:0], and can therefore specify 16 kinds of instructions. Each of four register number assignment is formed of seven bits and specifies a single register number from 0 through 127, as shown in FIGS. 5A, 8A, 11A, 18A, and 22A.

Table 2 below shows an instruction kind code, an instruction description, and a detailed arithmetic operation associated with the instruction kind code when opcode[3:2] is set to "00" to adopt non-SIMD scheme that are to be described below with reference to FIGS. 3 to 5. In the non-SIMD mode, arithmetic unit 10 carries out a multiplication-addition using only ordinary operator 12b, not using extended operator 12e, on the register values over the entire register 11.

Table 3 below shows an instruction kind code, and instruction description, and a detailed arithmetic operations which are associated with the instruction kind code and which are to be carried out by arithmetic ordinary operators 12b and extended operator 12e when opcode[3:2] is set to "01" to adopt the SIMD scheme that are to be described below with reference to FIGS. 6 to 8. In arithmetic unit 10 in the SIMD mode, register values associated with specified register numbers on the first half region of register 11 are input into ordinary multiply-accumulation operator 12b to serve as an operand for an arithmetic operation while register values associated with specified register numbers on the second half region of register 11 are input into extended multiply-accumulation operator 12e to serve as an operand for an arithmetic operation. Here, a specified register number on the second half region of register 11 is sum of a specified register number of the first half region of register 11 and a predetermined offset (in the first embodiment, 64). The same applies to a register number to specify destinations of storing the results of arithmetic operations performed by arithmetic operators 12b and 12e. In adoption of the SIMD scheme, although each of the four register number assignments has seven bits (i.e., rd[6:0], rs1[6:0], rs2[6:0], and rs3[6:0]), each register number assignment uses 6 bits (i.e., rd[5:0], rs1[5:0], rs2[5:0], and rs3[5:0]) out of the seven bits and therefore one bit (i.e., rd[6], rs1[6], rs2[6], and rs3[6]) of each register number assignment comes to be unused.

Extended instruction information that uses one or more unused bits can be the following two types of:

(a1) extended instruction information, which will be detailed below with reference to FIGS. 9-24B, to switch an operand to be output to one of arithmetic operators 12b and 12e from an operand on a region associated with the arithmetic operation to an operand in the remaining region except for the region of register 11 associated with the one arithmetic operator. According to this extended instruction information, each of arithmetic operators 12b and 12e can execute an arithmetic operation using register values on both the first half region and the second half region of register 11.

(a2) extended instruction information, which will be detailed below with reference to FIGS. 20, 22B, 23A, 23B, 24A, and 24B, to instruct each of arithmetic operators 12b and 12e to switch arithmetic operation to be carried out by the arithmetic operator. With this extended instruction information, arithmetic operations that are to be carried out by arithmetic operators 12b and 12e can be switched independently of each other and arithmetic operators 12b and 12e can thereby carry out different arithmetic operations.

As detailed below with reference to FIGS. 4, 7, 10, 17, 21, and 25, generating unit 30 generates an instruction set that is to be input into arithmetic unit 10 on the basis of an instruction set (an instruction code) and issued by instruction code issuing unit (setting section) 20.

Here, an instruction code issued from instruction code issuing unit 20 is a 32-bit data piece formed of opcode[3:0], rd[6:0], rs1[6:0], rs2[6:0], and rs3[6:0]. An instruction set which is generated by generating unit 30 and which is to be input into arithmetic unit 10 is a 62-bit data piece formed of b_we, e_we, b_rd[6:0], b_rs1[6:0], b_rs2[6:0], b_rs3[6:0], e_rd[6:0], e_rs1[6:0], e_rs2[6:0], e_rs3[6:0], b_op[1:0], and

TABLE 2

| ARITHMETIC KIND CODE | opcode [3:0] | INSTRUCTION DESCRIPTION | DETAILED ARITHMETIC OPERATION |
|---|---|---|---|
| fmadd | 0000 | fmadd %f[rd],%f[s1],%f[s2],%f[s3] | %f[rd]← %f[rs1]*%f[rs2]+%f[rs3] |
| fmsub | 0001 | fmsub %f[rd],%f[s1],%f[s2],%f[s3] | %f[rd]← %f[rs1]*%f[rs2]−%f[rs3] |
| fnmsub | 0010 | fnmsub %f[rd],%f[s1],%f[s2],%f[s3] | %f[rd]←−%f[rs1]*%f[rs2]+%f[rs3] |
| fnmadd | 0011 | fnmadd %f[rd],%f[s1],%f[s2],%f[s3] | %f[rd]←−%f[rs1]*%f[rs2]−%f[rs3] |

TABLE 3

| ARITHMETIC KIND CODE | opcode [3:0] | INSTRUCTION DESCRIPTION | DETAILED ARITHMETIC OPERATION BY ORDINARY ARITHMETIC OPERATOR | DETAILED ARITHMETIC OPERATION BY EXTENDED ARITHMETIC OPERATOR |
|---|---|---|---|---|
| simd-fmadd | 0100 | simd-fmadd %f[rd],%f[s1],%f[s2],%f[s3] | %b[rd]← %b[rs1]*%b[rs2]+%b[rs3] | %e[rd]← %e[rs1]*%e[rs2]+%e[rs3] |
| simd-fmsub | 0101 | simd-fmsub %f[rd],%f[s1],%f[s2],%f[s3] | %b[rd]← %b[rs1]*%b[rs2]−%b[rs3] | %e[rd]← %e[rs1]*%e[rs2]−%e[rs3] |
| simd-fnmsub | 0110 | simd-fnmsub %f[rd],%f[s1],%f[s2],%f[s3] | %b[rd]←−%b[rs1]*%b[rs2]+%b[rs3] | %e[rd]←−%e[rs1]*%e[rs2]+%e[rs3] |
| simd-fnmadd | 0111 | simd-fnmadd %f[rd],%f[s1],%f[s2],%f[s3] | %b[rd]←−%b[rs1]*%b[rs2]−%b[rs3] | %e[rd]←−%e[rs1]*%e[rs2]−%e[rs3] |

One of the functions of the setting unit achieved by instruction code issuing unit 20 is to set extended instruction information in one or more of the unused bits in an instruction (an instruction set). Such extended instruction information instructs at least one of register 11 and arithmetic operators 12b and 12e to execute an extended process, being different from an ordinary process, that is to be executed in accordance with the same instruction.

Such unused bits are one or more of the most significant bits (MSBs) rd[6], rs1[6], rs2[6], and rs3[6] of register number specifying fields that have come to be unused when arithmetic operating apparatus 1 adopts the SIMD mode.

e_op[1:0]. Namely, a 32-bit instruction code from instruction code issuing unit 20 is converted by generating unit 30 into a 62-bit instruction set that is to be input into arithmetic unit 10.

At that time, generating unit 30 generates an instruction based on extended instruction information which is set in one or more unused bits, as detailed below with reference to FIGS. 10, 11D, 17, 18D, 21, 22B, 22D and 25. In other words, on the basis of the extended instruction information set in one or more unused bits and information set in bits except for the unused bits, generating unit 30 has a function to generate an extended instruction and output the generated extended instruction, as an instruction set, to at least one of register 11 and arithmetic operators 12b and 12e. Here, such an extended instruction instructs execution of extended processes defined by the extended instruction information, such as the above item (a1) and (a2).

[2] Basic Operation of the Arithmetic Unit:

Here, with reference to flow chart FIG. 2, a description will be made in relation to a basic operation (process) carried out by arithmetic unit 10 of arithmetic operating apparatus 1 shown in Fig.

Figure 2:
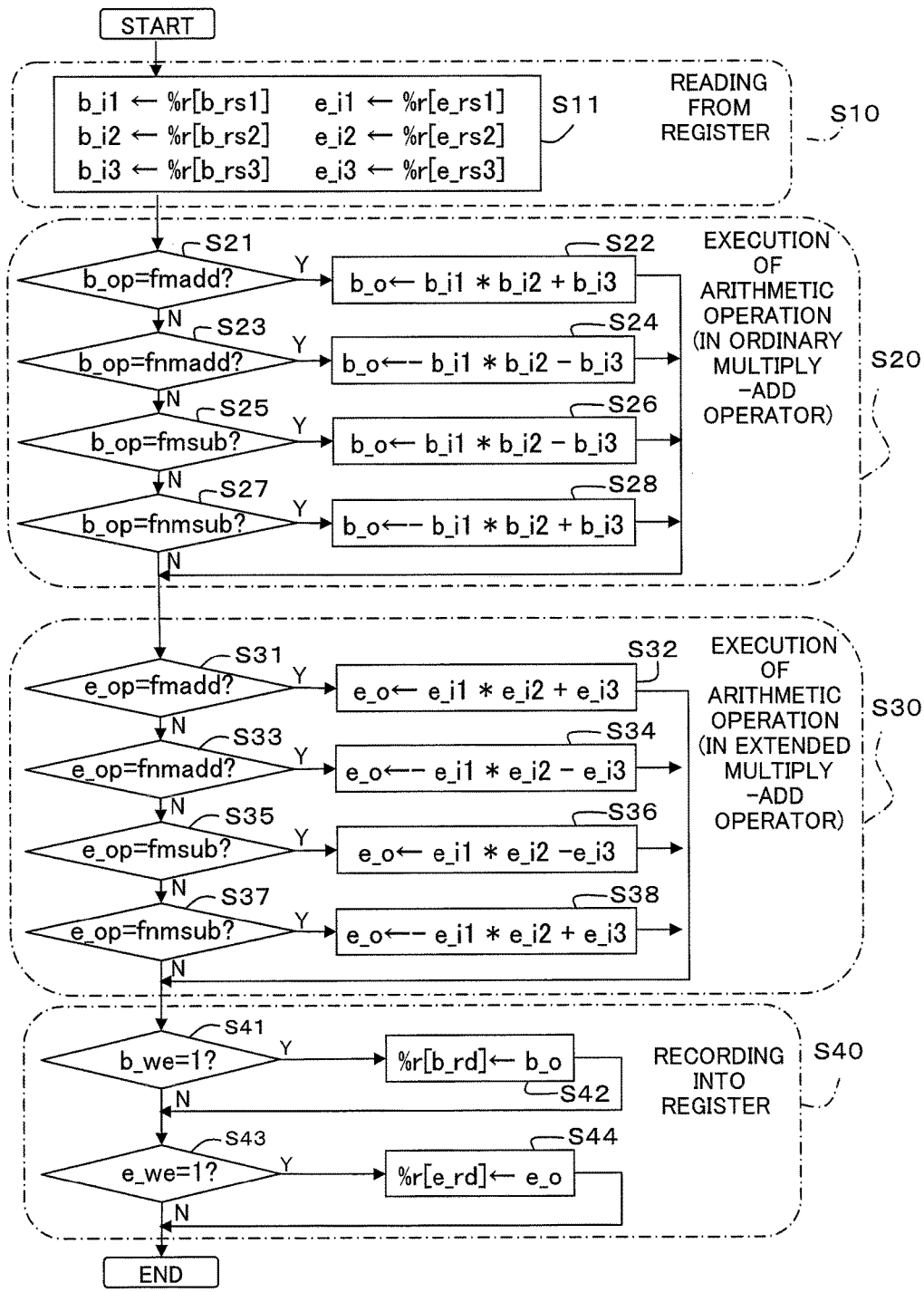
FIG. 2 is a flow diagram showing a succession of basic procedural steps performed in the arithmetic operating apparatus according to the first embodiment.

Prior to the execution of procedural steps shown in flow diagram FIG. 2, a step of issuing an instruction code (including a setting step) and a step of generating are performed respectively at instruction code issuing unit 20 and generating unit 30 in arithmetic operating apparatus 1, but these steps do not appear in the drawing.

In the setting step, the function as the setting unit of instruction code issuing unit 20 sets extended instruction information in one or more unused bits in an instruction sets as described above. The generating step causes generating unit 30 to convert an instruction code from instruction code issuing unit 20 into an instruction set that is to be input into arithmetic unit 10. In this conversion, an instruction to be generated is based on the extended instruction information set in one or more unused bits.

Upon inputting an instruction set including b_we, e_we, b_rd, b_rs1, b_rs2, b_rs3, e_rd, e_rs1, e_rs2, e_rs3, b_op, and e_op that has been generated by generating unit 30 (the generating step) into arithmetic unit 10, the procedure first reads data from register 11 (step S10). In the reading step from the register, register values %r[b_rs1], %r[b_rs2], %r[b_rs3], %r[e_rs1], %r[e_rs2], %r[e_rs3] are input from register 11 to arithmetic operators 12b and 12e to serve as input values b_i1, b_i2, b_i3, e_i1, e_i2, e_i3 (step S11).

After that, on the basis of the register values read in the step S10 (S11), a step (step S20) of performing an arithmetic operation by ordinary operator 12b and a step (step S30) of performing an arithmetic operation by extended operator 12e take place.

The step S20 first judges whether or not the arithmetic code b_op is "00" that specifies an arithmetic operation having the arithmetic operation name fmadd (step S21). If the result of the judgment in step S21 is positive (Y route in step S21), ordinary operator 12b executes the arithmetic operation "b_i1*b_i2+b_i3" and outputs the value b_o representing the result of the arithmetic operation to register 11 (step S22). Then the procedure proceeds to step S30.

Conversely, if the result of the judgment in step S21 is negative (N route in step S21), a judgment is made as to whether or not the arithmetic code b_op is "11" that specifies an arithmetic operation having the arithmetic operation name fnmadd (step S23). If the result of the judgment in step S23 is positive (Y route in step S23), ordinary operator 12b executes the arithmetic operation "−b_i1*b_i2−b_i3" and outputs the value b_o representing the result of the arithmetic operation to register 11 (step S24). Then the procedure proceeds to step S30.

Conversely, if the result of the judgment in step S23 is negative (N route in step S23), a judgment is made as to whether or not the arithmetic code b_op is "01" that specifies an arithmetic operation having the arithmetic operation name fmsub (step S25). If the result of the judgment in step S25 is positive (Y route in step S25), ordinary operator 12b executes the arithmetic operation "b_i1*b_i2−b_i3" and outputs the value b_o representing the result of the arithmetic operation to register 11 (step S26). Then the procedure proceeds to step S30.

Conversely, if the result of the judgment in step S25 is negative (N route in step S25), a judgment is made as to whether or not the arithmetic code b_op is "10" that specifies an arithmetic operation having the arithmetic operation name fnmsub (step S27). If the result of the judgment in step S27 is positive (Y route in step S27), ordinary operator 12b executes the arithmetic operation "−b_i1*b_i2+b_i3" and outputs the value b_o representing the result of the arithmetic operation to register 11 (step S28). Then the procedure proceeds to step S30. Also if the result of the judgment in step S27 is negative (N route in step S27), the procedure proceeds to step S30.

The step S30 first judges whether or not the arithmetic code e_op is "00" that specifies an arithmetic operation having the arithmetic operation name fmadd (step S31). If the result of the judgment in step S31 is positive (Y route in step S31), extended operator 12e executes the arithmetic operation "e_i1*e_i2+e_i3" and outputs the value e_o representing the result of the arithmetic operation to register 11 (step S32). Then the procedure proceeds to step S40.

Conversely, if the result of the judgment in step S31 is negative (N route in step S31), a judgment is made as to whether or not the arithmetic code e_op is "11" that specifies an arithmetic operation having the arithmetic operation name fnmadd (step S33). If the result of the judgment in step S33 is positive (Y route in step S33), extended operator 12e executes the arithmetic operation "−e_i1*e_i2−e_i3" and outputs the value e_o representing the result of the arithmetic operation to register 11 (step S34). Then the procedure proceeds to step S40.

Conversely, if the result of the judgment in step S33 is negative (N route in step S33), a judgment is made as to whether or not the arithmetic code e_op is "01" that specifies an arithmetic operation having the arithmetic operation name fmsub (step S35). If the result of the judgment in step S35 is positive (Y route in step S35), extended operator 12e executes the arithmetic operation "e_i1*e_i2−e_i3" and outputs the value e_o representing the result of the arithmetic operation to register 11 (step S36). Then the procedure proceeds to step S40.

Conversely, if the result of the judgment in step S35 is negative (N route in step S35), a judgment is made as to whether or not the arithmetic code e_op is "10" that specifies an arithmetic operation having the arithmetic operation name fnmsub (step S37). If the result of the judgment in step S37 is positive (Y route in step S37), extented operator 12e executes the arithmetic operation "−e_i1*e_i2+e_i3" and outputs the value e_o representing the result of the arithmetic operation to register 11 (step S38). Then the procedure proceeds to step S40. Also if the result of the judgment in step S37 is negative (N route in step S37), the procedure proceeds to step S40.

FIG. 2 appears step S30 to be carried out after the step S30, but step S20 is actually performed in parallel to execution of step S30. The order of execution of steps S21, S23, S25, and S27 and the order of execution of steps S31, S33, S35, and S37 are not limited to those described in FIG. 2.

In step S40, on the basis of the control signals b_we and e_we and specified register number b_rd and e_rd, recording the results of arithmetic operations carried out by arithmetic operators 12b and 12e into register 11 is controlled.

Specifically, a judgment is made as to whether or not the control signal b_we is "1" (step S41). If the result of the judgment in step S41 is positive (Y route in step S41), the output value b_o from ordinary operator 12b is represented by a register value %r[b_rd], which is then recorded into register 11 (step S42).

Conversely, if the result of the judgment in step S41 is negative (N route in step S41) or if the recording in step S42 has been completed, another judgment is made as to whether or not the control signal e_we is 1 (step S43). If the result of the judgment in step S43 is positive (Y route in step S43), the output value e_o from extended operator 12e is represented by the register value %r[e_rd], which is recorded into register 11 (step S44). If the result of the judgment in step S43 is negative (N route in step S43) or if the recording in step S44 has been completed, arithmetic unit 10 terminates the procedure.

[3] Operation of the Arithmetic Operating Apparatus in the Non-SIMD Mode:

As described above with reference to Table 2, when arithmetic operating apparatus 1 selects the non-SIMD mode, "00" is assigned to the two significant bits opcode[3:2] of an instruction kind code issued by instruction code issuing unit 20. Hereinafter, an operation performed by arithmetic operating apparatus 1 in the non-SIMD mode will be now described with reference to FIGS. 3, 4, and 5A-5D.

FIG. 3 briefly shows an operation performed during the non-SIMD mode by arithmetic unit 10 of arithmetic operating apparatus 1 shown in FIG. 1; FIG. 4 shows operations performed during the non-SIMD mode by instruction code issuing unit 20 and generating unit 30 included in arithmetic operating apparatus 1 shown in FIG. 1; and FIGS. 5A-5D specifically shows an instruction code, an arithmetic code, a register recording signal, and register number assignments (only the MSBs) in arithmetic operating apparatus 1 shown in FIG. 1 in the non-SIMD mode.

As shown in FIG. 3, during the non-SIMD mode, arithmetic unit 10 of arithmetic operating apparatus 1 carries out arithmetic operation of multiplication-addition on the data over the entire region of register 11 only with ordinary operator 12b, i.e., without extended operator 12e. In other words, according to an instruction code opcode[1:0] and input values from register 11, ordinary operator 12b carries out an arithmetic operation, the result of which is recorded into register 11 in obedience to a value of the control signal b_we.

In this non-SIMD mode, as shown FIGS. 4 and 5C, the control signal e_we is always set to be 0, the result of an arithmetic operation performed by extended operator 12e is not recorded into register 11. The four register number assignments rd[6:0], rs1[6:0], rs2[6:0], and rs3[6:0] issued by instruction code issuing unit 20 each occupies all of the seven bits and therefore assign four register values from the entire region of register 11 as illustrated in FIG. 5A.

In the non-SIMD mode, generating unit 30 converts the instruction code opcode[3:0] and four register number assignments rd[6:0], rs1[6:0], rs2[6:0], and rs3[6:0] issued by instruction code issuing unit 20 are converted as shown in FIG. 4, and an instruction set b_we, e_we, b_rd[6:0], b_rs1[6:0], b_rs2[6:0], b_rs3[6:0], e_rd[6:0], e_rs1[6:0], e_rs2[6:0], e_rs3[6:0], b_op[1:0], and e_op[1:0] is then input into arithmetic unit 10.

Here, an arithmetic code b_op[1:0] for ordinary operator 12b is represented by the value opode[1:0] on the last two bits in an instruction kind code included in an instruction code, as shown in FIGS. 4 and 5B. In the non-SIMD mode, as shown FIGS. 4 and 5C, the control signal b_we for recording into register 11 from ordinary operator 12b is set to 1, the result of an arithmetic operation performed by ordinary operator 12b is recorded into register 11.

On the other hand, an arithmetic code e_op[1:0] for extended operator 12e is fixed to "00" as shown in FIGS. 4 and 5B. At this time, as shown in FIGS. 4 and 5C, a control signal e_we for recoding into register 11 from extended operator 12e is set to 0, so that the result of an arithmetic operation performed by extended operator 12e is not recorded into register 11.

Further, as shown in FIGS. 4 and 5D, four 7-bit register number assignments rd[6:0], rs1[6:0], rs2[6:0], and rs3[6:0] serves as register number assignments b_rd[6:0], b_rs1[6:0], and b_rs2[6:0], b_rs3[6:0] of ordinary operator 12b, which are then output to register 11. In contrast, register number assignments e_rd[6:0], e_rs1[6:0], e_rs2[6:0], and e_rs3[6:0] for extended operator 12e are all set to be 0, as shown in FIGS. 4 and 5D.

Next, description will now be made in relation to a detailed operation in the non-SIMD mode to execute an arithmetic operation, for example fnmsub %f80, %f10, %f20, and %f40 that is expressed blow:

$$\%f[80] \leftarrow -\%f[10]*\%f[20]+\%f[40]$$

In the execution of the above arithmetic operation, values of an instruction kind code opcode[3:0] and values of register number assignments rd[6:0], rs1[6:0], rs2[6:0], and rs3[6:0] assigned by an instruction code shown in Table 4 below are converted into values serving as an input signal into ordinary operator 12b shown in Table 5 below, that is, an arithmetic code b_op[1:0] and register number assignments b_rd[6:0], b_rs1[6:0], b_rs2[6:0], b_rs3[6:0], which are then input into register 11. Values of arithmetic code e_op[1:0] and register number assignments e_rd[6:0], e_rs1[6:0], e_rs2[6:0], e_rs3[6:0] for extended operator 12e are all set to be 0, as shown in Table 5 below. A control signal b_we for recording into register 11 from ordinary operator 12b is set to be 1, so that the result of an arithmetic operation carried out by ordinary operator 12b is represented by a register value %r[80], which is then recorded into register 11. A control signal e_we for recording into register 11 from extended operator 12e is set to be 0.

[Table 4]

TABLE 4

| INSTRUCTION CODE | VALUE |
|---|---|
| opcode[3:0] | 0010 (fnmsub) |
| rd[6:0] | 1010000 (80) |
| rs1[6:0] | 0001010 (10) |
| rs2[6:0] | 0010100 (20) |
| rs3[6:0] | 0101000 (40) |

TABLE 5

| INPUT SIGNAL | VALUE |
|---|---|
| b_op[1:0] | 10 (fnmsub) |
| b_we | 1 (fixed value) |
| e_op[1:0] | 00 (fixed value) |
| e_we | 0 (fixed value) |
| b_rd[6:0] | 1010000 (80) |
| b_rs1[6:0] | 0001010 (10) |
| b_rs2[6:0] | 0010100 (20) |
| b_rs3[6:0] | 0101000 (40) |
| e_rd[6:0] | 0000000 (fixed value) |
| e_rs1[6:0] | 0000000 (fixed value) |
| e_rs2[6:0] | 0000000 (fixed value) |
| e_rs3[6:0] | 0000000 (fixed value) |

[4] Operation of the Arithmetic Operating Apparatus in the SIMD Mode:

As described above with reference to Table 3, when arithmetic operating apparatus 1 selects the SIMD mode, "01" is assigned to the two significant bits opcode[3:2] of an instruction kind code issued by instruction code issuing unit 20. Hereinafter, an operation performed by arithmetic operating apparatus 1 in the SIMD mode will now be described with reference to FIGS. 6, 7, and 8A-8D.

FIG. 6 briefly shows an operation performed during the SIMD mode by arithmetic unit 10 of arithmetic operating apparatus 1 shown in FIG. 1; FIG. 7 shows operations performed during the SIMD mode by instruction code issuing unit 20 and generating unit 30 of arithmetic operating apparatus 1 shown in FIG. 1; and FIGS. 8A-8D specifically shows an instruction code, an arithmetic code, a register recoding signal, and register number assignments (only the MSBs) of arithmetic operating apparatus 1 shown in FIG. 1.

As shown in FIG. 6, during the SIMD mode, in arithmetic unit 10 of arithmetic operating apparatus 1, register values at specified register numbers on the first half region of register serving as operands for an arithmetic operation are input into ordinary operator 12b, and similarly, register values at specified register numbers on the second half region of register 11 serving as operands for an arithmetic operation into extended operator 12e. Here, specified register numbers for extended operator 12e are each represented by the sum of a specified register number for ordinary operator 12b and a predetermined offset value N (in the illustrated example, N=64). In other words, arithmetic operators 12b and 12e perform the same arithmetic operation specified by an instruction kind code opcode[1:0] on different input values (different register values). The results of the arithmetic operations executed by arithmetic operators 12b and 12e are recorded into the first half region and the second half region of register 11, respectively.

At that time, four register number assignments rd[6:0], rs1[6:0], rs2[6:0], and rs3[6:0] issued by instruction code issuing unit 20 occupy last six bits rd[5:0], rs1[5:0], rs2[5:0], and rs3[5:0] out of the seven bits, respectively. Such a set of an instruction code simultaneously assigns register numbers for ordinary operator 12b and those for extended operator 12e. As a consequence, adaptation of the SIMD scheme does not use the MSBs rd[6], rs1[6], rs2[6], and rs3[6] of the register number assignments, as shown in FIG. 8A.

Figure 7:
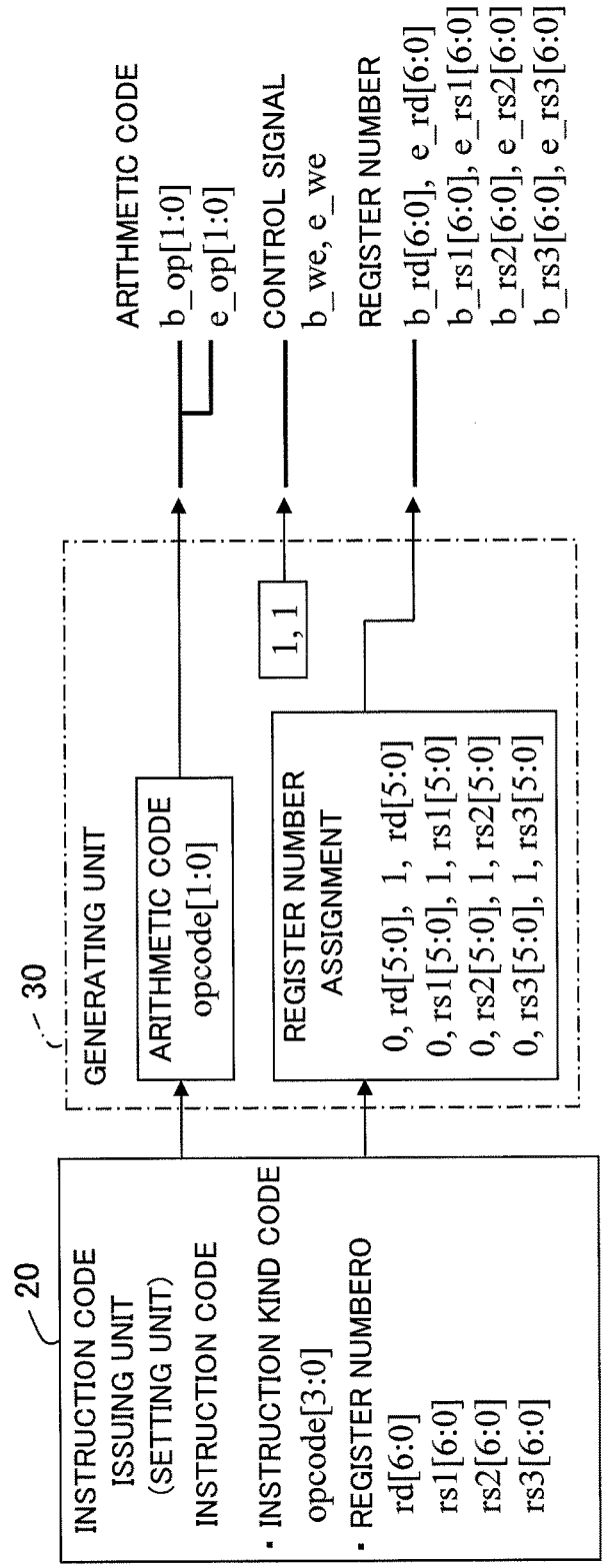
FIG. 7 is a diagram showing operation performed in a SIMD mode by the instruction code issuing unit and the generating unit included in the arithmetic operating apparatus of FIG. 1.

In the SIMD mode, generating unit 30 converts the instruction code opcode[3:0] and four register number assignments rd[6:0], rs1[6:0], rs2[6:0], and rs3[6:0] issued by instruction code issuing unit 20 as shown in FIG. 7 and an instruction set b_we, e_we, b_rd[6:0], b_rs1[6:0], b_rs2[6:0], b_rs3[6:0], e_rd[6:0], e_rs1[6:0], e_rs2[6:0], e_rs3[6:0], b_op[1:0], and e_op[1:0] is input into arithmetic unit 10.

Here, each of arithmetic codes b_op[1:0] and e_op[1:0] respectively for ordinary operator 12b and extended operator 12e is represented by the value opcode[1:0] on the last two bits in an instruction kind code included in an instruction code, as shown in FIGS. 7 and 8B. An identical arithmetic code is always input into both arithmetic operators 12b and 12e, which in response execute the same arithmetic operation (i.e., the same arithmetic kind).

As shown in FIGS. 7 and 8C, control signals b_we and e_we for recording into register 11 respectively from arithmetic operators 12b and 12e are set to be the fixed value "1" in the SIMD mode. This records the results of the arithmetic operations executed by arithmetic operators 12b and 12e into the first half region and the second half region of register 11, respectively.

As shown in FIG. 7, the last 6 bits rd[5:0], rs1[5:0], rs2[5:0], and rs3[5:0] of the four register number assignments included in an instruction code are input into register 11 to serve as register number assignments b_rd[5:0], b_rs1[5:0], b_rs2[5:0], and b_rs3[5:0] for ordinary operator 12b. Simultaneously, the same data pieces of rd[5:0], rs1[5:0], rs2[5:0], and rs3[5:0] are input into register 11 to serve also as register number assignments e_rd[5:0], e_rs1[5:0], e_rs2[5:0], and e_rs3[5:0] for extended operator 12e.

In addition, as shown in FIGS. 7 and 8D, the MSBs b_rd[6], b_rs1[6], b_rs2[6], and b_rs3[6] of the register number assignments for ordinary operator 12b are set to be the fixed value "0" and the MSBs e_rd[6], e_rs1[6], e_rs2[6], and e_rs3[6] of the register number assignments for extended operator 12e are set to be the fixed value "1". With these MSBs, ordinary operator 12b uses register values in the first half region (register number 0 through 63) of register 11 and extended operator 12e uses register values in the second half region (register number 64-127), which are defined in terms of sums of the register numbers for ordinary operator 12b and 64.

Next, description will be made in relation to detailed operation carried out in the SIMD mode to execute arithmetic operation, for example, simd-fnmsub %f40, %f10, %f20, %f30.

In this event, arithmetic operators 12b and 12e of arithmetic unit 10 carry out different arithmetic operations shown below:

at ordinary operator 12b,

%r[40]←−%r[10]*%r[20]+%r[30]

at extended operator 12e,

%r[104]←−%r[74]*%r[84]+%r[94]

In the SIMD mode, values of the instruction kind code opcode[3:0] and register number assignments rd[6:0], rs1[6:0], rs2[6:0], and rs3[6:0] specified in the instruction code in Table 6 below are converted into values serving as an input signal into arithmetic operators 12b and 12e shown in the following Table 7 and are then input into the corresponding operators. In other words, register number assignments for ordinary operator 12b and register number assignments for extended operator 12e have the same last six bits represented by rd[5:0], rs1[5:0], rs2[5:0], and rs3[5:0], and have the fixed values 0 and 1 that are to be input into the MSBs, respectively. The same arithmetic code "10" is input into the arithmetic code b_op[1:0] for ordinary operator 12b and into the arithmetic code e_op[1:0] for extended operator 12e. Thereby, the different four input values and the same arithmetic code are input into arithmetic operators 12b and 12e from register 11, and arithmetic operators 12b and 12e in response execute the same arithmetic operation on different input values. Since the control signals b_we and e_we for recording into register 11 are both set to be "1", the result of the arithmetic operation performed by ordinary operator 12b takes the register value %r[40] that is to be recorded into the first half region of register 11; and the result of the arithmetic operation performed by extended operator 12e takes the register value %r[104] that is to be recorded into the second half region of register 11.

TABLE 6

| INSTRUCTION CODE | VALUE |
| --- | --- |
| opcode[3:0] | 0110 (simd-fnmsub) |
| rd[6:0] | 0101000 (40) |
| rs1[6:0] | 0001010 (10) |
| rs2[6:0] | 0010100 (20) |
| rs3[6:0] | 0011110 (30) |

TABLE 7

| INPUT SIGNAL | VALUE |
| --- | --- |
| b_op[1:0] | 10 (fnmsub) |
| b_we | 1 (fixed value) |
| e_op[1:0] | 10 (fnmsub) |
| e_we | 1 (fixed value) |
| b_rd[6:0] | 0101000 (40) |
| b_rs1[6:0] | 0001010 (10) |
| b_rs2[6:0] | 0010100 (20) |
| b_rs3[6:0] | 0011110 (30) |
| e_rd[6:0] | 1101000 (104) |
| e_rs1[6:0] | 1001010 (74) |
| e_rs2[6:0] | 1010100 (84) |
| e_rs3[6:0] | 1011110 (94) |

Figure 9:
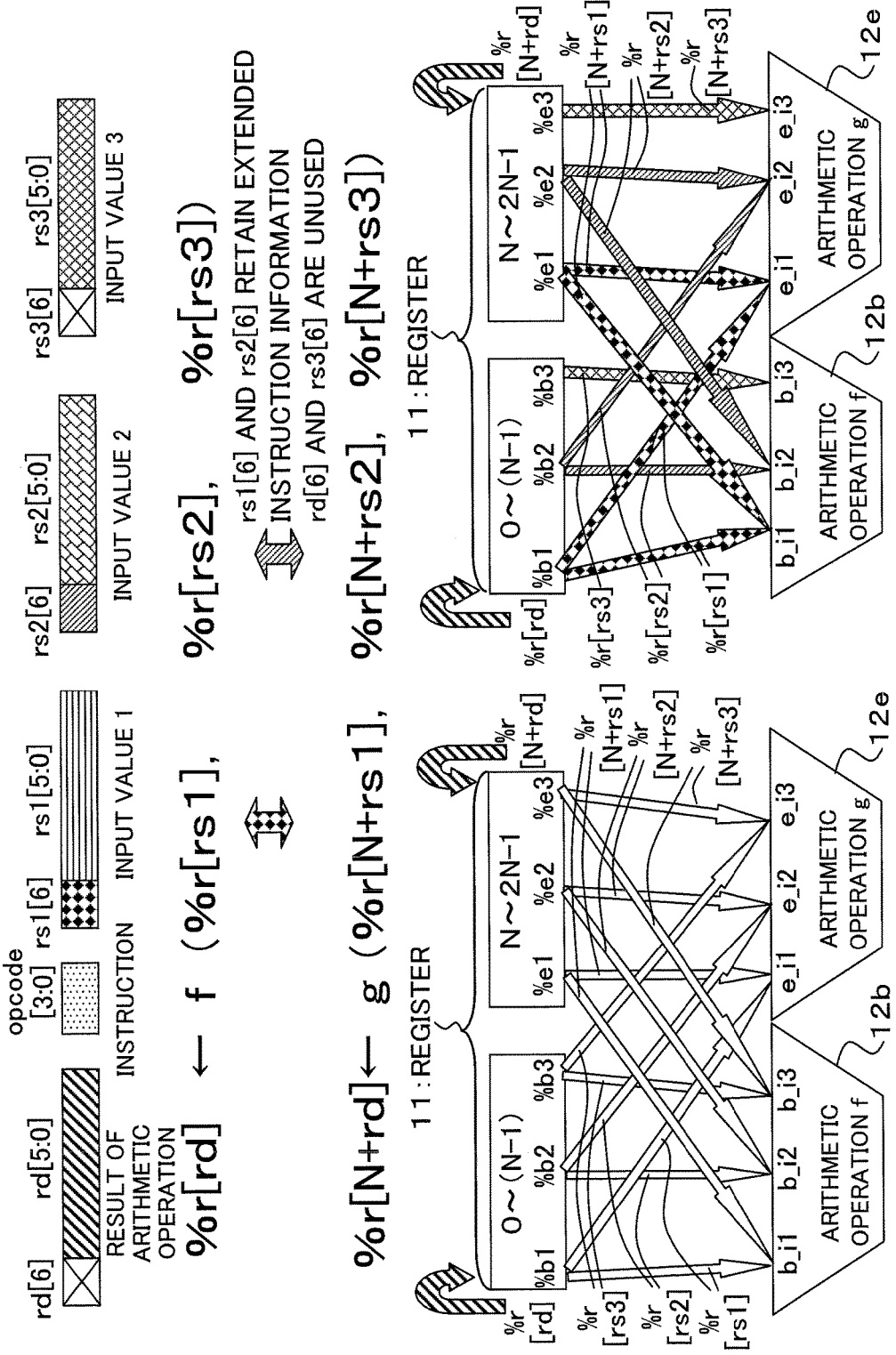
FIG. 9 is a diagram briefly showing an operation performed in a first mode of the use of unused bits by the arithmetic operating unit of the arithmetic operating apparatus of FIG. 1.
Figure 10:
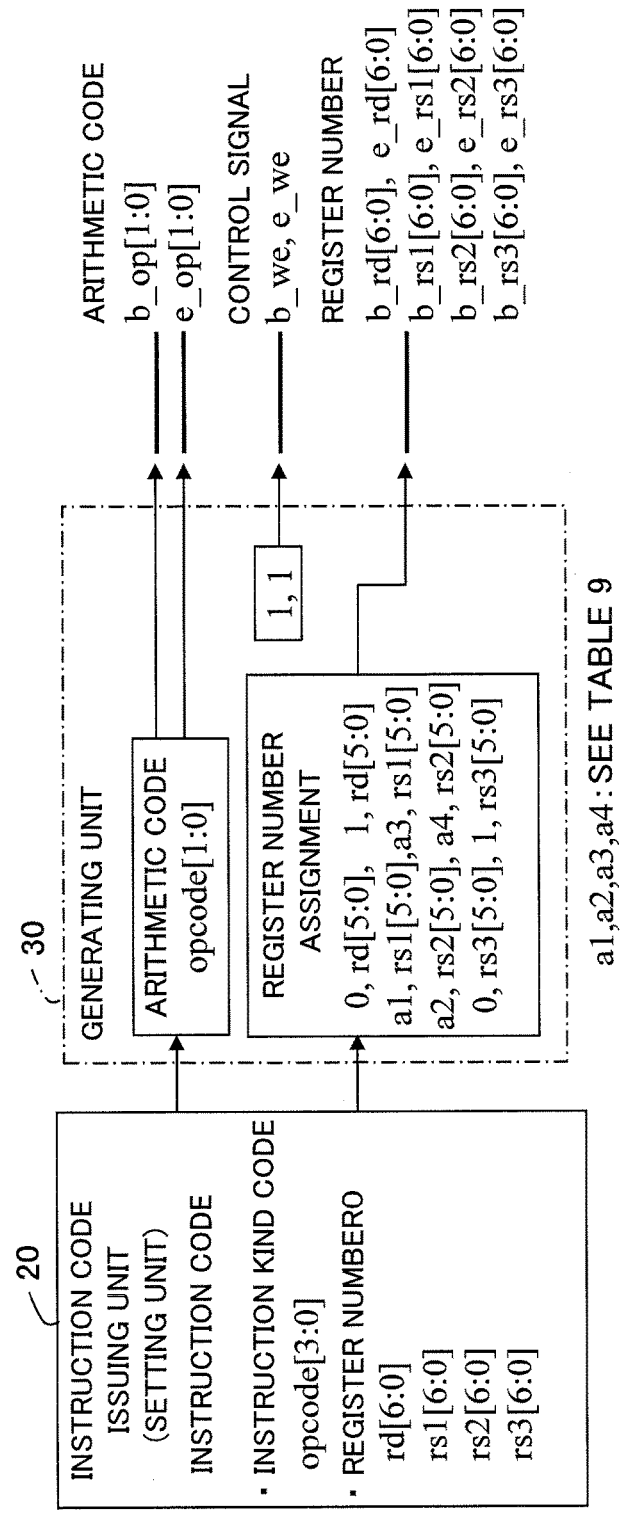
FIG. 10 is a diagram briefly showing an operation performed in the first mode of the use of unused bits by the instruction code issuing unit (setting unit) and the generating unit of the arithmetic operating apparatus of FIG. 1.

[5] Operation Performed by the Arithmetic Operating Apparatus in First Mode of Use of Unused Bits:

FIG. 9 briefly shows an operation performed by arithmetic unit 10 of arithmetic operating apparatus 1 shown in FIG. 1 during a first mode of the use of unused bit; FIG. 10 shows operations performed by instruction code issuing unit (setting unit) 20 and generating unit 30 in the arithmetic operating apparatus 1 during the first mode; FIGS. 11A-11D specifically show an instruction code, an arithmetic code, a register recording signal, and register number assignments (only the MSB) of arithmetic operating apparatus 1 in the first mode; and FIGS. 12-15 show specific examples of combinations of arithmetic operations to be executed in arithmetic unit 10 of arithmetic operating apparatus 1 shown in FIG. 1 when the first mode is adopted.

In adopting the SIMD mode, ordinary operator 12b and extended operator 12e that respectively use values on the first half region of register 11 and values on the second half region of register 11 simultaneously execute the same arithmetic operation. The results of the arithmetic operation performed by arithmetic operators 12b and 12e are recorded into the first half region and the second half region of register 11, respectively. For this reason, the SIMD scheme detailed above does not cause in a single arithmetic operator 12b or 12e to execute an arithmetic operation using operands from both the first half region and the second half region of register 11.

An operation in the first mode further has four instruction sets cross-fmadd1, cross-fmadd2, cross-fmadd3, and cross-fmadd4 (see FIG. 11A) in addition to four instruction sets of simd-fmadd, simd-fmsub, simd-fnmsub, simd-fnmadd described above. These additional instruction sets cross-fmadd1, cross-fmadd2, cross-fmadd3, and cross-fmadd4 each are an instruction that switches values at the second half of register 11 to three operands into ordinary operator 12b and conversely switches values at the first half of register 11 to three operands into extended operator 12e, as depicted on the left portion of FIG. 9.

Specifically, such instructions cross the input of values from the first half region and from the second half region of register 11 respectively into extended operator 12e and ordinary operator 12b. In the first mode, arithmetic operators 12b and 12e are allowed to execute different arithmetic operations. Similarly to the instruction codes used in the SIMD scheme, the instruction sets cross-fmadd1, . . . , cross-fmadd4 use the last six bits rd[5:0], rs1[5:0], rs2[5:0], and rs3[5:0] of the seven bits of each of the register number assignments rd[6:0], rs1[6:0], rs2[6:0], and rs3[6:0], but do not use the MSBs rd[6], rs1[6], rs2[6], and rs3[6].

The first mode (the first mode of the use of unused bits) detailed below uses two (specifically rs1[6] and rs2[6]) among the four unused bits rd[6], rs1[6], rs2[6], rs3[6] in each of the instruction sets cross-fmadd1, . . . , cross-fmadd4. Into these two unused bits rs1[6] and rs2[6], instruction code issuing unit 20 functioning as the setting unit sets extended instruction information, which instructs register 11 and arithmetic operators 12b and 12e to execute an extended process (e.g., see combinations of arithmetic operations shown in FIGS. 12-15) different from an ordinary process performed according to the instruction sets cross-fmadd1, . . . , cross-fmadd4 that do not use rs1[6] and rs2[6]. On the basis of the extended instruction information set in the unused bits and information set in bits except the unused bits, generating unit 30 generates an extended instruction that instructs register 11 and arithmetic operators 12b and 12e to execute the extended process, as described below with reference to FIGS. 10 and 11A-11D.

Thereby, each of arithmetic operators 12b and 12e is allowed to execute an arithmetic operation using input values from both the first half region and the second half region of register 11, as shown in the right portion of FIG. 9. In particular, setting an extended instruction to execute an extended process into the unused bits rs1[6] and rs2[6] makes it possible to input two operands from both the first half region and the second half region of register 11 into each of arithmetic operators 12b and 12e. Accordingly, an imaginary-number matrix multiplication executed by the four arithmetic operations (i.e., the four instructions) of the above expressions (1-1) to (1-4) can be carried out through two instructions as detailed below.

In adoption of the first mode of the use of unused bits (i.e., in execution of arithmetic operation specified by instructions cross-fmadd1, . . . , cross-fmadd4), the significant two bits opcode[3:2] of an instruction kind code issued by instruction code issuing unit 20 are set to be "11". Hereinafter, description will now be made in relation to operations of arithmetic operating apparatus 1 in the first mode of the use of unused bits with reference to FIGS. 10-15.

In the first mode, generating unit 30 converts the instruction code opcode[3:0] and the four register number assignments rd[6:0], rs1[6:0], rs2[6:0], and rs3[6:0] issued by instruction code issuing unit 20 are converted as shown in FIG. 10, and an instruction set b_we, e_we, b_rd[6:0], b_rs1[6:0], b_rs2[6:0], b_rs3[6:0], e_rd[6:0], e_rs1[6:0], e_rs2[6:0], e_rs3[6:0], b_op[1:0], and e_op[1:0] is input into arithmetic unit 10.

Here, in instruction sets of cross-fmadd1, . . . , cross-fmadd4, the arithmetic codes b_op[1:0] and e_op[1:0] for arithmetic operation to be respectively performed in arithmetic operators 12b and 12e are generated on the basis of the value opcode[1:0] of the last two bits included in an instruction kind code of an instruction code, as shown in FIGS. 10 and 11B and Table 8. Differently from the above SIMD scheme, kinds of arithmetic operations executed by arithmetic operators 12b and 12e are independently from each other switched the kinds of arithmetic operations to be executed, so that arithmetic operators 12b and 12e can carry out the same arithmetic operation or different arithmetic operations at a time.

TABLE 8

| INSTRUCTION KIND CODE | b_op[1:0] | e_op[1:0] |
| --- | --- | --- |
| cross-fmadd1 | 00(fmadd) | 00(fmadd) |
| cross-fmadd2 | 10(fnmsub) | 00(fmadd) |
| cross-fmadd3 | 00(fmadd) | 10(fnmsub) |
| cross-fmadd4 | 10(fnmsub) | 10(fnmsub) |

As shown in FIGS. 10 and 11C, for the first mode, a fixed value "1" is set in control signals b_we and e_we for recording into register 11 respectively from arithmetic operators 12b and 12e. This records the results of arithmetic operations performed by arithmetic operators 12b and 12e always into the first half region and the second half region of the register 11, respectively.

As shown in FIG. 10, for register number assignments b_rd[5:0], b_rs1[5:0], b_rs2[5:0], b_rs3[5:0] of ordinary operator 12b, the last six bits rd[5:0], rs1[5:0], rs2[5:0], rs3[5:0] of the four register number assignments included in an instruction code are input into register 11. At the same time, the same data pieces rd[5:0], rs1[5:0], rs2[5:0], rs3[5:0] also serve as register number assignments e_rd[5:0], e_rs1[5:0], e_rs2[5:0], e_rs3[5:0] of extended operator 12e, which are input into register 11.

The fixed value "0" is set into the MSBs b_rd[6] and b_rs3[6] of register number assignments for ordinary operator 12b, and the fixed value "1" is set into the MSBs e_rd[6] and e_rs3[6] of register number assignments for extended operator 12e as shown in FIGS. 10 and 11D and Table 9 below. In contrast, into the MSBs b_rs1[6] and b_rs2[6] of register number assignments for ordinary operator 12b and the MSBs e_rs1[6], e_rs2[6] of register number assignments for extended operator 12e, values calculated and generated on the basis of an instruction kind code opcode[1:0] and the values of the MSBs rs1[6] and rs2[6] of the register number assignments (i.e., extended instruction information) are input. The input values are, as shown in FIGS. 10 and 11D and below Table 9, generated on the basis of the MSBs rs1[6] and rs2[6] of register number assignments, depending on the instruction kind code. Thereby, two values each from one of the first half region and the second half region of register 11 can be used as operands for an arithmetic operation in each of arithmetic operators 12b and 12e. In other words, extended instruction information set in unused bits rs1[6] and rs2[6] instructs register 11 to switch a value to be input into one of arithmetic operators 12b and 12e from a value in the region allocated to one of the arithmetic operators to a value in the region allocated to the other arithmetic operator. Here, "~X" represents an inverted value of "X".

TABLE 9

| INSTRUCTION KIND CODE | b_rs1[6] (a1 IN FIG. 10) | b_rs2[6] (a2 IN FIG. 10) | e_rs1[6] (a3 IN FIG. 10) | e_rs2[6] (a4 IN FIG. 10) |
|---|---|---|---|---|
| cross-fmadd1 | rs1[6] | rs2[6] | rs1[6] | ~rs2[6] |
| cross-fmadd2 | ~rs1[6] | ~rs2[6] | ~rs1[6] | rs2[6] |
| cross-fmadd3 | ~rs1[6] | ~rs2[6] | ~rs1[6] | rs2[6] |
| cross-fmadd4 | ~rs1[6] | rs2[6] | ~rs1[6] | ~rs2[6] |

Next, description is to be made in relation to example of an operation performed to execute of an arithmetic operation "cross-fmadd1 %f30, %f10, %f20, %f30" in the first mode of the use of unused bits.

In this case, arithmetic operators 12b and 12e of arithmetic unit 10 execute the two arithmetic operation below.
at ordinary operator 12b, %r[30]←%r[10]*%r[20]+%r[30]

at extended operator 12e,

%r[94]←%r[10]*%r[84]+%r[94]

These two arithmetic operations correspond to the following imaginary-number arithmetic operation which inputs operands of the actual part and operands of the imaginary part into the first half region and the second half region of register 11, respectively.

$$X \leftarrow X + A*C \quad (1\text{-}1)$$

$$Y \leftarrow Y + A*D \quad (1\text{-}2)$$

In this case, values of the instruction kind code opcode[3:0] and register number assignments rd[6:0], rs1[6:0], rs2[6:0], and rs3[6:0] specified by an instruction code shown in Table 10 below are converted into values of input signals for arithmetic operators 12b and 12e shown in Table 11 below and input into register 11. Specifically, as shown in Table 10 below, the instruction kind code opcode[3:0] issued from instruction code issuing unit 20 is set to be "1100", and instruction code issuing unit 20 functioning as the setting unit sets "0" and "0" into unused bits rs1[6] and rs2[6] (see the upper-left example in FIG. 12 described below). In accordance with these values, generating unit 30 calculates and sets, on the basis of FIG. 11D and the expression in Table 9, 0,0, and 0, and 0 for the MSBs b_rd[6], b_rs1[6], b_rs2[6], and b_rs3[6] of the register number assignments for ordinary operator 12b (see Table 11 below). In the same manner, generating unit 30 calculates and sets 1, 0, 1, and 1 for the MSBs e_rd[6], e_rs1[6], e_rs2[6], and e_rs3[6] of the register number assignments for extended operator 12e (see Table 11 below). Arithmetic codes "00" and "00" determined in terms of the instruction kind code opcode[1:0] as shown in FIG. 11B and Table 8 are input into ordinary operator 12b and extended operator 12e, respectively. Accordingly, arithmetic operators 12b and 12e execute the same arithmetic operation (fmadd) in this example. The identical values rd[5:0], rs1[5:0], rs2[5:0], and rs3[5:0] are input into the last six bits of register number assignments for ordinary operator 12b and those for extended operator 12e.

Figure 12:
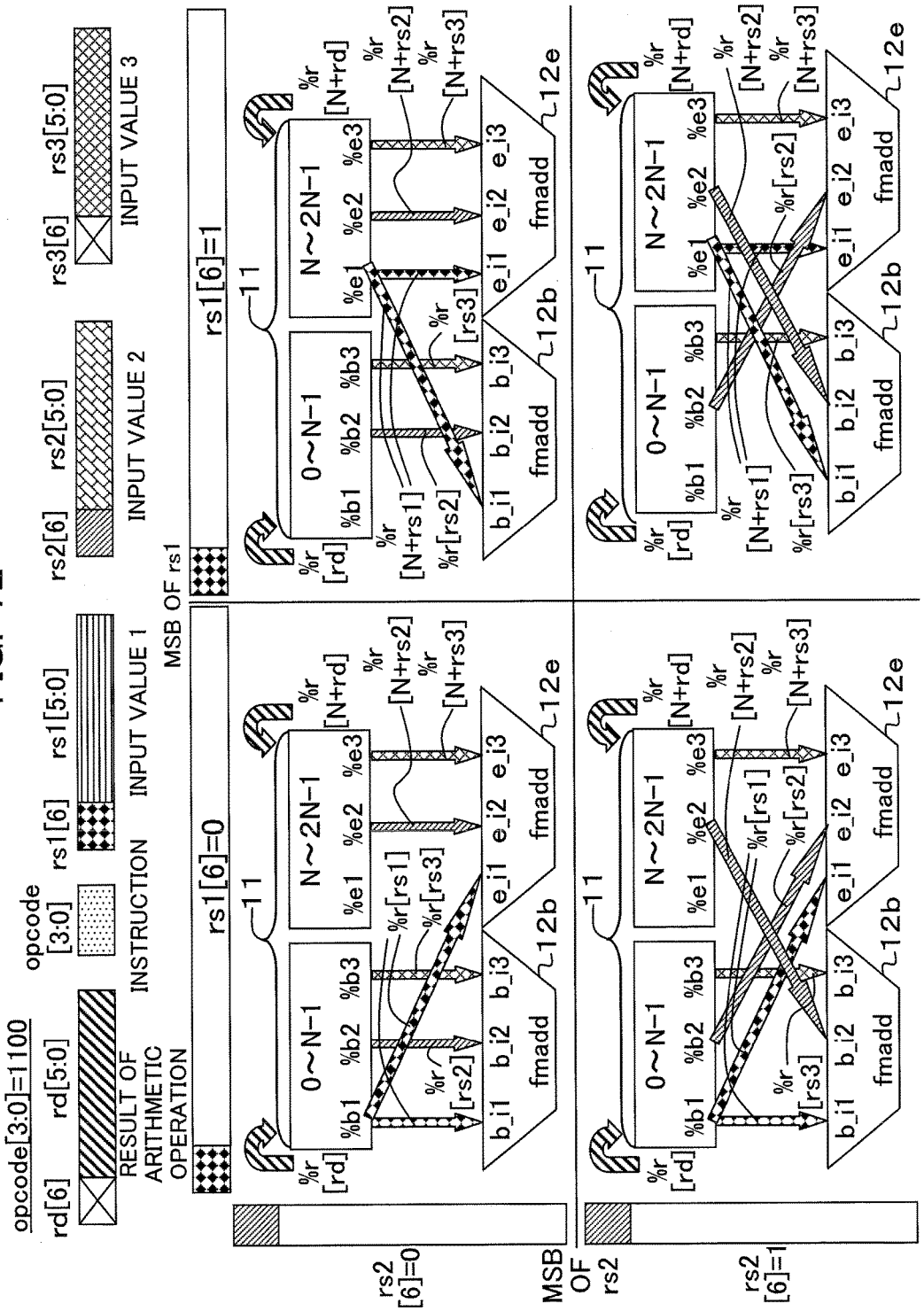
FIGS. 12-15 are diagrams each showing a combination of arithmetic operations performed in the first mode of the use of unused bits by the arithmetic operating unit of the arithmetic operating apparatus of FIG. 1.

Ordinary operator 12b then executes an arithmetic operation based on above expression (1-1) using input values represented by three operands A(%r[rs1]=%r[10]), C(%r[rs2]=%r[20]), and X(%r[rs3]=%r[30]) which are positioned on the first half region and which are selected by the MSBs b_rs1[6], b_rs2[6], b_rs3[6]=0,0,0 of the register number assignments as shown by the upper left example shown in FIG. 12. In the meanwhile, extended operator 12e executes an arithmetic operation based on above expression (1-2) using input values represented by a single operand A(%r[rs1]=%r[10]) positioned on the first half region and two operands D(%r[N+rs2]=%r[84]) and Y(%r[N+rs3]=%r[94]) positioned on the second half region which operands A, D and Y are selected by the MSBs e_rs1[6], e_rs2[6], e_rs3[6]=0,1,1 of the register number assignments as shown in the upper left example of FIG. 12. Arithmetic operators 12b and 12e output, to register 11, the results of the same arithmetic operation performed using different operands. In the first mode, the fixed value "1" is set into both control signals b_we and e_we for recording into register 11 from arithmetic operators 12b and 12e, respectively. Therefore, the result of the arithmetic operation by ordinary operator 12b takes the register value or which is to be recorded into the first half region of register 11, and similarly, the result of the arithmetic operation by extended operator 12e takes the register value %r[N+rd]=%r[94], which is recorded into the second half region of the register 11. In other words, two arithmetic operations of the above expressions (1-1) and (1-2) can be executed in accordance with a single instruction, and similarly the arithmetic operations represented by the above expressions (1-3) and (1-4) can be carried out in obedience to a single instruction.

TABLE 10

| INSTRUCTION CODE | VALUE |
| --- | --- |
| opcode[3:0] | 1100 (cross-fmadd1) |
| rd[6:0] | 0011110 (30) |
| rs1[6:0] | 0001010 (10) |
| rs2[6:0] | 0010100 (20) |
| rs3[6:0] | 0011110 (30) |

TABLE 11

| INPUT SIGNAL | VALUE |
| --- | --- |
| b_op[1:0] | 00 (fmadd) |
| b_we | 1 (fixed value) |
| e_op[1:0] | 00 (fmadd) |
| e_we | 1 (fixed value) |
| b_rd[6:0] | 0011110 (30) |
| b_rs1[6:0] | 0001010 (10) |
| b_rs2[6:0] | 0010100 (20) |
| b_rs3[6:0] | 0011110 (30) |
| e_rd[6:0] | 1011110 (94) |
| e_rs1[6:0] | 0001010 (10) |
| e_rs2[6:0] | 1010100 (84) |
| e_rs3[6:0] | 1011110 (94) |

The above example assumes that the instruction kind code opcode[3:0] is set to be "1100" and unused bits rs1[6] and rs2[6] are both set to be "0". However, the first mode of the use of unused bits can realize 15 more combinations of arithmetic operations. The 16 combinations of arithmetic operations executed by arithmetic operator 10 are detailed with reference to FIGS. 12-15.

FIG. 12 shows four combinations of arithmetic operations under the instruction kind code opcode[3:0]=1100, in which arithmetic operators 12b and 12e execute the same arithmetic operation fmadd.

In this case, if unused bits (the MSBs) rs1[6] and rs2[6] are both set to be "0", the MSBs b_rs1[6], b_rs2[6], and b_rs3[6] of the register number assignments are all "0" and the MSBs e_rs1[6], e_rs2[6], e_rs3[6] of the register number assignments are 0, 1, and 1, respectively. Accordingly, as shown in the upper left example of FIG. 12, ordinary operator 12b executes the arithmetic operation (fmadd) using, as input values, three operands %r[rs1], %r[rs2], and %r[rs3] from the first half region of register 11. Extended operator 12e executes the arithmetic operation (fmadd) using, as input values, a single operand %r[rs1] from the first half region of register 11 and two operands %r[N+rs2] and %r[N+rs3] from the second half region of register 11.

If unused bits (the MSBs) rs1[6] and rs2[6] are set to be respectively 0 and 1, the MSBs b_rs1[6], b_rs2[6], and b_rs3[6] of the register number assignments are all respectively 0, 1, and 0, and the MSBs e_rs1[6], e_rs2[6], e_rs3[6] of the register number assignments are 0, 0, and 1, respectively. Accordingly, as shown in the lower left example of FIG. 12, ordinary operator 12b executes the arithmetic operation (fmadd) using, as input values, two operands %r[rs1] and %r[rs3] from the first half region of register 11 and a single operand %r[N+rs2] from the second half region of register 11. Extended operator 12e executes the arithmetic operation (fmadd) using, as input values, two operands %r[rs1] and %r[rs2] from the first half region of register 11 and a single operand %r[N+rs3] from the second half region of register 11.

If unused bits (the MSBs) rs1[6] and rs2[6] are set to be respectively 1 and 0, the MSBs b_rs1[6], b_rs2[6], and b_rs3[6] of the register number assignments are respectively 1, 0, and 0, and the MSBs e_rs1[6], e_rs2[6], e_rs3[6] of the register number assignments are 1, 1, and 1, respectively. Accordingly, as shown in the upper right example of FIG. 12, ordinary operator 12b executes the arithmetic operation (fmadd) using, as input values, two operands %r [rs2] and %r [rs3] from the first half region of register 11 and a single operand %r[N+rs1] from the second half region of register 11. Extended operator 12e executes the arithmetic operation (fmadd) using, as input values, three operands %r[N+rs1], %r[N+rs2], and %r[N+rs3] from the second half region of register 11.

If unused bits (the MSBs) rs1[6] and rs2[6] are set to be both 1, the MSBs b_rs1[6], b_rs2[6], and b_rs3[6] of the register number assignments are respectively 1, 1, and 0, and the MSBs e_rs1[6], e_rs2[6], e_rs3[6] of the register number assignments are 1, 0, and 1, respectively. Accordingly, as shown in the lower right example of FIG. 12, ordinary operator 12b executes the arithmetic operation (fmadd) using, as input values, a single operand %r[rs3] from the first half region of register 11 and two operands %r[N+rs1] and %r[N+rs2] from the second half region of register 11. Extended operator 12e executes the arithmetic operation (fmadd) using, as input values, a single operand %r[rs2] from the first half region of register 11 and two operands %r[N+rs1] and %r[N+rs3] from the second half region of register 11.

Figure 13:
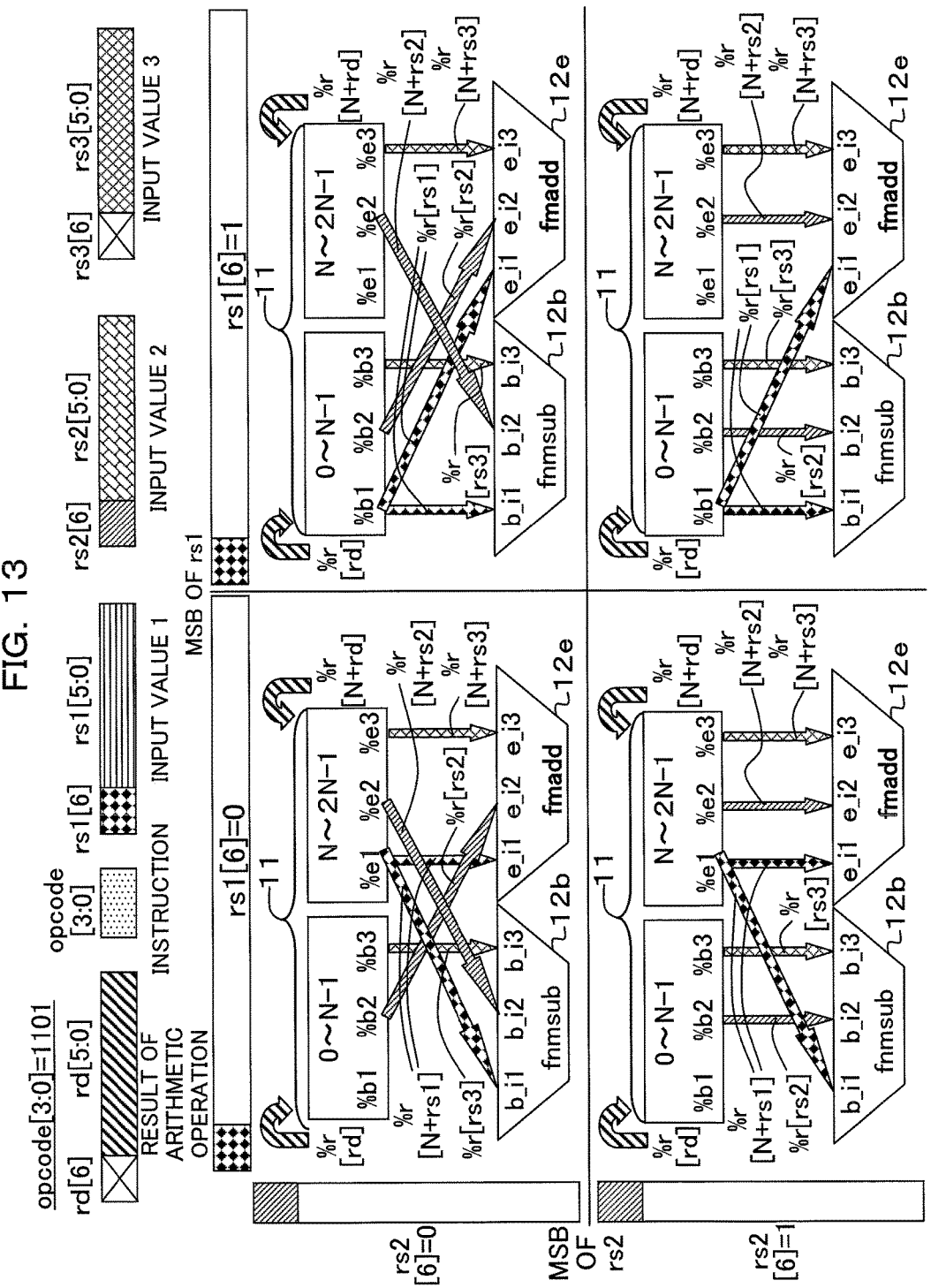

FIG. 13 shows four combinations of arithmetic operations under the instruction kind code opcode[3:0]=1101, in which ordinary operator 12b and extended operator 12e execute arithmetic operations fnmsub and fmadd, respectively.

In this case, if unused bits (the MSBs) rs1[6] and rs2[6] are set to be both "0", the MSBs b_rs1[6], b_rs2[6], and b_rs3[6] of the register number assignments respectively are 1, 1, and 0 and the MSBs e_rs1[6], e_rs2[6], e_rs3[6] of the register number assignments are 1, 0, and 1, respectively. Accordingly, as shown in the upper left example of FIG. 13, ordinary operator 12b executes the arithmetic operation (fnmsub) using, as input values, a single operand %r [rs3] from the first half region of register 11 and two operands %r[N+rs1] and %r[N+rs2] from the second half region of register 11. Extended operator 12e executes the arithmetic operation (fmadd) using, as input values, a single operand %r[rs2] from the first half region of register 11 and two operands %r[N+rs1] and %r[N+rs3] from the second half region of register 11.

If unused bits (the MSBs) rs1[6] and rs2[6] are set to be respectively "0" and "1", the MSBs b_rs1[6], b_rs2[6], and b_rs3[6] of the register number assignments are respectively 1, 0, and 0 and the MSBs e_rs1[6], e_rs2[6], e_rs3[6] of the register number assignments are 1, 1, and 1, respectively. Accordingly, as shown in the lower left example of FIG. 13, ordinary operator 12b executes the arithmetic operation (fnmsub) using, as input values, two operands %r[rs2] and %r[rs3] from the first half region of register 11 and a single operand %r[N+rs1] from the second half region of register 11. Extended operator 12e executes the arithmetic operation (fmadd) using, as input values, three operands %r[N+rs1], %r[N+rs2], and %r[N+rs3] from the second half region of register 11.

If unused bits (the MSBs) rs1[6] and rs2[6] are set to be respectively "1" and "0", the MSBs b_rs1[6], b_rs2[6], and b_rs3[6] of the register number assignments respectively are 0, 1, and 0 and the MSBs e_rs1[6], e_rs2[6], e_rs3[6] of the register number assignments are 0, 0, and 1, respectively. Accordingly, as shown in the upper right example of FIG. 13, ordinary operator 12b executes the arithmetic operation (fnmsub) using, as input values, two operands %r[rs1] and %r[rs3] from the first half region of register 11 and a single operand %r[N+rs2] from the second half region of register 11. Extended operator 12e executes the arithmetic operation (fmadd) using, as input values, two operands %r[rs1] and %r[rs2] from the first half region of register 11 and a single operand %r[N+rs3] from the second half region of register 11.

If unused bits (the MSBs) rs1[6] and rs2[6] are set to be both "1", the MSBs b_rs1[6], b_rs2[6], and b_rs3[6] of the register number assignments are respectively 0, 0, and 0 and the MSBs e_rs1[6], e_rs2[6], e_rs3[6] of the register number assignments are 0, 1, and 1, respectively. Accordingly, as shown in the lower right example of FIG. 13, ordinary operator 12b executes the arithmetic operation (fnmsub) using, as input values, three operands %r[rs1], %r[rs2], and %r[rs3] from the first half region of register 11. Extended operator 12e executes the arithmetic operation (fmadd) using, as input values, a single operand %r[rs1] from the first half region of register 11 and two operands %r[N+rs2] and %r[N+rs3] from the second half region of register 11.

Figure 14:
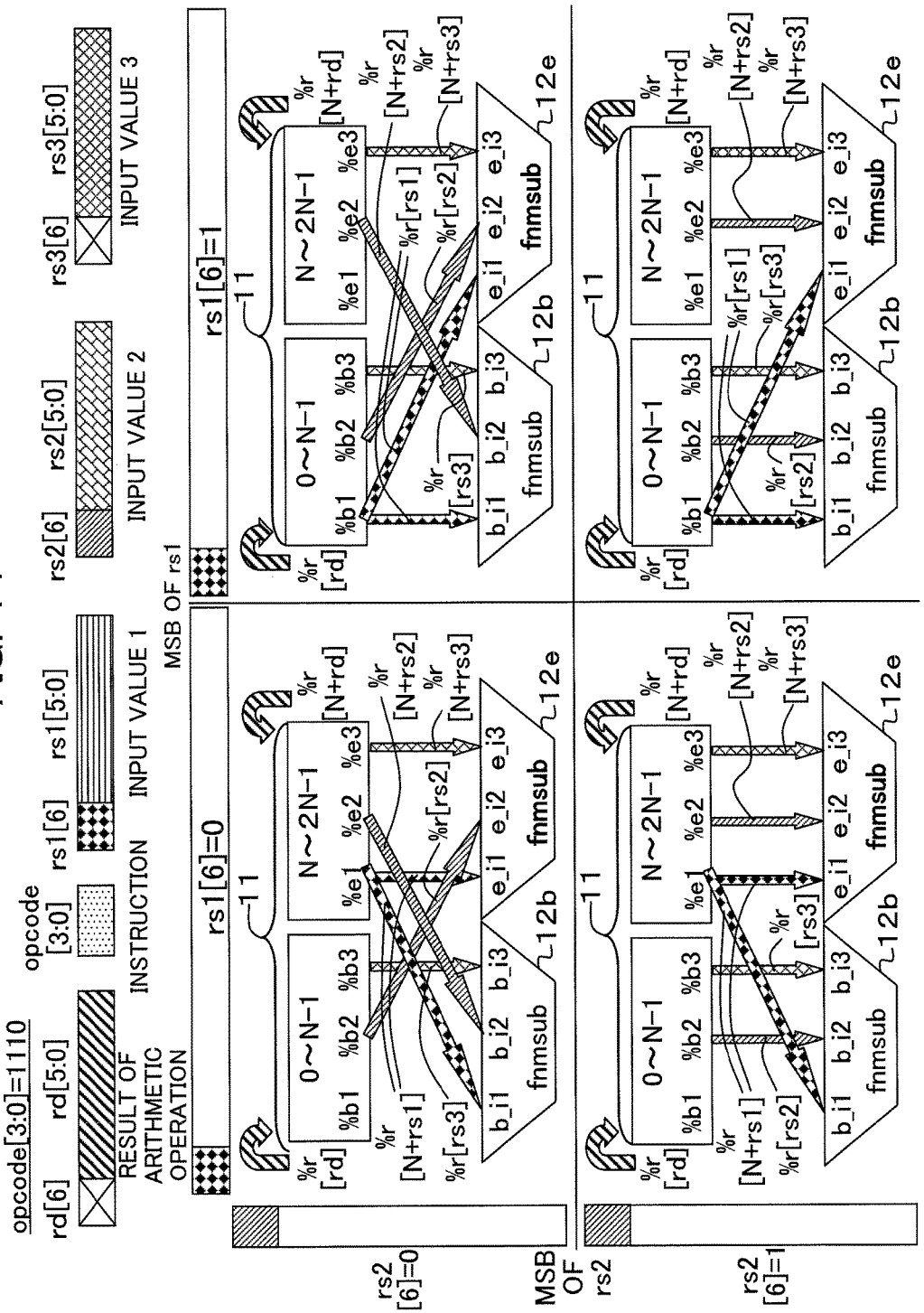

FIG. 14 shows four combinations of arithmetic operations under the instruction kind code opcode[3:0]=1110, in which ordinary operator 12b and extended operator 12e execute arithmetic operations fmadd and fnmsub, respectively.

In this case, if unused bits (the MSBs) rs1[6] and rs2[6] are set to be both "0", the MSBs b_rs1[6], b_rs2[6], and b_rs3[6] of the register number assignments respectively are 1, 1, and 0 and the MSBs e_rs1[6], e_rs2[6], e_rs3[6] of the register number assignments are 1, 0, and 1, respectively. Accordingly, as shown in the upper left example of FIG. 14, ordinary operator 12b executes the arithmetic operation (fmadd) using, as input values, a single operand %r[rs3] from the first half region of register 11 and two operands %r[N+rs1] and %r[N+rs2] from the second half region of register 11. Extended operator 12e executes the arithmetic operation (fnmsub) using, as input values, a single operand %r[rs2] from the first half region of register 11 and two operands %r[N+rs1], %r[N+rs3] from the second half region of register 11.

If unused bits (the MSBs) rs1[6] and rs2[6] are set to be respectively "0" and "1", the MSBs b_rs1[6], b_rs2[6], and b_rs3[6] of the register number assignments respectively are 1, 0, and 0 and the MSBs e_rs1[6], e_rs2[6], e_rs3[6] of the register number assignments are 1, 1, and 1, respectively. Accordingly, as shown in the lower left example of FIG. 14, ordinary operator 12b executes the arithmetic operation (fmadd) using, as input values, two operands %r[rs2] and %r[rs3] from the first half region of register 11 and a single operand %r[N+rs1] from the second half region of register 11. Extended operator 12e executes the arithmetic operation (fnmsub) using, as input values, three operands %r[N+rs1], %r[N+rs2], and %r[N+rs3] from the second half region of register 11.

If unused bits (the MSBs) rs1[6] and rs2[6] are set to be respectively "1" and "0", the MSBs b_rs1[6], b_rs2[6], and b_rs3[6] of the register number assignments respectively are 0, 1, and 0 and the MSBs e_rs1[6], e_rs2[6], e_rs3[6] of the register number assignments are 0, 0, and 1, respectively. Accordingly, as shown in the upper right example of FIG. 14, ordinary operator 12b executes the arithmetic operation (fmadd) using, as input values, two operands %r[rs1] and %r[rs3] from the first half region of register 11 and a single operand %r[N+rs2] from the second half region of register 11. Extended operator 12e executes the arithmetic operation (fnmsub) using, as input values, two operands %r[rs1] and %r[rs2] from the first half region of register 11 and a single operand %r[N+rs3] from the second half region of register 11.

If unused bits (the MSBs) rs1[6] and rs2[6] are set to be both "1", the MSBs b_rs1[6], b_rs2[6], and b_rs3[6] of the register number assignments are 0, 0, and 0 and the MSBs e_rs1[6], e_rs2[6], e_rs3[6] of the register number assignments are 0, 1, and 1, respectively. Accordingly, as shown in the lower right example of FIG. 14, ordinary operator 12b executes the arithmetic operation (fmadd) using, as input values, three operands %r[rs1], %r[rs2], and %r[rs3] from the first half region of register 11. Extended operator 12e executes the arithmetic operation (fnmsub) using, as input values, a single operand %r[rs1] from the first half region of register 11 and two operands %r[N+rs2] and %r[N+rs3] from the second half region of register 11.

Figure 15:
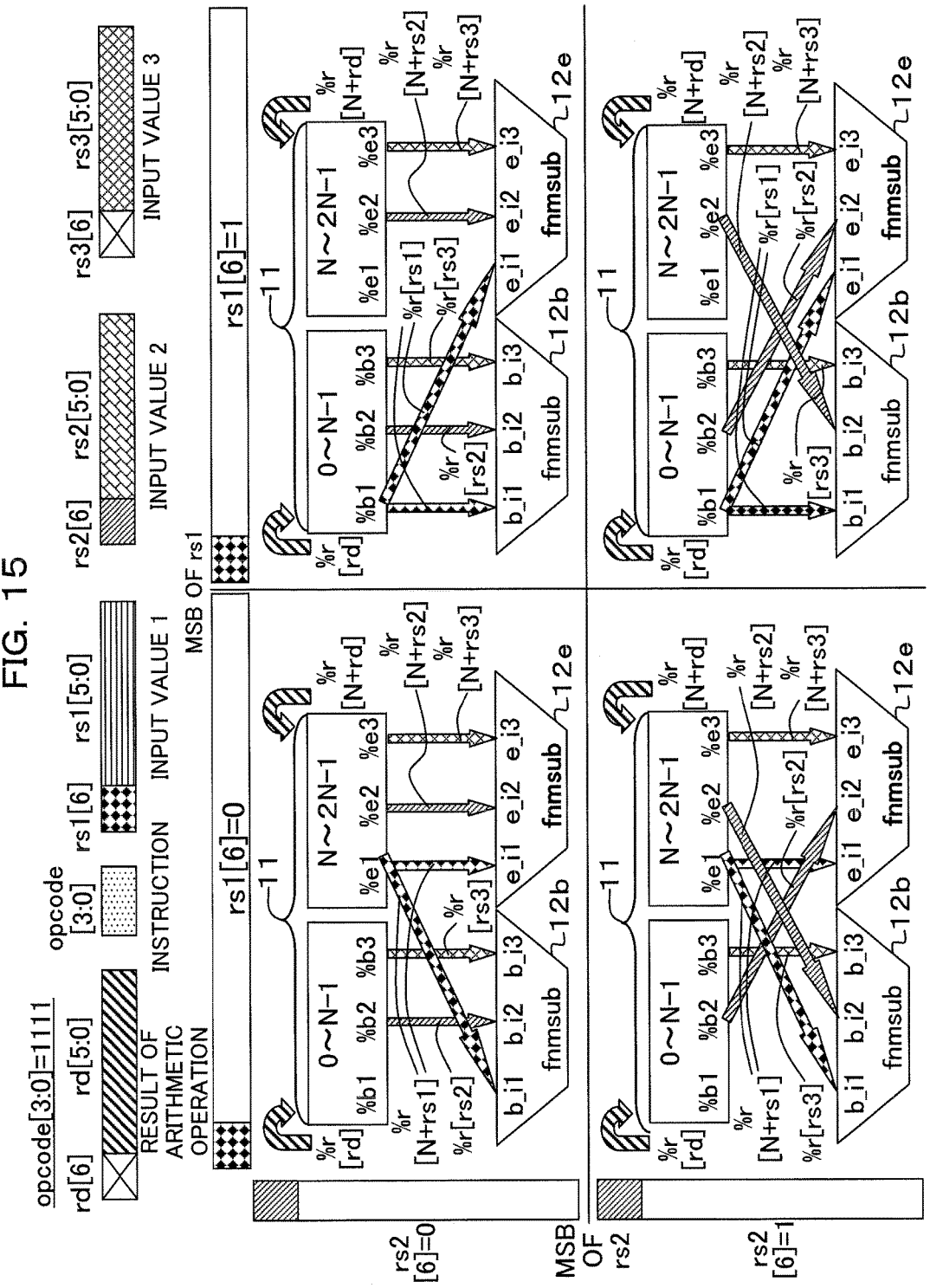

FIG. 15 shows four combinations of arithmetic operations under the instruction kind code opcode[3:0]=1111, in which arithmetic operators 12b and 12e execute the same arithmetic operation fnmsub.

In this case, if unused bits (the MSBs) rs1[6] and rs2[6] are set to be both "0", the MSBs b_rs1[6], b_rs2[6], and b_rs3[6] of the register number assignments are respectively 1, 0, and 0 and the MSBs e_rs1[6], e_rs2[6], e_rs3[6] of the register number assignments are 1, 1, and 1. Accordingly, as shown in the upper left example of FIG. 15, ordinary operator 12b executes the arithmetic operation (fnmsub) using, as input values, two operands %r[rs2] and %r[rs3] from the first half region of register 11 and a single operand %r[N+rs1] from the second half region of register 11. Extended operator 12e executes the arithmetic operation (fnmsub) using, as input values, three operands %r[N+rs1], %r[N+rs2] and %r[N+rs3] from the second half region of register 11.

If unused bits (the MSBs) rs1[6] and rs2[6] are set to be respectively "0" and "1", the MSBs b_rs1[6], b_rs2[6], and b_rs3[6] of the register number assignments respectively are 1, 1, and 0 and the MSBs e_rs1[6], e_rs2[6], e_rs3[6] of the register number assignments are 1, 0, and 1, respectively. Accordingly, as shown in the lower left example of FIG. 15, ordinary operator 12b executes the arithmetic operation (fnmsub) using, as input values, a single operand %r[rs3] from the first half region of register 11 and two operands %r[N+rs1] and %r[N+rs2] from the second half region of register 11. Extended operator 12e executes the arithmetic operation (fnmsub) using, as input values, a single operand %r[rs2] from the first half region of register 11 and two operands %r[N+rs1] and %r[N+rs3] from the second half region of register 11.

If unused bits (the MSBs) rs1[6] and rs2[6] are set to be respectively "1" and "0", the MSBs b_rs1[6], b_rs2[6], and b_rs3[6] of the register number assignments are 0, 0, and 0 and the MSBs e_rs1[6], e_rs2[6], e_rs3[6] of the register number assignments are 0, 1, and 1, respectively. Accordingly, as shown in the upper right example of FIG. 15, ordinary operator 12b executes the arithmetic operation (fnmsub) using, as input values, three operands %r[rs1], %r[rs2], and %r[rs3] from the first half region of register 11. Extended operator 12e executes the arithmetic operation (fnmsub) using, as input values, a single operand %r[rs1] from the first half region of register 11 and two operands %r[N+rs2] and %r[N+rs3] from the second half region of register 11.

If unused bits (the MSBs) rs1[6] and rs2[6] are set to be both "1", the MSBs b_rs1[6], b_rs2[6], and b_rs3[6] of the register number assignments are respectively 0, 1, and 0 and the MSBs e_rs1[6], e_rs2[6], e_rs3[6] of the register number assignments are 0, 0, and 1, respectively. Accordingly, as shown in the lower right example of FIG. 15, ordinary operator 12b executes the arithmetic operation (fnmsub) using, as input values, two operands %r[rs1] and %r[rs3] from the first half region of register 11 and a single operand %r[N+rs2] from the second half region of register 11. Extended operator 12e executes the arithmetic operation (fnmsub) using, as input values, two operands %r[rs1] and %r[rs2] from the first half region of register 11 and a single operand %r[N+rs3] from the second half region of register 11.

Figure 16:
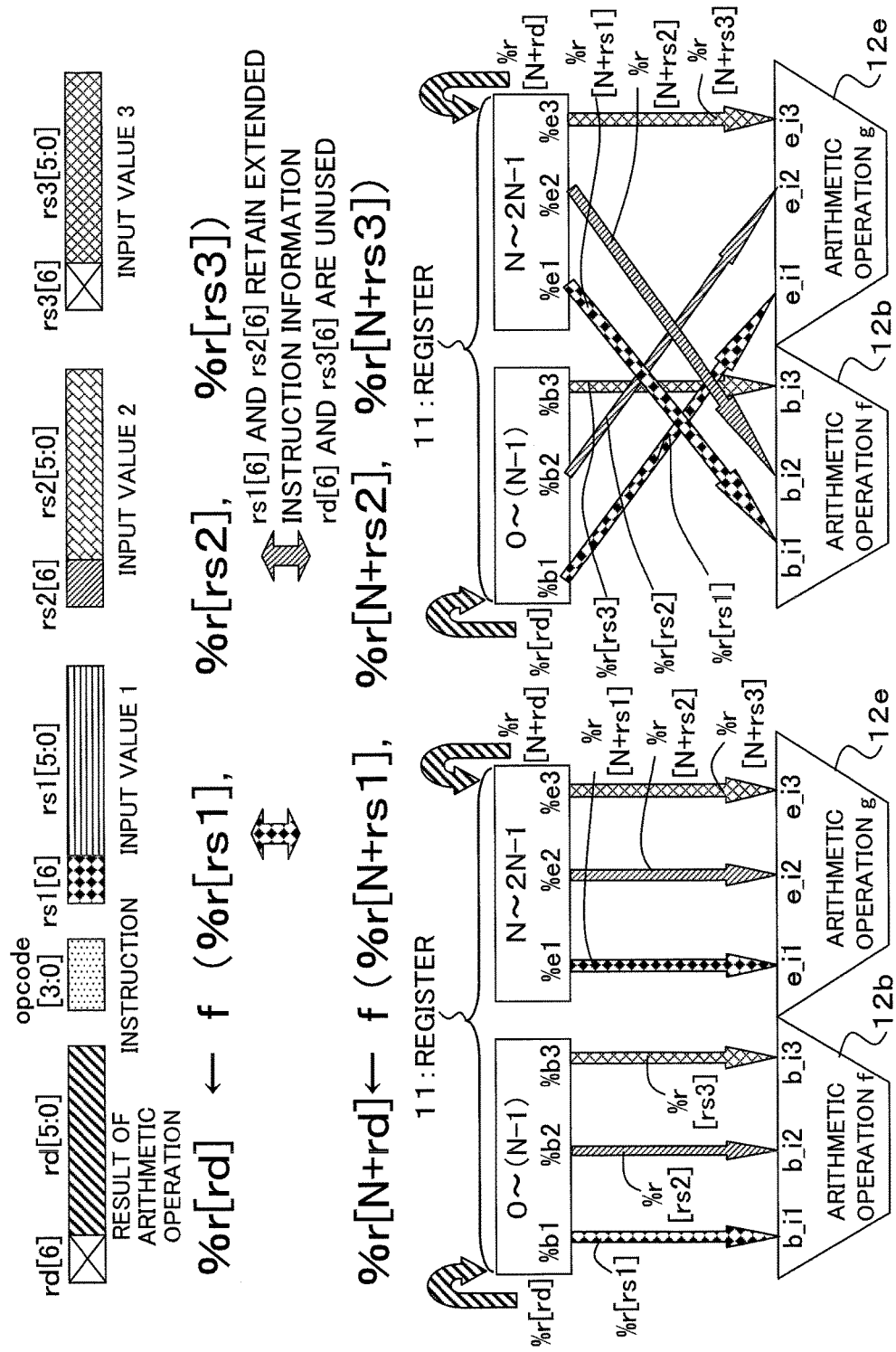
FIGS. 16 and 17 are diagrams each showing a combination of arithmetic operations performed in a second mode of the use of unused bits by the arithmetic operating unit of the arithmetic operating apparatus of FIG. 1.
Figure 17:
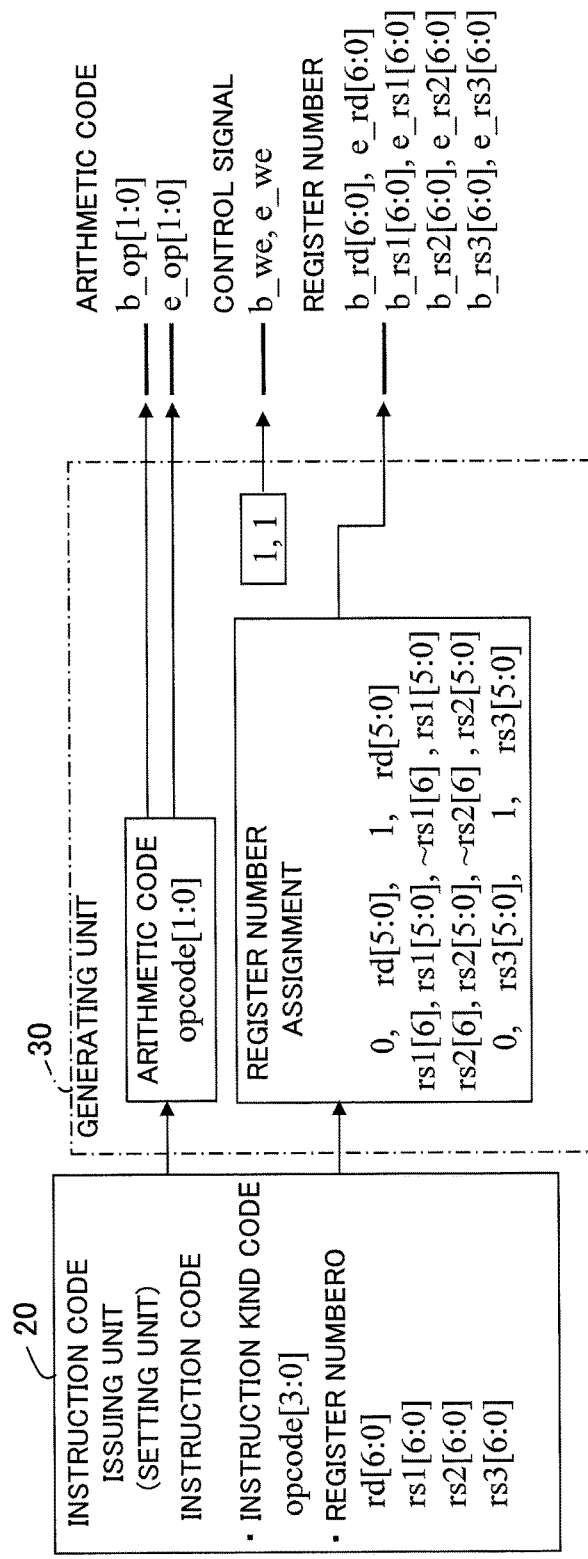

[6] Operation Performed of the Arithmetic Operating Apparatus in Second Mode of Use of Unused Bits:

FIG. 16 briefly shows an operation performed by arithmetic unit 10 of arithmetic operating apparatus 1 shown in FIG. 1 during a second mode of the use of unused bit; FIG. 17 shows operations performed by instruction code issuing unit (setting unit) 20 and generating unit 30 in the arithmetic operating apparatus 1 during the second mode; and FIGS. 18A-18D specifically show an instruction code, an arithmetic code, a recording signal into register 11, and register number assignments (only the MSBs) of arithmetic operating apparatus 1 in the second mode.

For the above first mode of the use of unused bits, description has been made with reference to FIGS. 12-15 in relation to instruction of execution of an extended process which instruction is realized by using unused bits rs1[6] and rs2[6] set in instruction sets cross-fmadd1, . . . , cross-fmadd4. In addition to the operation in the above first mode, the second mode to be detailed here uses the unused bits rd[6], rs1[6], rs2[6], and rs3[6] of instruction sets simd-fmadd, simd-fmsub, simd-fnmsub, simd-fnmadd in the SIMD scheme having been described with reference to FIGS. 6, 7, and 8A-8D. Two bits rs1[6] and rs2[6] are particularly used among these unused bits rd[6], rs1[6], rs2[6], and rs3[6].

Into these two unused bits rs1[6] and rs2[6], instruction code issuing unit 20 functioning as the setting unit sets extended instruction information, which instructs register 11 and arithmetic operators 12b and 12e to execute an extended process different from an ordinary process (see a left example of FIG. 16) performed according to the instruction sets simd-fmadd, simd-fmsub, simd-fnmsub, simd-fnmadd that do not use bits rs1[6] and rs2[6]. On the basis of the extended instruction information set in unused bits and information set in bits except the unused bits, generating unit 30 generates an extended instruction that instructs register 11 and arithmetic operators 12b and 12e to execute the extended process, as described below with reference to FIGS. 17 and 18A-18D.

Thereby, each of arithmetic operators 12b and 12e is allowed to execute an arithmetic operation using input values from both the first half region and the second half region of register 11, as shown in the right example of FIG. 16. In particular, setting an extended instruction to execute an extended process into the unused bits rs1[6] and rs2[6] makes it possible to input two operands from both the first half region and the second half region of register 11 into each of arithmetic operators 12b and 12e. Such an extended process can increase the number of combinations of registers used for arithmetic operations in the SIMD scheme. Besides imaginary-number arithmetic operations, various arithmetic operations can be carried out on various combinations of operands from both the first half region and the second half region of a single register.

In adoption of the second mode of the use of unused bits (i.e., in execution of arithmetic operations specified by instructions simd-fmadd, simd-fmsub, simd-fnmsub, and simd-fnmadd), the significant two bits opcode[3:2] of an instruction kind code issued by instruction code issuing unit 20 are set to be "01". Hereinafter, description will now be made in relation to operations of arithmetic operating apparatus 1 in the second mode of the use of unused bits with reference to FIGS. 17 and 18A-18D.

In the second mode, generating unit 30 converts the instruction code opcode[3:0] and the four register number assignments rd[6:0], rs1[6:0], rs2[6:0], and rs3[6:0] issued by instruction code issuing unit 20 are converted as shown in FIG. 17, and an instruction set b_we, e_we, b_rd[6:0], b_rs1[6:0], b_rs2[6:0], b_rs3[6:0], e_rd[6:0], e_rs1[6:0], e_rs2[6:0], e_rs3[6:0], b_op[1:0], e_op[1:0] is input into arithmetic unit 10.

Here, as shown in FIGS. 17 and 18B, the arithmetic codes b_op[1:0] and e_op[1:0] respectively for arithmetic operators 12b and 12e take the value of the last two bits opcode [1:0] of the instruction kind code included in the instruction code. Into arithmetic operators 12b and 12e, the same arithmetic code is always input, so that arithmetic operators 12b and 12e executes the same arithmetic operation.

As shown in FIGS. 17 and 18C, for the second mode, a fixed value "1" is set in control signals b_we and e_we for recording into register 11 respectively from arithmetic operators 12b and 12e. This records the results of arithmetic operations performed by arithmetic operators 12b and 12e respectively into the first half region and the second half region of register 11.

As shown in FIG. 17, for register number assignments b_rd[5:0], b_rs1[5:0], b_rs2[5:0], and b_rs3[5:0] of ordinary operator 12b, the last six bits rd[5:0], rs1[5:0], rs2[5:0], and rs3[5:0] of the four register number assignments included in an instruction code are input into register 11. At the same time, the same data pieces rd[5:0], rs1[5:0], rs2[5:0], and rs3[5:0] also serve as register number assignments e_rd[5:0], e_rs1[5:0], e_rs2[5:0], e_rs3[5:0] of extended operator 12e, which are input into register 11.

As shown in FIGS. 17 and 18D, the fixed value "0" is set into the MSBs b_rd[6] and b_rs3[6] of register number assignments for ordinary operator 12b, and the fixed value "1" is set into the MSBs e_rd[6] and e_rs3[6] of register number assignments for extended operator 12e. In contrast, into the MSBs b_rs1[6] and b_rs2[6] of register number assignments for ordinary operator 12b, values rs1[6] and rs2[6] are set, respectively. Additionally, into the MSBs e_rs1[6] and e_rs2[6] of register number assignments for extended operator 12e, values ~rs1[6] and ~rs2[6] are set, respectively. In other words, extended instruction information set in unused bits rs1[6] and rs2[6] instructs register 11 to switch a value to be input into one of arithmetic operators 12b and 12e from a value in the region allocated to the one of the arithmetic operator to a value in the region allocated to the other arithmetic operator. Here, "~X" represents an inverted value of "X".

Next, description is to be made in relation to example of an operation performed to execute of an arithmetic operation "simd-fmsub %f40, %f10, %f80, %f30" in the second mode of the use of unused bits.

In this arithmetic operation, arithmetic operators 12b and 12e of arithmetic unit 10 execute the two arithmetic operation below.

at ordinary operator 12b,

%r[40]←%r[10]*%r[80]−%r[30]

at extended operator 12e,

%r[104]←%r[74]*%r[16]−%r[94]

In this case, values of the instruction kind code opcode [3:0] and register number assignment rd[6:0], rs1[6:0], rs2 [6:0], rs3[6:0] specified by an instruction code shown in Table 12 below are converted into values that are to be input into arithmetic operators 12b and 12e shown in Table 13 below and input into register 11. Specifically, as shown in Table 12 below, the instruction kind code opcode[3:0] issued from instruction code issuing unit 20 is set to be "0101", and instruction code issuing unit 20 functioning as the setting unit sets values "0" and "1" into unused bits rs1[6] and rs2[6], respectively. In accordance with these values, generating unit 30 calculates and sets, on the basis of the expression of FIG. 18D and Table 9, 0, 0, 1, and 0 in the MSBs b_rd[6], b_rs1[6], b_rs2[6], b_rs3[6] of the register number assignments for ordinary operator 12b (see Table 13 below). In the same manner, generating unit 30 calculates and sets 1, 1, 0, and 1 in the MSBs e_rd[6], e_rs1[6], e_rs2[6], and e_rs3[6] of the register number assignments for extended operator 12e (see Table 13 below). The same arithmetic code "01" is input into the arithmetic codes b_op[1:0] and e_op[1:0] of arithmetic operators 12b and 12e. Accordingly, arithmetic operators 12b and 12e execute the same arithmetic operation in this example. The identical values rd[5:0], rs1[5:0], rs2[5:0], and rs3[5:0] are input into the last six bits of register number assignments for ordinary operator 12b and those for extended operator 12e.

Ordinary operator 12b then executes an arithmetic operation (fnmsub) using input values represented by two operands %r[rs1]=%r[10], and %r[rs3]=%r[30] positioned on the first half region of register 11 and a single operand %r[rs2]=%r[80] positioned at the second half region which three operands have been selected by the MSBs b_rs1[6], b_rs2[6], b_rs3[6]=0, 1, 0 of the register number assignments. In the meanwhile, extended operator 12e executes the arithmetic operation using values represented by an operand %r[N+rs2]=%r[16] positioned at the first half region of register 11 and two operands %r[N+rs1]=%r[74] and %r[N+rs3]=%r[94] positioned at the second half region of register 11 which three operands are selected by the MSBs e_rs1[6], e_rs2[6], e_rs3[6]=1, 0, 1 of the register number assignments. Arithmetic operators 12b and 12e output, to register 11, the results of the same arithmetic operation performed using different operands. In the second mode, the fixed value "1" is set into control signals b_we and e_we for recording into register 11 from arithmetic operators 12b and 12e, respectively. Therefore, the result of the arithmetic operation by ordinary operator 12b takes the register value %r[rd]=%r[40], which is to be recorded into the first half region of register 11, and similarly, the result of the arithmetic operation by extended operator 12e takes the register value %r[rd]=%r[104], which is recorded into the second half region of the register 11.

TABLE 12

| INSTRUCTION CODE | VALUE |
|---|---|
| opcode[3:0] | 0101 (simd-fmsub) |
| rd[6:0] | 0101000 (40) |
| rs1[6:0] | 0001010 (10) |
| rs2[6:0] | 1010000 (80) |
| rs3[6:0] | 0011110 (30) |

TABLE 13

| INPUT SIGNAL | VALUE |
|---|---|
| b_op[1:0] | 01 (fmsub) |
| b_we | 1 (fixed value) |
| e_op[1:0] | 01 (fmsub) |
| e_we | 1 (fixed value) |
| b_rd[6:0] | 0101000 (40) |
| b_rs1[6:0] | 0001010 (10) |
| b_rs2[6:0] | 1010000 (80) |
| b_rs3[6:0] | 0011110 (30) |
| e_rd[6:0] | 1101000 (104) |
| e_rs1[6:0] | 1001010 (74) |
| e_rs2[6:0] | 0010000 (16) |
| e_rs3[6:0] | 1011110 (94) |

The above example assumes that the instruction kind code opcode[3:0] is set to be "0101" and unused bits rs1[6] and rs2[6] are set to be "0" and "1", respectively. However, the second mode of the use of unused bits can realize other combinations of arithmetic operations. Here, opcode[1:0] selects one from the four arithmetic operations to be performed by arithmetic operators 12b and 12e, and values of unused bits rs1[6] and rs2[6] specify and select two operands that are to be input into each of arithmetic operators 12b and 12e (i.e., that is to be multiplied) from the first half region or second half region of register 11.

If unused bits (the MSBs) rs1[6] and rs2[6] are set to be both "0", the MSBs b_rs1[6], b_rs2[6], and b_rs3[6] of the register number assignments are 0, 0, and 0 and the MSBs e_rs1[6], e_rs2[6], e_rs3[6] of the register number assignments are 1, 1, and 1, respectively. Accordingly, ordinary operator 12b executes the arithmetic operation using, as input values, three operands %r[rs1], %r[rs2], and %r[rs3] from the first half region of register 11. Extended operator 12e executes the arithmetic operation using, as input values, three operands %r[N+rs1], %r[N+rs2] and %r[N+rs3] from the second half region of register 11.

If unused bits (the MSBs) rs1[6] and rs2[6] are set to be respectively "0" and "1", the MSBs b_rs1[6], b_rs2[6], and b_rs3[6] of the register number assignments are 0, 1, and 0 and the MSBs e_rs1[6], e_rs2[6], e_rs3[6] of the register number assignments are 1, 0, and 1, respectively. Accordingly, ordinary operator 12b executes the arithmetic operation using, as input values, two operands %r[rs1] and %r[rs3] from the first half region of register 11 and a single operand %r[N+rs2] from the second half region of register 11. Extended operator 12e executes the arithmetic operation using, as input values, a single operand %r[rs2] from the first half region of register 11 and two operands %r[N+rs1] and %r[N+rs3] from the second half region of register 11.

If unused bits (the MSBs) rs1[6] and rs2[6] are set to be respectively "1" and "0", the MSBs b_rs1[6], b_rs2[6], and b_rs3[6] of the register number assignments are 1, 0, and 0 and the MSBs e_rs1[6], e_rs2[6], e_rs3[6] of the register number assignments are 0, 1, and 1, respectively. Accordingly, ordinary operator 12b executes the arithmetic operation using, as input values, two operands %r[rs2] and %r[rs3] from the first half region of register 11 and a single operand %r[N+rs1] from the second half region of register 11. Extended operator 12e executes the arithmetic operation using, as input values, a single operand %r[rs1] from the first half region of register 11 and two operands %r[N+rs2] and %r[N+rs3] from the second half region of register 11.

If unused bits (the MSBs) rs1[6] and rs2[6] are set to be both "1", the MSBs b_rs1[6], b_rs2[6], and b_rs3[6] of the register number assignments are 1, 1, and 0 and the MSBs e_rs1[6], e_rs2[6], e_rs3[6] of the register number assignments are 0, 0, and 1, respectively. Accordingly, ordinary operator 12b executes the arithmetic operation using a single operand %r[rs3] from the first half region of register 11 and two operands %r[N+rs1] and %r[N+rs2] from the second half region of register 11. Extended operator 12e executes the arithmetic operation using two operands %r[rs1], %r[rs2] from the first half region of register 11 and a single operand %r [N+rs3] from the second half region of register 11.

Figure 20:
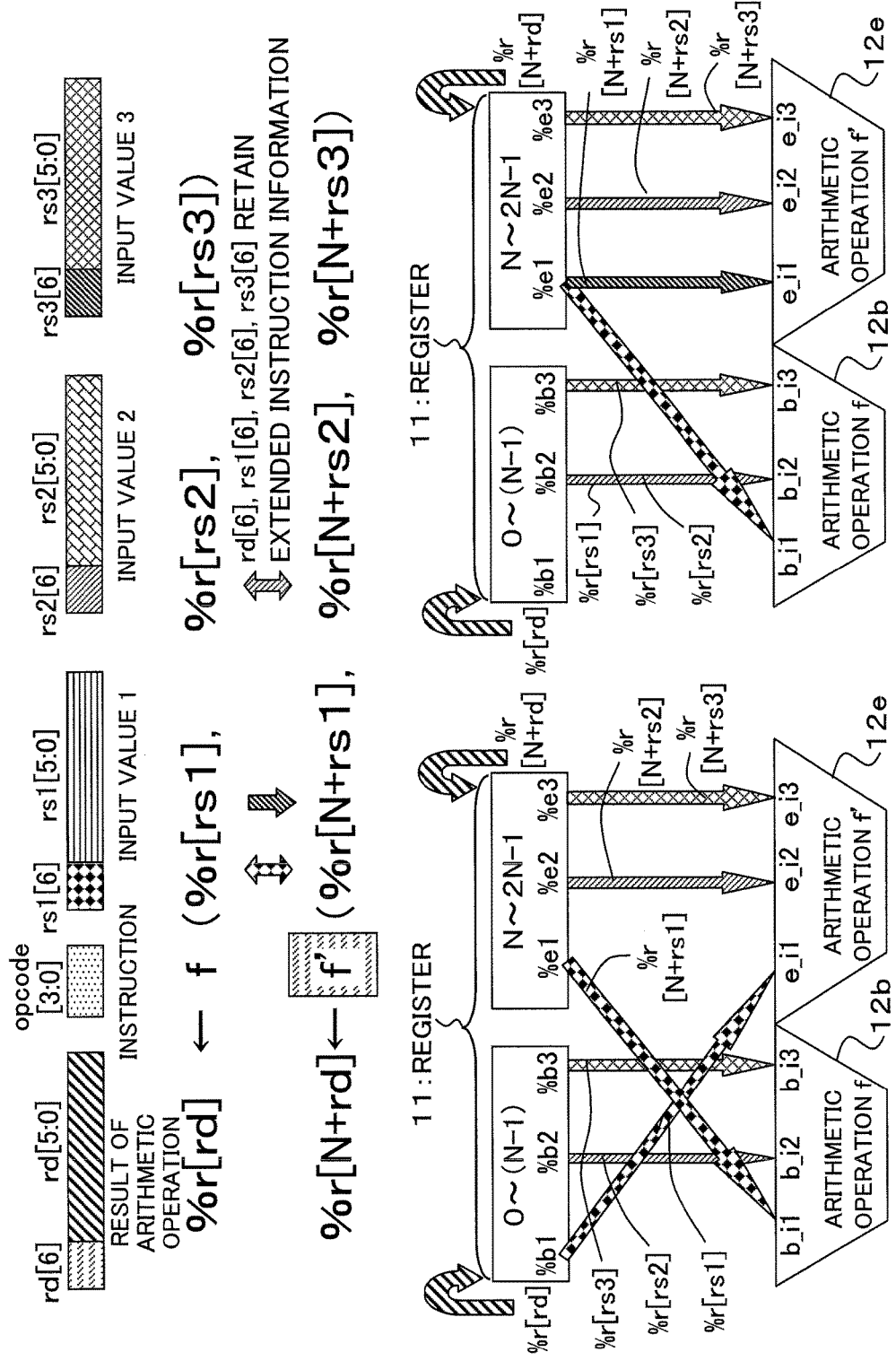
Figure 21:
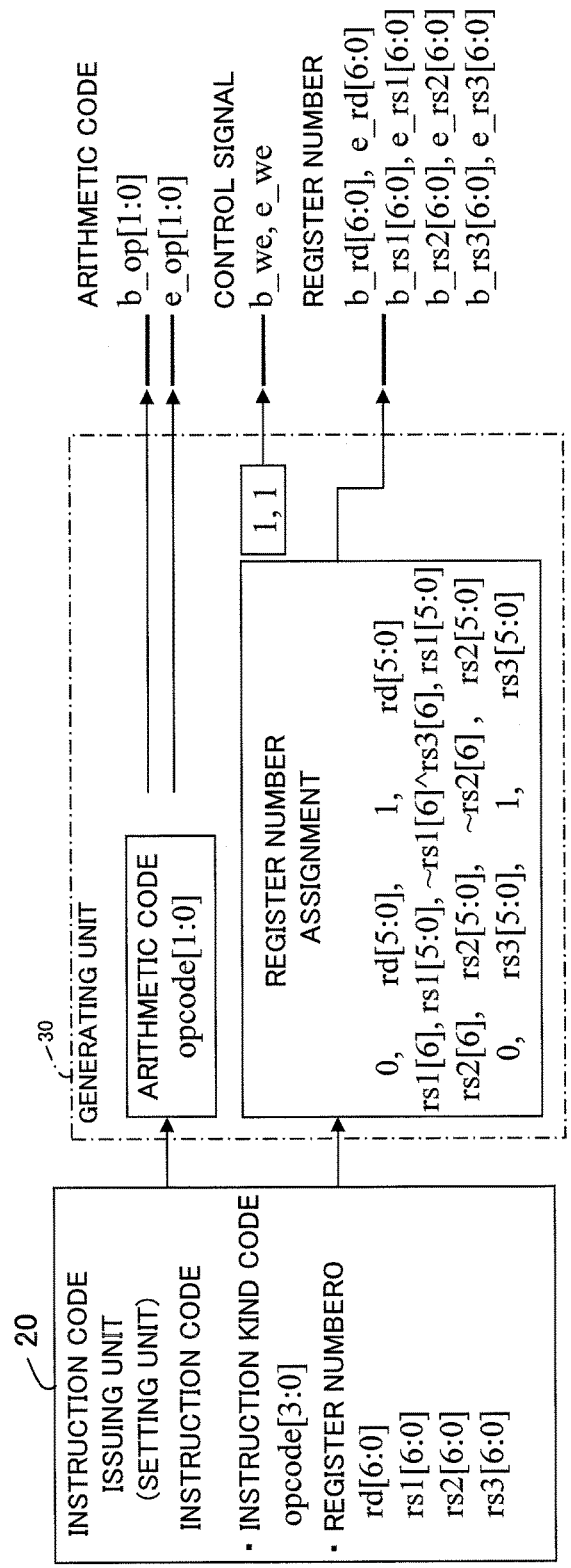
FIG. 21 is a diagram briefly showing an operation performed in the third mode of the use of unused bits by the instruction code issuing unit (setting unit) and the generating unit in the arithmetic operating apparatus of FIG. 1.

[7] Operation Performed of the Arithmetic Operating Apparatus in Third Mode of Use of Unused Bits:

FIGS. 19 and 20 briefly show an operation performed by arithmetic unit 10 of arithmetic operating apparatus 1 shown in FIG. 1 during a third mode of the use of unused bit; FIG. 21 shows operations performed by instruction code issuing unit (setting unit) 20 and generating unit 30 in the arithmetic operating apparatus 1 during the third mode; and FIGS. 22A-22D specifically show an instruction code, an arithmetic code, a register recording signal, and register number assignments (only the MSBs) of arithmetic operating apparatus 1 of FIG. 1 in the third mode. FIGS. 23A, 23B, 24A, and 24B show specific combinations of arithmetic operations that are to be executed during the third mode by arithmetic unit 10 of arithmetic operating apparatus 1 shown in FIG. 1; and FIG. 25 shows specific examples to realize generating unit 30 of arithmetic operating apparatus 1 shown in FIG. 1.

During the third mode of the use of the unused bit that is to be detailed here, all the unused bits rd[6], rs1[6], rs2[6], and rs3[6] that have come to be unused in instruction sets simd-fmadd, simd-fmsub, simd-fnmsub, and simd-fnmadd in a SIMD scheme described above are used as shown in FIG. 22A. The second mode expands a SIMD instruction by using unused bit rs1[6] and rs2[6] while the third mode further expands a SIMD instruction by using also the remaining unused bits rs3[6] and rd[6].

The unused bit rs3[6] is used to select a register number representing an operand for the multiplication performed in extended operator 12e, and similarly the unused bit rd[6] is used to select arithmetic code e-op[1:0] for extended operator 12e. As shown in FIGS. 19 and 20, such an extension of a SIMD instruction can realize the same arithmetic operation added by the first mode. Instruction cross-fmadd1, . . . , cross-fmadd added in the first mode can be accordingly dispensable in the third mode.

Instruction code issuing unit 20 functioning as the setting unit sets the extended instruction information into these four unused bits rd[6], rs1[6], rs2[6], and rs3[6]. Such extended instruction information instructs register 11 and arithmetic operators 12b and 12e to execute an extended process (e.g., see the combinations of arithmetic operations shown in FIGS. 23A, 23B, 24A, and 24B), which is different from an ordinary process (see the left example in FIG. 19) performed in obedience with each of instruction sets simd-fmadd, simd-fmsub, simd-fnmsub, and simd-fnmadd that do not use the unused bits rd[6], rs1[6], rs2[6], and rs3[6]. On the basis of the extended instruction information set in the unused bits and information set in bits except for the unused bits, generating unit 30 generates an extended instruction that instructs register 11 and arithmetic operators 12b and 12e to execute the extended process and outputs the extended instruction to register 11, as will be described below with reference to FIGS. 21 and 22A-22D.

As shown on the right portion of FIG. 19 and FIG. 20, thereby, each of arithmetic operators 12b and 12e is allowed to execute an arithmetic operation using operands from both the first half region and the second half region of register 11.

The extended instruction further switches arithmetic operation to be performed by extended operator 12e, which is in response controlled to switch arithmetic operations. Accordingly, an imaginary-number matrix multiplication executed by the four arithmetic operations (i.e., the four instructions) of the above expressions (1-1) to (1-4) can be carried out through two instructions as detailed below.

In adoption of the third mode of the used of unused bits, the significant two bits opcode[3:2] of an instruction kind code issued by instruction code issuing unit 20 are set to be "01". Hereinafter, description will now be made in relation to operations of arithmetic operating apparatus 1 in the third mode of the use of unused bits with reference to FIGS. 21-25.

In the third mode, generating unit 30 converts the instruction code opcode[3:0] and the four register number assignments rd[6:0], rs1[6:0], rs2[6:0], and rs3[6:0] issued by instruction code issuing unit 20 are converted as shown in FIG. 21, and an instruction set b_we, e_we, b_rd[6:0], b_rs1[6:0], b_rs2[6:0], b_rs3[6:0], e_rd[6:0], e_rs1[6:0], e_rs2[6:0], e_rs3[6:0], b_op[1:0],and e_op[1:0] is input into arithmetic unit 10.

Here, the last two bits opcode[1:0] of the instruction kind code included in an instruction code serves as the arithmetic code b_op[1:0] for ordinary operator 12b. Further, generating unit 30 generates on the basis of the values of unused bit rd[6] the arithmetic code e_op[1:0] for extended operator 12e as shown in FIG. 22B and Table 14 below. Differently from the SIMD scheme described above, the third mode controls and switches arithmetic operations to be executed by arithmetic operators 12b and 12e independently of each other. Arithmetic operators 12b and 12e can thereby execute the same arithmetic operation or different arithmetic operations. Such a combination of the SIMD instruction and the value (the extended instruction information) set in unused bit rd[6] can realize the same number of combinations of arithmetic operations as the combinations added in the first mode.

TABLE 14

| INSTRUCTION KIND CODE | rd[6] | b_op[1:0] | e_op[1:0] |
|---|---|---|---|
| simd-fmadd | 0 | 00(fmadd) | 00(fmadd) |
| simd-fmadd | 1 | 00(fmadd) | 10(fnmsub) |
| simd-fmsub | 0 | 01(fmsub) | 01(fmsub) |
| simd-fmsub | 1 | 01(fmsub) | 11(fnmadd) |
| simd-fnmsub | 0 | 10(fnmsub) | 10(fnmsub) |
| simd-fnmsub | 1 | 10(fnmsub) | 00(fmadd) |
| simd-fnmadd | 0 | 11(fnmadd) | 11(fnmadd) |
| simd-fnmadd | 1 | 11(fnmadd) | 01(fmsub) |

As shown in FIGS. 21 and 22C, for the third mode, the fixed value "1" is set in control signals b_we and e_we for recording into register 11 respectively from arithmetic operators 12b and 12e. This records the results of arithmetic operations performed by arithmetic operators 12b and 12e respectively into the first half region and the second half region of register 11.

As shown in FIG. 21, for register number assignments b_rd[5:0], b_rs1[5:0], b_rs2[5:0], b_rs3[5:0] for ordinary operator 12b, the last six bits rd[5:0], rs1[5:0], rs2[5:0], rs3[5:0] of the four register number assignments included in an instruction code are input into register 11. At the same time, the same data pieces rd[5:0], rs1[5:0], rs2[5:0], rs3[5:0] also serve as register number assignments e_rd[5:0], e_rs1[5:0], e_rs2[5:0], e_rs3[5:0] for extended operator 12e, which are input into register 11.

The fixed value "0" is set into the MSBs b_rd[6] and b_rs3[6] of register number assignments for ordinary operator 12b, and the fixed value "1" is set into the MSBs e_rd[6] and e_rs3[6] of register number assignments for extended operator 12e as shown in FIGS. 21 and 22D and Table 15 below. In contrast, into the MSBs b_rs1[6] and b_rs2[6] of register number assignments for ordinary operator 12b, the value of rs1[6] and rs2[6] are set. For the MSBs e_rs1[6], e_rs2[6] of register number assignments for extended operator 12e, ~rs1[6]^rs3[6], and ~rs2[6] are calculated, generated, and set. Thereby, two operands each from one of the first half region and the second half region of register 11 can be used in an arithmetic operation in each of arithmetic operators 12b and 12e. In other words, extended instruction information set in unused bits rs1[6], rs2[6], and rs3[6] instructs register 11 to switch a value to be input into one of arithmetic operators 12b and 12e from a value in the region allocated to one of the arithmetic operators to a value in the region allocated to the other arithmetic operator. Here, "~X" represents an inverted value of "X", and "A^B" represents an exclusive OR (EOR) of values A and B.

Values (extended instruction information) set in unused bit rs1[6], rs2[6], rs3[6] have the association with values to be set in the MSBs b_rs1[6], b_rs2[6], e_rs1[6], and e_rs2[6] as shown in the following Table 15.

TABLE 15

| rs1[6] | rs2[6] | rs3[6] | b_rs[1] | b_rs2[6] | e_rs1[6] | e_rs2[6] |
|--------|--------|--------|---------|----------|----------|----------|
| 0 | 0 | 0 | 0 | 0 | 1 | 1 |
| 0 | 0 | 1 | 0 | 0 | 0 | 1 |
| 0 | 1 | 0 | 0 | 1 | 1 | 0 |
| 0 | 1 | 1 | 0 | 1 | 0 | 0 |
| 1 | 0 | 0 | 1 | 0 | 0 | 1 |
| 1 | 0 | 1 | 1 | 0 | 1 | 1 |
| 1 | 1 | 0 | 1 | 1 | 0 | 0 |
| 1 | 1 | 1 | 1 | 1 | 1 | 0 |

Here, the values (extended instruction information) to be set in unused bits rs1[6], rs2[6], and rs3[6] have the following functions:

rs1[6] set to be "1" supplies the first input b_i1 into ordinary operator 12b from an operand on the second half region of register 11;

rs2[6] set to be "1" supplies the second input b_i2 into ordinary operator 12b from an operand on the second half region of register 11;

rs3[6] set to be "1" supplies the first input b_i1 into extended operator 12e from an operand on the same region as the first input value b_i1 (the rs1 copying flag); and rd[6] varies the arithmetic code e_op[1:0] (multiplies "−1" with the result of multiplication-addition).

Next, description is to be made in relation to example of an operation performed to execute of an arithmetic operation "simd-fmadd" %f30, %f10, %f20, %f{30+64}" in the third mode of the use of unused bits.

In this arithmetic operation, arithmetic operators 12b and 12e of arithmetic unit 10 execute the two arithmetic operations below.

at ordinary operator 12b,

%r[30]←%r[10]*%r[20]+%r[30]

at extended operator 12e,

%r[94]←%r[10]*%r[84]+%r[94]

These two arithmetic operations correspond to the following imaginary-number arithmetic operation which uses operands of the actual part and operand of the imaginary part from the first half region and the second half region of register 11, respectively.

$$X \leftarrow X + A*C \quad (1\text{-}1)$$

$$Y \leftarrow Y + A*D \quad (1\text{-}2)$$

In this case, values of the instruction kind code opcode [3:0] and register number assignment rd[6:0], rs1[6:0], rs2 [6:0], and rs3[6:0] specified by an instruction code shown in Table 16 below are converted into values that are to be input into arithmetic operators 12b and 12e shown in Table 17 below and input into register 11. Specifically, as shown in Table 16 below, the instruction kind code opcode[3:0] issued from instruction code issuing unit 20 is set to be "0100", and instruction code issuing unit 20 functioning as the setting unit sets 0, 0, 0, and 1 into four unused bits rd [6:0], rs1[6:0], rs2[6:0], rs3[6:0], respectively (see the upper first from the left example in FIG. 23B described below). In accordance with these values, generating unit 30 calculates and sets, on the basis of the expression in FIG. 22D and Table 15, 0, 0, 0, and 0 for the MSBs b_rd [6], b_rs1[6], b_rs2[6], and b_rs3[6] of the register number assignments for ordinary operator 12b (see Table 17 below). In the same manner, generating unit 30 calculates and sets 1, 0, 1, and 1 for the MSBs e_rd[6], e_rs1[6], e_rs2[6], and e_rs3[6] of the register number assignments for extended operator 12e (see Table 17 below). The arithmetic code "00" determined in terms of the value of unused bit rd[6] and the instruction kind code opcode[1:0] as shown in the expression of FIG. 22B and above Table 14 is input into extended arithmetic operator 12e. Accordingly, arithmetic operators 12b and 12e execute the same arithmetic operation (fmadd) in this example. The identical values rd[5:0], rs1[5:0], rs2[5:0], and rs3[5:0] are input into the last six bits of register number assignments for ordinary operator 12b and those for extended operator 12e.

Figure 23A:
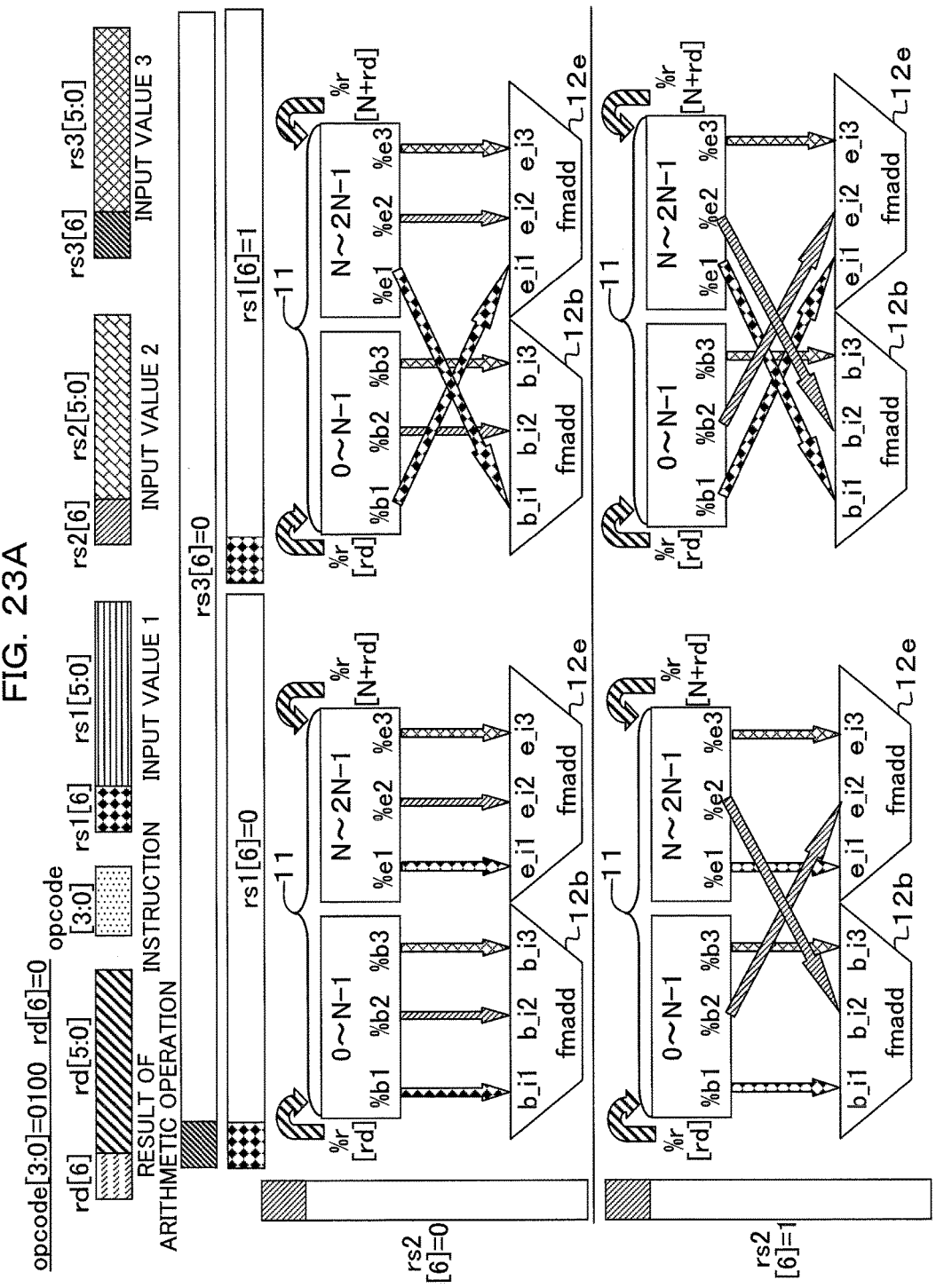
FIGS. 23A, 23B, 24A, and 24B are diagrams each showing a combination of arithmetic operations performed in the third mode of the use of unused bits by the arithmetic operating unit of the arithmetic operating apparatus of FIG. 1.
Figure 23B:
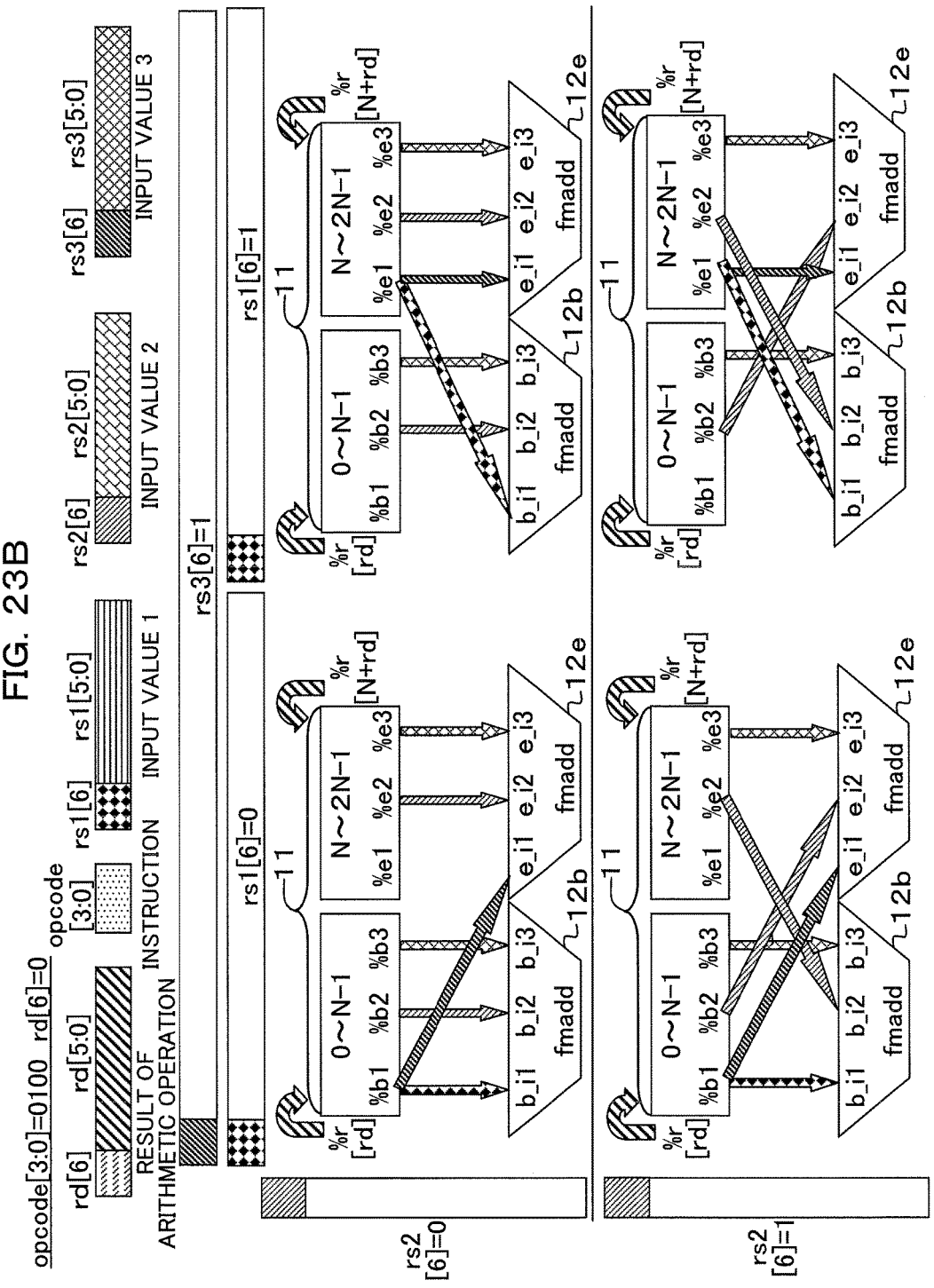

Ordinary operator 12b then executes an arithmetic operation based on above expression (1-1) using input values represented by three operands A(%r[rs1]=%r[10]), C(%r [rs2]=%r[20]), and X(%r[rs3]=%r[30]) which are selected by the MSBs b_rs1[6], b_rs2[6], b_rs3[6]=0, 0, 0 of the register number assignments from the first half region as shown by the upper first from the left example shown in FIG. 23B. In the meanwhile, extended operator 12e executes an arithmetic operation based on above expression (1-2) on input values represented by a single operand A(%r[rs1]=%r [10]) positioned on the first half region and two operands D(%r[N+rs2]=%r[84]) and Y(%r[N+rs3]=%r[94]) positioned on the second half region which operands A, D and Y are selected by the MSBs e_rs1[6], e_rs2[6], e_rs3[6]=0, 1, 1 of the register number assignments as shown in the upper first from the left example of FIG. 23B. Arithmetic operators 12b and 12e output to register 11 the results of the same arithmetic operation performed using different operands. In the third mode, the fixed value "1" is set into control signals b_we and e_we for recording into register 11 from arithmetic operators 12b and 12e, respectively. Therefore, the result of the arithmetic operation by ordinary operator 12b takes the register value %r[rd]=%r[30], which is to be recorded into the first half region of register 11, and similarly, the result of the arithmetic operation by extended operator 12e takes the register value %r[N+rd]=%r[94], which is recorded into the second half region of the register 11. In other words, two arithmetic operations of the above expressions (1-1) and (1-2) can be executed in accordance with a single instruction, and similarly the arithmetic operation represented by the above expressions (1-3) and (1-4) can be carried out in obedience to a single instruction. As a consequence, an imaginary-number arithmetic operation which has conventionally needed for four instructions can be carried out by two instructions.

TABLE 16

| INSTRUCTION CODE | VALUE |
| --- | --- |
| opcode[3:0] | 0100 (simd-fmadd) |
| rd[6:0] | 0011110 (30) |
| rs1[6:0] | 0001010 (10) |
| rs2[6:0] | 0010100 (20) |
| rs3[6:0] | 1011110 (94) |

TABLE 17

| INSTRUCTION CODE | VALUE |
| --- | --- |
| b_op[1:0] | 00 (fmadd) |
| b_we | 1 (fixed value) |
| e_op[1:0] | 00 (fmadd) |
| e_we | 1 (fixed value) |
| b_rd[6:0] | 0011110 (30) |
| b_rs1[6:0] | 0001010 (10) |
| b_rs2[6:0] | 0010100 (20) |
| b_rs3[6:0] | 0011110 (30) |
| e_rd[6:0] | 1011110 (94) |
| e_rs1[6:0] | 0001010 (10) |
| e_rs2[6:0] | 1010100 (84) |
| e_rs3[6:0] | 1011110 (94) |

The above example assumes that the instruction kind code opcode[3:0] is set to be "0100" (simd-fmadd) and the four unused bits rd[6], rs1[6], rs2[6], and rs3[6] are set to be 0, 0, 0, and 1, respectively. However, the third mode of the use of unused bits can realize 63 more combinations of arithmetic operations. Specifically, and additionally can realize 16 combinations of arithmetic operation can be realized for each of the four SIMD instruction (specified by instruction kind codes opcode[3:0]=0100(simd-fmadd), 0101(simd-fmsub), 0110(simd-fnmsub), and 0111(simd-fnmadd)). In short, the third mode can realize 64 combinations of arithmetic operations in total. Here, the 16 combinations of arithmetic operation patterns for one determined by the instruction kind code opcode [3:0]="0100"(simd-fmadd) from the four SIMD instructions will be detailed with reference to FIGS. 23A, 23B, 24A, and 24B. The remaining three SIMD instructions each have 16 combinations of arithmetic operation similarly to the disclosure in FIGS. 23A, 23B, 24A, and 24B.

FIGS. 23 A, 23B, 24A, and 24B show eight combinations of arithmetic operations specified by an instruction kind code opcode[3:0]="0100" and unused bit rd[6]=0. In this case, arithmetic operators 12b and 12e carries out the same arithmetic operation fmadd.

In particular, FIG. 23A shows four combinations of arithmetic operations further when unused bits rd[6]=0 and rs3[6]=0.

In this case, if unused bits (the MSBs) rs1[6] and rs2[6] are set to be both "0", the MSBs b_rs1[6], b_rs2[6], and b_rs3[6] of the register number assignments are all "0" and the MSBs e_rs1[6], e_rs2[6], e_rs3[6] of the register number assignments are all "1". Accordingly, as shown in the upper first from the left example of FIG. 23A, ordinary operator 12b executes the arithmetic operation (fmadd) using, as input values, three operands r[rs1], %r[rs2], and %r[rs3] from the first half region of register 11. Extended operator 12e executes the arithmetic operation (fmadd) using, as input values, three operands %r[N+rs1], %r[N+rs2] and %r[N+rs3] from the second half region of register 11.

If unused bits (the MSBs) rs1[6] and rs2[6] are set to be respectively "0" and "1", the MSBs b_rs1[6], b_rs2[6], and b_rs3[6] of the register number assignments are respectively 0, 1, 0 and the MSBs e_rs1[6], e_rs2[6], e_rs3[6] of the register number assignments are respectively 1, 0, 1. Accordingly, as shown in the lower first from the left example of FIG. 23A, ordinary operator 12b executes the arithmetic operation (fmadd) using, as input values, two operands r[rs1] and %r[rs3] from the first half region of register 11 and the single operand %r[N+rs2] from the second half region of register 11. Extended operator 12e executes the arithmetic operation (fmadd) using, as input values, a single operand %r[rs2] from the first half region of register 11 and two operands %r[N+rs1] and %r[N+rs3] from the second half region of register 11.

If unused bits (the MSBs) rs1[6] and rs2[6] are set to be respectively 1 and 0, the MSBs b_rs1[6], b_rs2[6], and b_rs3[6] of the register number assignments are respectively 1, 0, and 0, and the MSBs e_rs1[6], e_rs2[6], e_rs3[6] of the register number assignments are 0, 1, and 1, respectively. Accordingly, as shown in the upper second from the left example of FIG. 23A, ordinary operator 12b executes the arithmetic operation (fmadd) using, as input values, two operands %r[rs2] and %r[rs3] from the first half region of register 11 and a single operand %r[N+rs1] from the second half region of register 11. Extended operator 12e executes the arithmetic operation (fmadd) using, as input values, a single operands %r[rs1] from the first half region of register 11 and two %r[N+rs2] and %r[N+rs3] from the second half region of register 11.

If unused bits (the MSBs) rs1[6] and rs2[6] are set to be both 1, the MSBs b_rs1[6], b_rs2[6], and b_rs3[6] of the register number assignments are respectively 1, 1, and 0, and the MSBs e_rs1[6], e_rs2[6], e_rs3[6] of the register number assignments are 0, 0, and 1, respectively. Accordingly, as shown in the lower second from the left example of FIG. 23A, ordinary operator 12b executes the arithmetic operation (fmadd) using, as input values, a single operand %r[rs3] from the first half region of register 11 and two operands %r[N+rs1] and %r[N+rs2] from the second half region of register 11. Extended operator 12e executes the arithmetic operation (fmadd) using, as input values, two operands %r[rs1] and %r [rs2] from the first half region of register 11 and a single operand %r [N+rs3] from the second half region of register 11.

FIG. 23B shows four combinations of arithmetic operations further when unused bits rd[6]=0 and rs3[6]=1.

In this case, if unused bits (the MSBs) rs1[6] and rs2[6] are both "0", the MSBs b_rs1[6], b_rs2[6], and b_rs3[6] of the register number assignments are all "0" and the MSBs e_rs1[6], e_rs2[6], e_rs3[6] of the register number assignments are 0, 1, and 1, respectively. Accordingly, as shown in the upper first from the left example of FIG. 23B, ordinary operator 12b executes the arithmetic operation (fmadd) using, as input values, three operands %r[rs1], %r[rs2], and %r[rs3] from the first half region of register 11. Extended operator 12e executes the arithmetic operation (fmadd) using, as input values, a single operand %r[rs1] from the first half region of register 11 and two operands %r[N+rs2] and %r[N+rs3] from the second half region of register 11.

If unused bits (the MSBs) rs1[6] and rs2[6] are set to be respectively 0 and 1, the MSBs b_rs1[6], b_rs2[6], and b_rs3[6] of the register number assignments are respectively 0, 1, and 0, and the MSBs e_rs1[6], e_rs2[6], e_rs3[6] of the register number assignments are 0, 0, and 1, respectively. Accordingly, as shown in the lower first from the left example of FIG. 23B, ordinary operator 12b executes the arithmetic operation (fmadd) using, as input values, two operands %r[rs1] and %r[rs3] from the first half region of register 11 and a single operand %r[N+rs2] from the second half region of register 11. Extended operator 12e executes the arithmetic operation (fmadd) using, as input values, two operands %r[rs1] and %r[rs2] from the first half region of register 11 and a single operand %r[N+rs3] from the second half region of register 11.

If unused bits (the MSBs) rs1[6] and rs2[6] are set to be respectively 1 and 0, the MSBs b_rs1[6], b_rs2[6], and b_rs3[6] of the register number assignments are respectively 1, 0, and 0, and the MSBs e_rs1[6], e_rs2[6], e_rs3[6] of the register number assignments are 1, 1, and 1. Accordingly, as shown in the upper second from the left example of FIG. 23B, ordinary operator 12b executes the arithmetic operation (fmadd) using, as input values, two operands %r [rs2] and %r [rs3] from the first half region of register 11 and a single operand %r[N+rs1] from the second half region of register 11. Extended operator 12e executes the arithmetic operation (fmadd) using, as input values, three operands %r[N+rs1], %r[N+rs2], and %r[N+rs3] from the second half region of register 11.

If unused bits (the MSBs) rs1[6] and rs2[6] are set to be both 1, the MSBs b_rs1[6], b_rs2[6], and b_rs3[6] of the register number assignments are respectively 1, 1, and 0, and the MSBs e_rs1[6], e_rs2[6], e_rs3[6] of the register number assignments are 1, 0, and 1, respectively. Accordingly, as shown in the lower second from the left example of FIG. 23B, ordinary operator 12b executes the arithmetic operation (fmadd) using, as input values, a single operand %r[rs3] from the first half region of register 11 and two operands %r[N+rs1] and %r[N+rs2] from the second half region of register 11. Extended operator 12e executes the arithmetic operation (fmadd) using, as input values, a single operand %r[rs2] from the first half region of register 11 and two operands %r[N+rs1] and %r[N+rs3] from the second half region of register 11.

Figure 24A:
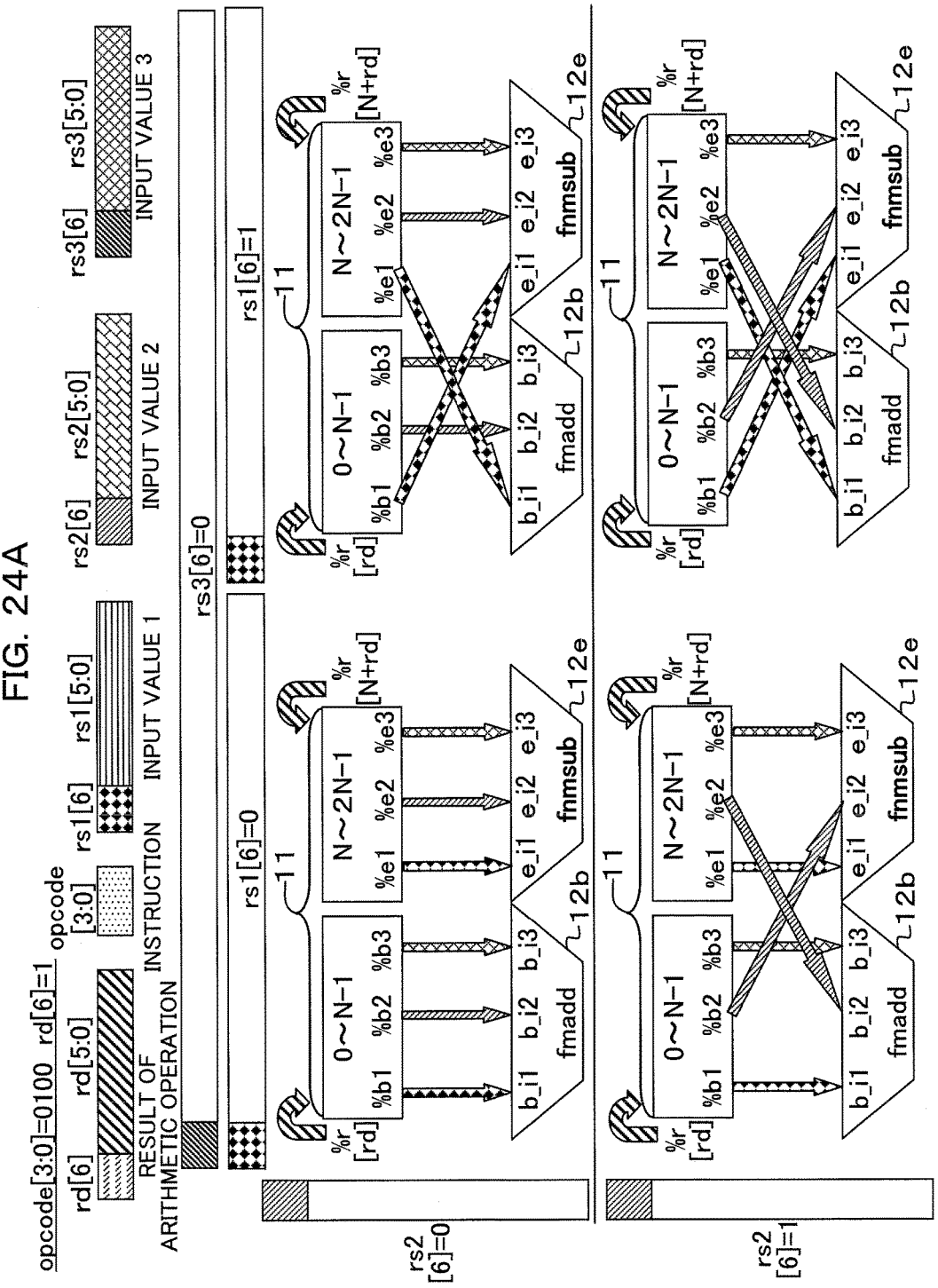
Figure 24B:
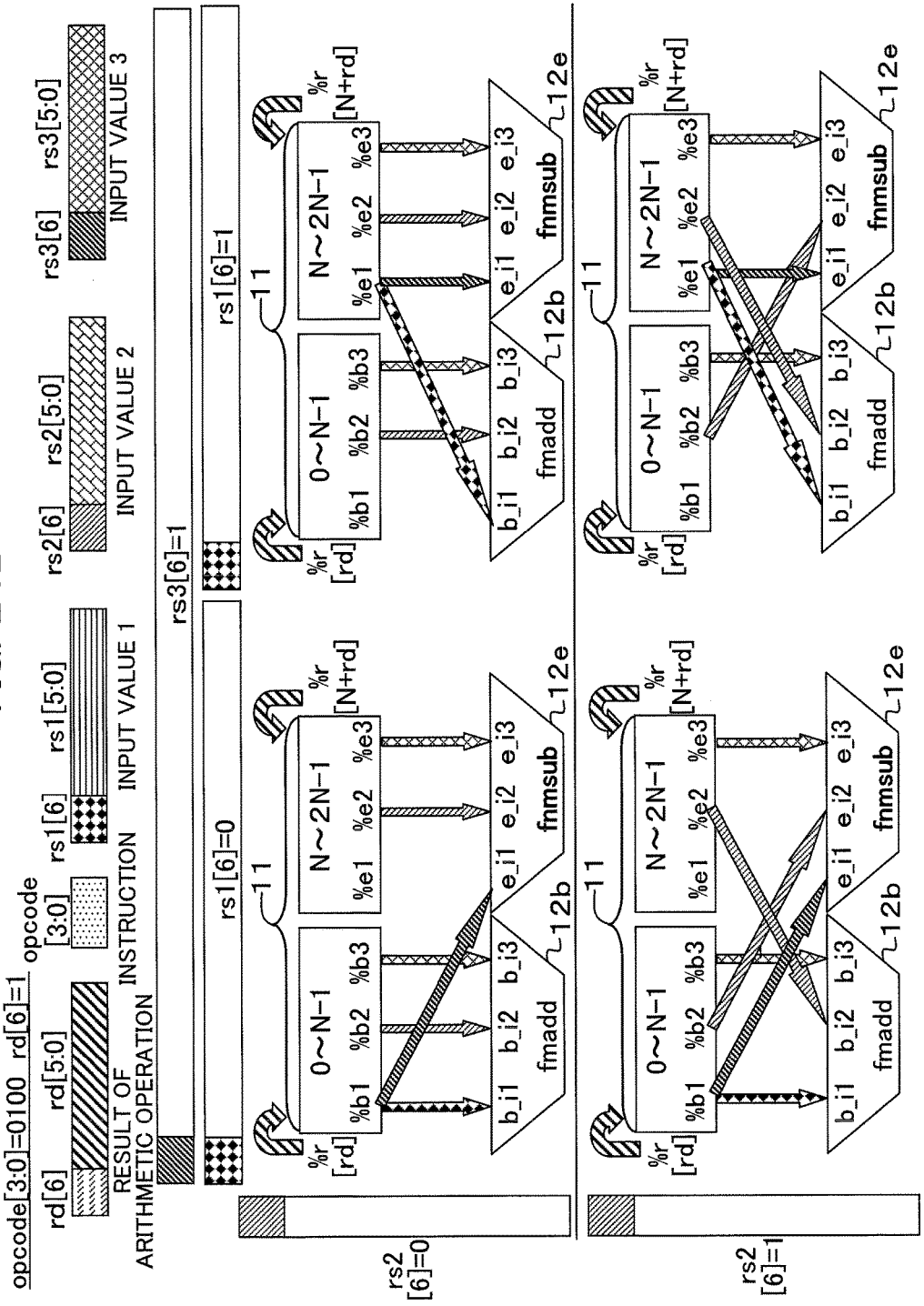

FIGS. 24A and 24B show eight combinations of arithmetic operations when the instruction kind code opcode [3:0]=0100 and unused bit rd[6]=1. In this case, ordinary operator 12b executes an arithmetic operation fmadd and extended operator 12e executes an arithmetic operation fnmsub. FIG. 24A shows four arithmetic combinations of arithmetic operations further when unused bits rd[6]=1 and rs3[6]=0 and FIG. 24B shows four combinations of arithmetic operations further when unused bits rd[6]=1 and rs3[6]=1. In the combinations of arithmetic operations of FIGS. 24A and 24B, the unused bit rd[6]=1 switches an arithmetic operation to be carried out by extended operator 12e to arithmetic operation fnmsub different from that to be performed by ordinary operator 12b, and the remaining is identical to the combinations shown in FIGS. 23A and 23B. So, the description for FIGS. 24A and 24B will be omitted here.

Description will now be made in relation to a specific example of generating unit 30 of arithmetic operating apparatus 1 shown in FIG. 1 when the third mode of the use of unused bit is being carried out with reference to FIG. 25. Generating unit 30 shown in FIG. 25 includes four logical product circuits (AND gates) 31, 32, 33, and 34, two exclusive logical sum circuit (EOR gates) 35 and 36, and inverting circuits (NOT gates, inverters) 31a, 32a, 34a, and 36a. Generating unit 30 of this example can deal with an operation in the non-SIMD mode in accordance with instruction kind code opcode[2] detailed above with reference to FIGS. 3-5. In other words, opcode[2]=1 selects execution of an operation in the third mode described with reference to the FIGS. 19-24B, and opcode[2]=0 selects execution of an operation in the non-SIMD mode with reference to FIGS. 3-5.

AND gate 31 calculates a logical product of rd[6] and an inverse of opcode[2], and outputs the logical product for the register number assignment b_rd[6]. The inverse of opcode [2] that is to be input into AND gate 31 is generated and output by inverting circuit 31a. In other words, when the non-SIMD mode is adopted according to opcode[2]=0, the inverse 1 of opcode[2] is input into AND gate 31 and the operand rd[6] is output to serve as b_rd[6]. On the other hand, when the third mode is adopted by opcode[2]=1, the inverse 0 of opcode[2] is input into AND gate 31 and b_rd[6] is fixed to 0.

AND gate 32 calculates the logical product of rs3[6] and an inverse of opcode[2] and outputs the logical product for the register number assignment b_rs3[6]. The inverse of opcode[2] that is to be input into AND gate 32 is generated by inverting circuit 32a. In other words, when the non-SIMD mode is adopted by opcode[2]=0, the inverse 1 of opcode[2] is input into AND gate 32 and the operand rs6[6] is output for b_rs3[6]. On the other hand, when the third mode is adopted by opcode[2]=1, the inverse 0 of opcode[2] is input into AND gate 31 and b_rs3[6] is fixed to 0.

EOR gate 36 calculates an exclusive logical sum of rs3[6] and the inverse of rs1[6], and outputs the logical sum. The inverse of rs1[6] to be input into EOR gate 36 is calculated by inverting circuit 36a. An exclusive logical sum calculated by EOR gate 36 corresponds the value ~rs1[6]^rs3[6] detailed above with reference to Table 15 and FIGS. 21 and 22D.

AND gate 33 calculates the logical product of an output from EOR gate 36 and opcode[2], and outputs the logical product for the register number assignments e_rs1[6]. In other words, when the non-SIMD mode is adopted by opcode[2]=0, e_rs1[6] is fixed to 0. On the other hand, when the third mode is adopted by opcode[2]=1, ~rs1[6]^rs3[6] is output for e_rs1[6] (see FIG. 22D).

AND gate 34 calculates the logical product of the inverse of rs2[6] and opcode[2], and outputs the logical product for the register number assignments e_rs2[6]. The inverse ~rs2[6] of rs2[6] is calculated by inverting circuit 34a. In other words, when the non-SIMD mode is adopted by opcode [2]=0, e_rs2[6] is fixed to O. On the other hand, when the third mode is adopted by opcode[2]=1, ~rs2[6] is output for e_rs2[6] (see FIG. 22D).

EOR gate 35 calculates an exclusive logical sum of rd[6] and opcode[1] and outputs the logical sum for e_op[1]. Generating unit 30 shown in FIG. 25 outputs opcode[1:0] without being modified for the arithmetic code b_op[1:0] and outputs opcode[0] without being modified the arithmetic code e_op[0]. Thereby, generating unit 30 shown in FIG. 25 outputs the arithmetic codes b_op[1:0] and e_op[1:0] as shown in Table 14.

Generating unit 30 of FIG. 25 outputs the fixed value of 1 to serve as a control signal b_we for recording into register 11 and further outputs opcode[2] without being modified to serve as the controls signal e_we for recoding into register 11 and register number assignments e_rd[6] and e_rs3[6]. In addition, generating unit 30 outputs rd[5:0], rs1[6:0], rs2[6:0], and rs3[5:0] for register number assignments b_rd[5:0], b_rs1[6:0], b_rs2[6:0], and b_rs3[5:0], respectively and outputs rd[5:0], rs1[5:0], rs2[5:0], rs3[5:0] for register number assignments e_rd[5:0], e_rs1[5:0], e_rs2[5:0], and e_rs3[5:0] to register 11.

With the above configuration, when the third mode of the use of unused bits is selected by opcode[2]=1, generating unit 30 of FIG. 25 converts instruction code opcode[1:0], rd[6:0], rs1[6:0], rs2[6:0] from instruction code issuing unit 20 into an instruction set b_we, e_we, b_rd[6:0], b_rs1[6:0], b_rs2[6:0], b_rs3[6:0], e_rd[6:0], e_rs1[6:0], e_rs2[6:0], e_rs3[6:0], b_op[1:0], e_op[1:0] described above with reference to Tables 14, 15, FIGS. 21 and 22, and outputs the obtained instruction set. If non-SIMD mode is selected by opcode[2]=0, an instruction code from instruction code issuing unit 20 is converted into an instructions set described above with reference to FIGS. 4 and 5 and outputs the instruction set.

[8] Effect of First Embodiment:

According to arithmetic operating apparatus 1 and a method for arithmetic operation of the first embodiment, the functions of instruction code issuing unit (setting unit) 20 and generating unit 30 make it possible to instruct an extended process, which is different from an ordinary process, by use one or more of the unused bits rd[6], rs1[6], rs2[6], and rs3[6] in a single instruction. Various combinations of arithmetic operations of, for example, a SIMD floating-pint multiply-add can thereby be realized by less instruction kind codes. Therefore, a complex arithmetic operation for an imaginary-number matrix multiplication, which has needed for four instructions, can be realized by two instructions, so that throughput can be doubled.

In addition, arithmetic operating apparatus 1 inputs an arithmetic kind and input register number assignments for ordinary operator 12b and those for extended operator 12e independently of each other. Therefore, arithmetic operators 12b and 12e can execute different arithmetic operations using different operands (register values). Accordingly, arithmetic operating apparatus 1 can also realize combinations of arithmetic patterns described with reference FIGS. 12-15, 23A, 23B, 24A, and 24B with ease in addition to the above imaginary-number matrix multiplication.

[9] Others

The present invention should by no means be limited to the foregoing embodiment, and various changes and modifications can be suggested without departing from the spirit of the present invention.

For example, description is made assuming that the first embodiment includes two arithmetic operators: the ordinary arithmetic operator and the extended operator. However, the present invention is not limited to this. The present invention can also be applied to arithmetic operating apparatus with three or more arithmetic operators, resulting similarly to the first embodiment.

The first embodiment uses bits that come to be unused as a result of adoption of the SIMD scheme, but the present invention is not limited to this. The same result of the first embodiment can be attained by setting extended process information described above into one or more of the unused bits that come to be unused as a result of adoption of various schemes.

Further, functions of instruction code issuing unit 20 (the setting step) and generating unit 30 (the generating step) can be realized by a computer (including a CPU, an information processor, and various terminals) executing a predetermined application program.

The program may be provided in the form of being stored in a computer-readable recording medium, such as a flexible disk, a CD (e.g., CD-ROM, CD-R, CD-RW), a DVD (e.g., DVD-ROM, DVD-RAM, DVD-R, DVD-RW, DVD+R, DVE+RW), a magnetic disk, an optical disk, or a magneto-optical disk. Further, a computer may read the program from the recording medium and sends the read program to an internal or external memory to store for use. Further alternatively, the program may be recorded in a memory device (a recording medium), such as a magnetic disk, an optical disk or a magneto-optical disk, and is provided to the computer from the memory device through a communication path.

Here, a computer is a concept of a combination of hardware and an Operating System (OS) and means hardware which operates under control of the OS. Otherwise, if an application program operates hardware independently of an OS, the hardware corresponds to the computer. Hardware includes at least a microprocessor such as a CPU and means to read a computer program recorded in a recording medium. Such a program includes a program code that causes the above computer to realize the function as setting unit 20 (the setting step) and generating unit 30 (the generating step). These functions may partially be realized by the OS, not by the application program.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An arithmetic operating apparatus that selects one operation from among a single data stream operation that processes a single data stream and a multiple data stream operation that processes a plurality of data streams in response to a single arithmetic instruction and performs the selected operation, the apparatus comprising:
 a register group including a first register region and a second register region each including a same number of a plurality of registers storing operands that are to be subject to arithmetic operation in response to the single arithmetic instruction; and
 a processor that generates a first instruction for a first arithmetic operator and a second instruction for a second arithmetic operator according to the single arithmetic instruction, the first arithmetic operator performing an arithmetic operation on operands read from one or more of the plurality of registers included in one of the first register region and the second register region in obedience to the first instruction, the second arithmetic operator performing an arithmetic operation on operands read from one or more of the plurality of registers included in one of the first register region and the second register region in obedience to the second instruction, each of the first and second arithmetic operators being a multi-input single-output multiply-add operator capable of switching a kind of arithmetic operation according to an instruction kind code included in the single arithmetic instruction, the instruction kind code indicating a kind of instruction of the single arithmetic instruction,
 wherein the processor:
  when the single data stream operation is selected, generates the first instruction according to all bits in each of a plurality of register number specifying fields included in the single arithmetic instruction so as to cause the first arithmetic operator to perform an arithmetic operation on operands read from one or more of the plurality of registers included in one of the first register region and the second register region, the register number specifying fields specifying operands in the register group that are to be output from the register group to the first and second arithmetic operators, when the multiple data stream operation is selected and a most significant bit of each of the register number specifying fields is unused, generates the first instruction according to the instruction kind code and remaining bits in each of the register number specifying fields except for the most significant bit, so as to cause the first arithmetic operator to perform an arithmetic operation on operands read from one or more of the plurality of registers included in the first register region, the remaining bits specifying operands in the first register region or the second register region that are to be output from the first register region or the second register region to the first and second arithmetic operators, and generates the second instruction according to the instruction kind code and the remaining bits, so as to cause the second arithmetic operator to perform an arithmetic operation on operands read from one or more of the plurality of registers included in the second register region, and when the multiple data stream operation is selected and first particular instruction information is set in the most significant bit of at least one of the register number specifying fields, generates the first instruction so as to cause the first arithmetic operator to perform an arithmetic operation on operands read from one or more of the plurality of registers included in the second register region, or generates the second instruction so as to cause the second arithmetic operator to perform an arithmetic operation on operands read from one or more of the plurality of registers included in the first register region.

2. An arithmetic operating apparatus according to claim 1, wherein at least one of the register number specifying fields specifies a destination in the register group of storing a result of an arithmetic operation performed by each multiply-add operator.

3. An arithmetic operating apparatus according to claim 1, wherein when the multiple data stream operation is selected and second particular instruction information is set in the most significant bit of at least one of the register number specifying fields, the processor changes at least one of a kind of an arithmetic operation to be performed in the first arithmetic operator and a kind of an arithmetic operation to be performed in the second arithmetic operator.

4. A method for performing an arithmetic operation in an arithmetic operating apparatus that selects one operation from among a single data stream operation that processes a single data stream and a multiple data stream operation that processes a plurality of data streams in response to a single arithmetic instruction and performs the selected operation, the apparatus comprising a register group including a first register region and a second register region, each including a same number of a plurality of registers storing operands that are to be subjected to an arithmetic operation in response to the single arithmetic instruction, and a processor that generates a first instruction for a first arithmetic operator and a second instruction for a second arithmetic operator according to the single arithmetic instruction, the first arithmetic operator performing an arithmetic operation on operands read from one or more of the plurality of registers included in one of the first register region and the second register region in obedience to the first instruction, the second arithmetic operator performing an arithmetic operation on operands read from one or more of the plurality of registers included in one of the first register region and the second register region, in obedience to the second instruction, each of the first and second arithmetic operators being a multi-input single-output multiply-add operator capable of switching a kind of arithmetic operation according to an instruction kind code included in the single arithmetic instruction, the instruction kind code indicating a kind of instruction of the single arithmetic instruction, the method comprising:

generating the first instruction according to all bits in each of a plurality of register number specifying fields included in the single arithmetic instruction, so as to perform an arithmetic operation at the first arithmetic operator, when the single data stream operation is selected, on operands read from one or more of the plurality of registers included in one of the first register region and the second register region, the register number specifying fields specifying operands in the register group that are to be output from the register group to the first and second arithmetic operators;

generating the first instruction according to the instruction kind code and remaining bits in each of the register number specifying fields except for a most significant bit, so as to perform an arithmetic operation at the first arithmetic operator, when the multiple data stream operation is selected and the most significant bit of each of the register number specifying fields is unused, on operands read from one or more of the plurality of registers included in the first register region, the remaining bits specifying operands in the first register region or the second register region that are to be output from the first register region or the second register region to the first and second arithmetic operators, and generating the second instruction according to the instruction kind code and the remaining bits, so as to perform, at the second arithmetic operator, an arithmetic operation on operands read from one or more of the plurality of registers included in the second register region, and when the multiple data stream operation is selected and first particular instruction information is set in the most significant bit of at least one of the register number specifying fields, generating the first instruction so as to perform an arithmetic operation at the first arithmetic operator on operands read from one or more of the plurality of registers included in the second register region, or generating the second instruction so as to perform an arithmetic operation at the second arithmetic operator on operands read from one or more of the plurality of registers included in the first register region.

5. A method for performing an arithmetic operation according to claim 4, wherein at least one of the register number specifying fields specifies a destination in the register group of storing a result of an arithmetic operation performed by each multiply-add operator.

6. A method for performing an arithmetic operation according to claim 4, further comprising, when the multiple data stream operation is selected and second particular instruction information is set in the most significant bit of at least one of the register number specifying fields, changing at least one of a kind of an arithmetic operation to be performed in the first arithmetic operator and a kind of an arithmetic operation to be performed in the second arithmetic operator.

* * * * *